(12) United States Patent
Song et al.

(10) Patent No.: US 12,143,399 B2
(45) Date of Patent: Nov. 12, 2024

(54) EMAIL CERTIFICATION SYSTEM

(71) Applicants: Yuh-shen Song, Porter Ranch, CA (US); Catherine Lew, Porter Ranch, CA (US); Alexander Song, Porter Ranch, CA (US); Victoria Song, Porter Ranch, CA (US)

(72) Inventors: Yuh-shen Song, Porter Ranch, CA (US); Catherine Lew, Porter Ranch, CA (US); Alexander Song, Porter Ranch, CA (US); Victoria Song, Porter Ranch, CA (US)

(73) Assignee: APEX TECHLINK, INC., Glendale, CA (US)

( * ) Notice: Subject to any disclaimer, the term of this patent is extended or adjusted under 35 U.S.C. 154(b) by 506 days.

(21) Appl. No.: 17/367,062

(22) Filed: Jul. 2, 2021

(65) Prior Publication Data

US 2022/0217154 A1  Jul. 7, 2022

Related U.S. Application Data

(60) Provisional application No. 63/134,087, filed on Jan. 5, 2021.

(51) Int. Cl.
*H04L 29/06* (2006.01)
*H04L 9/40* (2022.01)
*H04L 51/234* (2022.01)

(52) U.S. Cl.
CPC ............ *H04L 63/12* (2013.01); *H04L 51/234* (2022.05); *H04L 63/1483* (2013.01)

(58) Field of Classification Search
CPC .... H04L 63/12; H04L 51/234; H04L 63/1483
See application file for complete search history.

(56) References Cited

U.S. PATENT DOCUMENTS

| | | | | |
|---|---|---|---|---|
| 6,393,465 | B2* | 5/2002 | Leeds | H04L 51/212 709/206 |
| 2002/0046250 | A1* | 4/2002 | Nassiri | H04L 51/23 709/206 |
| 2002/0138581 | A1* | 9/2002 | MacIntosh | H04L 51/48 709/206 |
| 2003/0236847 | A1* | 12/2003 | Benowitz | H04L 51/212 726/4 |
| 2005/0108360 | A1* | 5/2005 | Zellner | H04L 63/126 709/217 |
| 2005/0144239 | A1 | 6/2005 | Mattathil | |
| 2005/0188045 | A1 | 8/2005 | Katsikas | |
| 2005/0210106 | A1 | 9/2005 | Cunningham | |
| 2008/0313704 | A1 | 12/2008 | Sivaprasad et al. | |
| 2011/0102157 | A1* | 5/2011 | Tarkoma | H04W 52/0229 340/10.33 |
| 2014/0089426 | A1* | 3/2014 | Kwon | H04L 51/18 709/206 |
| 2017/0374037 | A1* | 12/2017 | Klum | H04L 51/18 |
| 2018/0197127 | A1* | 7/2018 | Brunner | G06F 16/951 |

FOREIGN PATENT DOCUMENTS

WO   WO-2017132170 A1 *  8/2017  ............ H04L 51/12

* cited by examiner

*Primary Examiner* — Shawnchoy Rahman
(74) *Attorney, Agent, or Firm* — Seyfarth Shaw LLP

(57) ABSTRACT

A central computer system enables a sender to certify a message, such as an email, and a recipient to verify the validity of the certified message. As a result of the certification, users of messages can avoid ransomware attacks and many other types of fraud caused by fraudulent messages.

18 Claims, 16 Drawing Sheets

EMAIL CERTIFICATION SYSTEM

CROSS-REFERENCE TO RELATED APPLICATION

The present application claims the benefit of U.S. Provisional Patent Application No. 63/134,087, filed Jan. 5, 2021, and tided "EMAIL CERTIFICATION SYSTEM," the disclosure of which is expressly incorporated by reference in its entirety.

TECHNICAL FIELD

The present disclosure relates generally to an email and message certification system. More specifically, the present disclosure relates to protecting individuals, organizations, and financial institutions against many types of ransomware attacks, email fraud, and message fraud.

BACKGROUND

Criminals and fraudsters have used many schemes to steal money, credentials, private and confidential information, identities, financial instruments, and other valuables from individuals and organizations. During recent years, more fraudulent activities have occurred online because many commercial activities are conducted online.

Online financial crimes often start from emails or messages. For example, many consumers are victims of phishing schemes in which fraudulent emails are sent to consumers, asking them to log into fake websites that are designed to steal user IDs, passwords, identities, and other private and confidential information from consumers. The fraudulent emails may also download malware into consumers' computers.

As a result of computer hacking, fake emails pretending to share information are often sent from a victim's email address to all email addresses in the victim's address book. Once an email recipient clicks on a link inside the email or opens an attachment, malware will be installed to hack the computer of the recipient who becomes a new victim.

Numerous fraud cases were committed as a result of fake emails from hackers. For example, a museum, Rijksmuseum Twenthe in Enschede, Netherlands, intended to purchase Constable's 1824 painting "A View of Hampstead Heath" from art dealer Simon C. Dickinson. After along negotiation, both parties reached a sale price of $3,100,000. However, a fake email posing as the art dealer asked the museum to send $3,100,000 via a wire transfer to a bank account that was actually controlled by the hacker. As a result, the hacker stole $3,100,00 and the museum and the art dealer ended up suing each other in court.

Similarly, during real-estate transactions, hackers often cheat the buyers by sending fake escrow instructions to the buyers so that they will send wire transfers to destinations that are under the hackers' control. Once a buyer sends the wire transfer based on the fake escrow instructions, the money is stolen.

Very often, when an employee working in a company accidentally clicks on a link inside an email or opens an attachment of the email sent by a hacker, all computers inside the company will be hacked. There have been many cases in which hackers encrypted all files of all computers on the network of a company and demanded the company pay a ransom. After the ransomware attacks by hackers, many companies cannot even open for business because all computers are disabled. The companies pay hackers huge amounts of money as ransom so they can recover their computer systems and data to continue their business. The $4.4 million ransomware attack on Colonial Pipeline and the $11 million ransomware attack on JBS are terrifying examples of how vulnerable we are in the digital world.

Ironically, videos are available from the Internet to teach people how to spoof email addresses. A hacker can easily spoof email addresses and send spam emails. Because consumers have learned that they should not click on any links inside email or open any attachments, they tend to remove all emails sent from merchants without looking at the contents. As a result, merchants are wasting their money and resources when they conduct email marketing campaigns. Email fraud has adversely affected online commerce and the economic growth.

Due to consumer awareness of the risk caused by email fraud, even normal email communications by consumers are affected. Whenever a recipient receives an email with a link or an attachment from a sender, the recipient contacts the sender via text message or by phone to verify whether the sender has truly sent the email. If these two people are in two different time zones, it may be inconvenient to have such contact because the sender may be sleeping when the recipient reads the email. Sometimes, the sender is busy with something else and cannot answer a phone call or reply to a text message. As a result, the recipient has to wait for the response from the sender. Email fraud has caused consumers to lose confidence in email communication.

Similarly, there are many fraudulent messages sent via social networks. A fake message sent via a social network from one person may ask his friends or relatives to send money to a special destination because of an emergency. Many victims have suffered financial losses because of such fraud.

Numerous methods have been proposed to prevent email fraud and message fraud. Nevertheless, criminals and fraudsters continue to prevail and billions of dollars are stolen every year as a result of fraud. There is a need for a more effective solution to prevent ransomware attacks, email fraud, and message fraud.

The Bank Secrecy Act in the USA was first established in 1970. Under the Bank Secrecy Act, financial institutions must report suspicious activities to the government. Historically, financial institutions train frontline personnel (e.g., bank tellers) to observe and identify suspicious activities. Most financial institutions, however, could not effectively comply with the Bank Secrecy Act. After the 9/11 tragedy, U.S. lawmakers believed that effective compliance with the Bank Secrecy Act by financial institutions could have prevented the 9/11 tragedy.

To further enforce the Bank Secrecy Act, the U.S. Congress passed the USA PATRIOT Act, which enacted severe civil and/or criminal penalties for violations of the Bank Secrecy Act. Furthermore, the U.S. government agencies, such as Financial Crimes Enforcement Network (FinCEN), Office of Comptroller of Currency (OCC), Federal Reserve Bank (FRB), Federal Deposit Insurance Company (FDIC), National Credit Unions Administration (NCUA), State Banking Departments, Department of Financial Institutions, etc., strictly require financial institutions to comply with the Bank Secrecy Act, especially in their obligations to file Suspicious Activities Reports (SARs) to FinCEN.

Suspicious activities cover a very broad scope. For example, money laundering, terrorist financing, fraud, embezzlement, identity theft, computer intrusion, self-dealing, bribery, false statement, counterfeit instruments, mysterious disappearance, etc., are all classified as suspicious activities.

Nevertheless, many financial institutions have failed to detect and report suspicious activities. In fact, many financial institutions use products that are effective for preventing fraud, but ineffective for preventing money laundering or other financial crimes. In general, fraud can be detected based on a change of behavior because a fraudster that has stolen a victim's identity (or financial instrument) behaves differently from the victim. A computer system can detect a fraud case if an account's activities are different from expected activities as derived from historical activities.

For example, U.S. application (Publication No. 2003/0177087) specifies that a high risk variable can include a change in an account's usual behavior indicated, for example, when a transaction falls outside its profile. According to this publication, Beta, Delta, and Theta models are used to detect transactions that fall outside the profile of a customer.

However, money laundering and some other financial crimes can be committed without any change in behavior. As a result, the traditional approach of detecting fraud based on a change in behavior cannot detect some basic money laundering activities or other financial crimes. In the money laundering arena, a higher-risk customer may not be suspicious. For example, money services businesses (MSBs), pawnshops, ATM vendors, flight attendants, etc., are typically classified as higher-risk customers by banks in their anti-money laundering programs. Nevertheless, it does not mean that these higher-risk customers conduct money laundering activities. Although high risks are associated with these customers, there may be nothing wrong with these customers.

Some businesses are very difficult to monitor. For example, an MSB deals with a large number of transactions every day and a single money laundering transaction, mixed with a large number of transactions, may not be detected by the traditional approach.

The challenges noted for complying with the USA PATRIOT Act and the Bank Secrecy Act (BSA) are just some examples to illustrate the importance of identifying suspicious activities. Identifying suspicious activities can also be used to comply with other laws, such as the Fair and Accurate Credit Transactions Act (FACT Act), the Unlawful Internet Gambling Enforcement Act (UIGEA), the Elder Abuse Reporting Act, (EARA), the Sarbanes-Oxley Act (SOX), the regulations set by the Office of Foreign Assets Control (OFAC), and other laws and regulations.

Regulatory compliance is traditionally implemented through policies and procedures that require human workers to take some specific actions in response to certain conditions. For example, banks train their tellers in the branches to observe and report anything they see as suspicious to comply with the Bank Secrecy Act.

This traditional approach is no longer effective in the modern age because customers no longer need to appear in a branch of the bank. For example, customers can conduct remote electronic transactions (e.g., via the Internet) and there are many financial instruments available to customers (e.g., checks, credit cards, debit cards, etc.). Furthermore, perpetrators are sophisticated and know how to avoid attracting attention from tellers. As a result, depending on tellers to detect suspicious activities for compliance with the Bank Secrecy Act is insufficient.

Moreover, the cost of this human-based approach is very expensive. Intensive training must be conducted periodically to ensure that human workers truly know how to respond to each different situation in compliance with different laws and regulations. Human workers, however, are prone to mistakes. In fact, due to human oversight, many financial institutions have received severe penalties from government agencies for failure to comply with different laws and regulations.

It is desirable to improve surveillance systems to improve the detection of different types of suspicious activity and help businesses comply with different types of laws and regulations. The methods, functions, embodiments, computer systems, networks, software, hardware, mechanism, and other components used to detect suspicious activity may also be used for other applications, or other organizations for purposes other than detecting suspicious activity.

The U.S. Pat. Nos. 9,866,386, 9,288,197, 8,870,068, 8,500,011, 8,191,774, and 7,533,808 disclosed a computerized method and apparatus to identify a subject of common interest among multiple parties without releasing the true identity of the subject. However, the product based on those patents could not attract the interest from users. The main reason is that compliance professionals are very busy and they do not have time to log into a website to discover more information about a person who has suspicious activity. The present application disclosed a computerized system and network that empowers financial institution to work tougher almost effortlessly without disclosing any confidential information about their customers. Although an illicit proceeds tracking system is used as an example in the present disclosure, the computerized system and network can be used for many other applications.

SUMMARY

This disclosure includes a number of aspects that can be combined together to form a variety of computer systems and methods. In some aspects of the present disclosure, an email certification apparatus comprises an email receiver module that receives an email with a sender email address of an email sender and a recipient email address of an email recipient. The apparatus also includes a first data storage module that stores a first computer address of the email sender. The first data storage module is identified by a first identifier transformed from the sender email address. The apparatus also includes a second data storage module that stores a second computer address of the email recipient. The second data storage module is identified by a second identifier transformed from the recipient email address. The apparatus further includes a control and communication module that transforms the sender email address into the first identifier to inform the first storage module to conduct a first search based on the sender email address. The control and communication module also transforms the recipient email address into the second identifier to inform the second storage module to conduct a second search based on the recipient email address. The first search produces the first computer address and the second search produces the second computer address. The apparatus includes a personal communication module that informs the email recipient validity of the email when the email sender confirms the validity of the email. The first computer address is for contacting the email sender and the second computer address is for contacting the email recipient. Moreover, the email certification apparatus may further comprise an email transmitter module that sends an email with an email certification code to the email recipient when the email sender confirms the validity of the email. The email certification apparatus may also comprise an alert module that informs an entity of the recipient email address when the email sender denies the validity of the email.

In other aspects of the present disclosure, a message certification apparatus comprises a message receiver module that receives a message with a sender message address of a message sender and a recipient message address of a message recipient. The apparatus may also include a first data storage module that stores a first computer address of the message sender. The first data storage module is identified by a first identifier transformed from the sender message address. The apparatus may further include a second data storage module that stores a second computer address of the message recipient. The second data storage module is identified by a second identifier transformed from the recipient message address. The apparatus includes a control and communication module that transforms the sender message address into the first identifier to inform the first storage module to conduct a first search based on the sender message address. The control and communication module also transforms the recipient message address into the second identifier to inform the second storage module to conduct a second search based on the recipient message address. The first search produces the first computer address and the second search produces the second computer address. The apparatus also includes a personal communication module that informs the message recipient validity of the message when the message sender confirms the validity of the message. The first computer address is for contacting the message sender and the second computer address is for contacting the message recipient. The message certification apparatus may comprise a message transmitter that sends a message with a message certification code to the message recipient when the message sender confirms the validity of the message. Furthermore, the message certification apparatus may comprise an alert module that informs an entity of the recipient message address when the message sender denies the validity of the message.

The above email certification apparatus and message certification apparatus are merely examples. Many other apparatuses can be formed by combining and rearranging the aspects of this disclosure.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE FIGURES

The features, nature, and advantages of the present disclosure will become more apparent from the detailed description set forth below when taken in conjunction with the drawings.

Figure 1A:
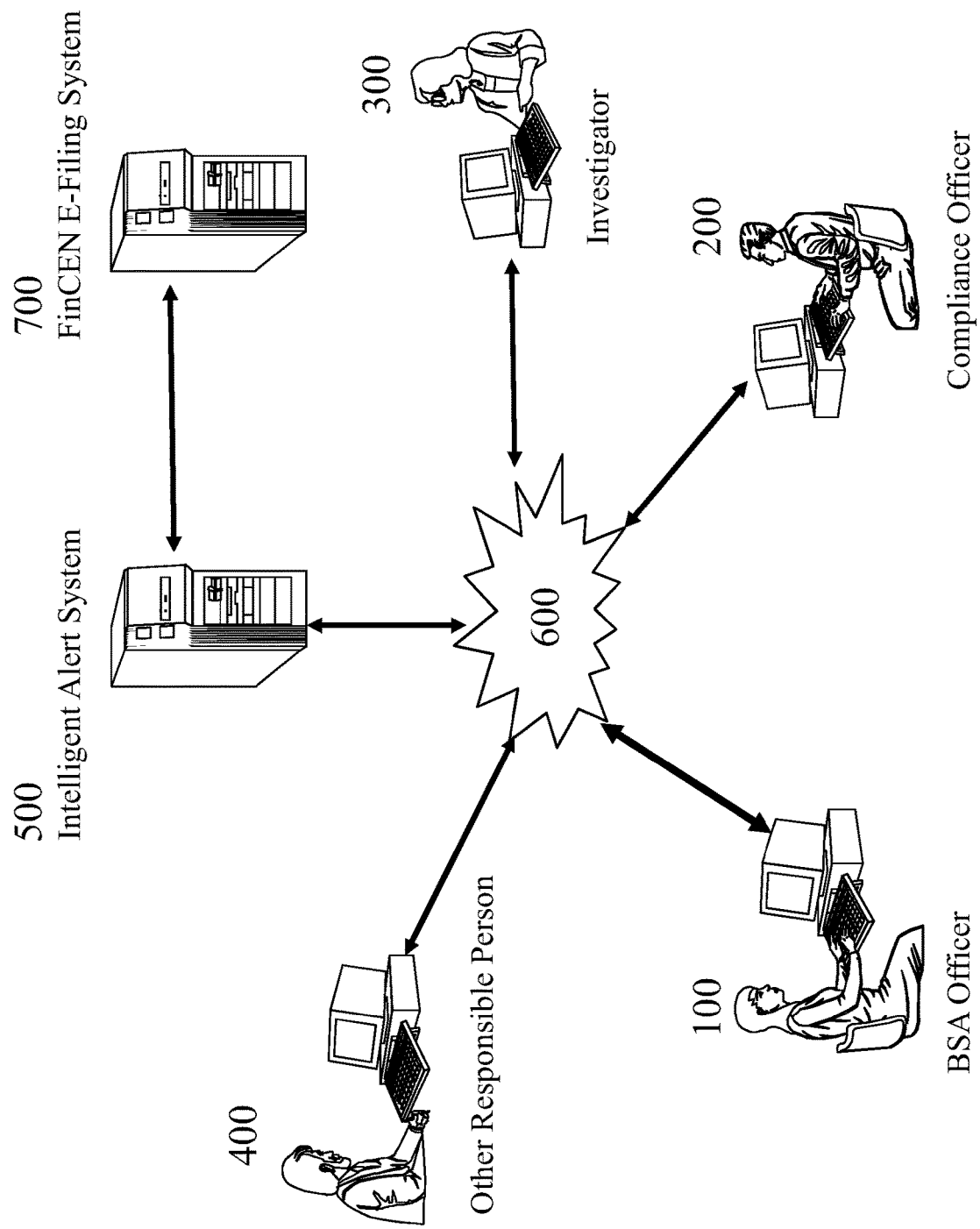
FIG. 1A illustrates a system and network diagram of an intelligent alert system, according to aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described, the use of the term "or" may mean either "inclusive OR" or "exclusive OR," depending on the situation of the application based on the convention.

DETAILED DESCRIPTION

Some aspects of the present disclosure are directed to a consumer protection system which empowers financial institutions, merchants, individuals, and organizations to work together to prevent financial crimes. As a result, consumers are protected by this system. Some aspects of the present disclosure are directed to an illicit proceeds tracking system, which empowers financial institutions to work together to prevent financial crimes and recover the money stolen from the financial institutions. Some aspects of the present disclosure are directed to an email certification system, which empowers senders to certify their emails and recipients to receive confirmation that the emails are sent by the correct senders. Some aspects of the present disclosure are directed to a message certification system, which empowers senders to certify their messages and recipients to receive confirmation that the certified messages are sent by the correct senders.

In addition, the consumer protection system works with a plurality of intelligent alert systems (IASs) which monitor transactions and activities of customers of various businesses to produce alerts. The intelligent alert systems can be installed at financial institutions, merchants, or any types of organizations, which have the need to prevent financial crimes. More importantly, the intelligent alert system will learn from human beings and will become smarter to automatically accept potential cases as true positives and/or reject potential cases as false positives like human beings. As a result, the intelligent alert system can help a financial institution use minimum human resources to comply with different requirements, including laws, regulations, rules, etc.

In addition to the Bank Secrecy Act, the intelligent alert system can also help various organizations use minimum human resources to comply with many other laws and regulations through the monitoring of transactions and activities. Depending on the specific requirements of these laws and regulations, the intelligent alert system may monitor different types of activities by using different methods. The present disclosure provides various details of how to monitor transactions and activities and help various organizations use minimum human resources to comply with different types of requirements, laws, and regulations. Moreover, the intelligent alert system can also be used for other applications, or other organizations for other purposes as explained in the background section above. The intelligent alert system reduces or eliminates human efforts and mistakes, saves resources and money, and effectively achieves improved results.

Once the intelligent alert system has detected a potential financial crime against an individual (or an organization), the intelligent alert system sends the description of the financial crime and the contact information of the individual (or the organization) to a consumer protection system. The consumer protection system contacts the individual (or the organization) and requests the contacted party to verify whether it is truly a financial crime. The consumer protection system sends the feedback from the individual (or the organization) to the intelligent alert system. The intelligent alert system uses the feedback to stop the financial crime if it is a true financial crime, or dismiss the potential case as a false positive if it is not a true financial crime.

Moreover, because the consumer protection system communicates with many intelligent alert systems residing at different financial institutions, the consumer protection system will receive feedbacks from many individuals and organizations, which are customers of the financial institutions. This feedback information is also important to some third parties, such as merchants, who want to prevent future losses caused by similar financial crimes. These third parties have the desire to subscribe to the services provided by the consumer protection system, which is capable of providing the feedback information.

The consumer protection system has incorporated an alarm system and the subscribers are third parties, such as merchants. Based on the feedback from the individual (or the organization), the consumer protection system can send an alarm to the subscribers if there is a true crime. The third parties will use the information to stop future crimes so that the criminal or the fraudster cannot commit any similar crime against the individual or the organization any more.

Many anti-money laundering professionals have come to realize that transactional monitoring cannot identify all money launderers. After obtaining the illicit proceeds, criminals often move to another financial institution to start over, carte blanche. These criminals pretend to be good citizens and financial institutions cannot detect any of their transactions as suspicious even though their illicit proceeds have been deposited into financial institutions. No transactional monitoring system can detect a money launderer who has no suspicious transactions.

For example, Financial Institution A's customer John Doe in Los Angeles disappears after he defaults on a $250,000 unsecured loan obtained through fraudulent misrepresentation. Then, $250,000 with no trace to Financial Institution A is deposited into an account at Financial Institution B in San Francisco that John Doe opened several years ago. If Financial Institution A knows that the illicit proceeds of John Doe are in Financial Institution B, it can seize the illicit proceeds in John Doe's account at Financial Institution B through a prejudgment writ of attachment.

However, the Gramm-Leach-Bliley Act in the U.S. and similar laws in other countries have prohibited financial institutions from disclosing non-public personal information of their customers or members. As a result, Financial Institution A cannot disclose John Doe's name in public and Financial Institution B cannot know that John Doe has stolen money from Financial Institution B.

The present application also discloses an illicit proceeds tracking system, which tracks John Doe without disclosing any personal identification information of John Doe. In the above scenario, when Financial Institution A tracks the illicit proceeds of John Doe, Financial Institution B will receive an alert. Based on Section 314(b) of the USA PATRIOT Act, Financial Institution A and Financial Institution B are fully protected by the safe harbor when they discuss John Doe. Financial Institution A can obtain a prejudgment writ of attachment from the court to seize John Doe's funds in Financial Institution B.

According to the most up-to-date statistics published by the U.S. government, the ratio of net loan losses to average total loans for all U.S. banks is 0.47% in the third quarter of 2019. This figure is close to the historical low, which is 0.35%. The historical high is 3.12%. This means that, even under the current good economic condition, an "average" financial institution that takes deposits and issues loans may suffer loan losses, which are about 0.47% of the total loan assets. For example, a financial institution with $1 billion in loan assets may suffer about $4.7 million in loan losses. Because it is an average figure, some financial institutions may be better and some may be worse.

The typical annual profits for banks and credit unions are between 1% to 2.0% of the total asset size. The typical assets of banks and credit unions primarily consist of loans. If we use the average 1.5% as an example, even under a good economic condition, the average loan losses (0.47%) are about one-third of the average profits (1.5%). This is why loan losses can keep senior managers and board directors awake at night.

If the credit department of a financial institution has done its job correctly, the most common reason for loan losses is misrepresentations by the borrowers. The money stolen by a borrower as a result of misrepresentation is legally classified as illicit proceeds. If the BSA team can track the illicit proceeds stolen from the financial institution, the BSA team may help the financial institution recover the money stolen from the financial institution and tremendously increase the overall profitability of the financial institution.

Therefore, in addition to identifying the money launderers that are missed by the AML transactional monitoring system, Illicit Proceeds Tracking can substantially increase the overall profitability of a financial institution.

Moreover, if every financial institution tracks the illicit proceeds after a perpetrator has committed a financial crime, such as money laundering, terrorist financing, Ponzi scheme, human trafficking, embezzlement, bank fraud, security fraud, insurance fraud, tax fraud, etc., based on the Money Laundering Control Act which covers hundreds of Specified Unlawful Activities, the perpetrator cannot launder the illicit proceeds through any financial institution. This is the definitive goal of the anti-money laundering laws, regulations, and rules. The illicit proceeds tracking system will achieve this goal.

The U.S. government strictly enforces a business's compliance with the USA PATRIOT Act, the Bank Secrecy Act (BSA), the Fair and Accurate Credit Transactions Act (FACT Act), the Unlawful Internet Gambling Enforcement Act (UIGEA), the Elder Abuse Reporting Act, (EARA), the Sarbanes-Oxley Act (SOX), the regulations set by the Office of Foreign Assets Control (OFAC), and other related laws and regulations. The business may include, for example, financial institutions, such as banks, credit unions, mortgage companies, money services businesses, stockbrokers, and insurance companies. Billions of dollars in Civil Monetary Penalties (CMPs) have been levied by the U.S. government to financial institutions for violating these laws and regulations. Criminal penalties have also been issued to some individuals that work for the financial institutions.

A financial institution is just one type of business. Financial institutions are not the only organizations that need to comply with these laws and regulations. Many other types of businesses need to comply with these laws and regulations. The present disclosure applies to all businesses, such as businesses that are obligated to comply with laws and regulations.

The Financial Crimes Enforcement Network (FinCEN) and the Office of Foreign Assets Control (OFAC) are USA organizations. The laws and regulations in the USA are used as examples in the present disclosure. Many other countries have similar organizations that perform similar tasks. As such, similar laws and regulations exist in many other countries. The present disclosure is also applicable in those countries to help businesses comply with their respective laws and regulations. Aspects of the present disclosure may also be used by businesses, individuals, or organizations that do not need to comply with a law or regulation.

Often, it may be difficult to determine whether a person or a group of persons have conducted an illegal activity. According to the Bank Secrecy Act in the USA, when a business files a Suspicious Activity Report (SAR) with FinCEN, the business has no obligation to prove whether the reported case is an illegal activity. In fact, a "safe harbor" rule encourages businesses to report more suspicious activities without concern for the ramifications of being accused of reporting legitimate activities as wrongful by mistake. Under this "safe harbor" rule, no person (or organization) can file a lawsuit against an entity because the entity filed a Suspicious Activity Report (SAR) to FinCEN about this person (or organization). A SAR is used by the government to collect information, and a business is only expected to provide information and opinions in a SAR. Government agencies perform their own investigations to determine whether an activity reported in a SAR is truly illegal.

In general, the decision-making process regarding whether to report a suspicious activity, which is not fraud, is different from the decision-making process regarding whether to report a fraud case. For a fraud case, an entity, such as a business or a consumer, may lose money. Therefore, fraud is easier to detect in comparison to other crimes. As such, it is easier to decide whether to report a fraud case. Preventing fraud is also easier in comparison to preventing other crimes. As an example, if a computer system detects a high fraud risk associated with a transaction, the computer system can block the transaction and let an investigator investigate the transaction to determine whether it is truly a case of fraud.

In aspects of the present disclosure, for fraud detection, a computer system calculates a risk score associated with a transaction based on different factors associated with the transaction. These factors may include historical activities of the account, deviations from the expected activities, location, time, amount, frequency and nature of the transaction, relationships between multiple accounts, type, nature and structure of the account holder, etc.

In aspects of the present disclosure, for fraud detection, a computer system blocks the transaction if the fraud risk score of the transaction is over a threshold. The threshold can be pre-determined based on the policy of the business.

In aspects of the present disclosure, for fraud detection, a computer system creates a case based on the detected high fraud risk transaction. The case and related information are presented to an investigator for further investigation.

In comparison to fraud, there may be no clear evidence for suspicious activity. For example, a customer may frequently deposit a large amount of cash. It is possible that this customer is engaged in money laundering by selling illegal goods and receiving cash as payment. It is also possible that this customer sells homemade products in farmers' markets and only accepts cash as payments. Often, due diligence is needed to determine whether there is anything suspicious.

It is also possible that although a customer sells homemade products in farmers' markets, the customer also sells illegal goods at other locations. Unless the bank is informed that the customer sells illegal goods, there is no evidence for the bank to prove that the customer sells illegal goods. If the customer really sells illegal goods and the bank does not report such suspicious activity to FinCEN, the bank may receive a severe penalty later for failing to report the case to FinCEN once the customer is caught by the government for selling illegal goods.

On the other hand, if the bank reports every case that has a slight chance of being suspicious, the bank may invite unnecessary attention from government agencies. The government agencies may spend many months inside the bank to investigate the bank's operations and may severely affect the bank's operations.

The decision for reporting a case may be a judgment call by the person who reviews the case. In addition, the decision-making process can be quite subjective. Furthermore, a business cannot block a transaction simply because it appears to be a suspicious money laundering activity. A consumer may sue the business that blocks the consumer's transaction when the business cannot really prove that money laundering has occurred. In fact, many government agencies often advise businesses, which have reported suspicious activities such as money laundering or terrorist financing, to keep quiet and process the suspicious transactions as normal transactions so that the suspect will not be alerted and flee. This approach gives government agencies more time and opportunity to identify all related perpetrators.

According to the U.S. Bank Secrecy Act, a business that files a SAR has the obligation to keep the SAR confidential and cannot let the suspect (e.g., a person involved in the case) know anything about the SAR, including the existence of the SAR. SARs can only be reviewed by authorized government agencies.

Because handling a suspicious activity case is very different from handling a fraud case, as described above, many conventional approaches and concepts that are applicable for fraud detection and prevention are no longer useful for detecting and managing suspicious activity, such as money laundering, terrorist financing, elder abuse, online gambling, etc. In aspects of the present disclosure, a computer system records the opinions of the person that decides not to report a detected suspicious activity case. Under such circumstances, the decision maker records a reason to justify their decision.

Unlike a fraud case, a suspicious activity case may not be clear to a person who reviews the case until additional evidence becomes available. Therefore, it is possible that a person may dismiss a detected suspicious activity case at the beginning, but change his mind later when additional evidence becomes available. In aspects of the present disclosure, a person who reviews a detected suspicious activity case may also need to review all the historical detected cases regarding the same suspect to determine whether any new evidence, when combined with the old evidence, possibly from any dismissed cases, makes the newly detected case more suspicious. As a result, even if a case was previously dismissed as a false detection, such a dismissed case may be reviewed later.

This case review practice of suspicious activity may be different from the case review practice of fraud, as fraud cases typically have a clear conclusion. If a customer is a fraudster, the customer's account is closed and the customer will be prevented from conducting future transactions/activities. If a customer is a victim of fraud, the detected fraud case has nothing to do with the customer and the evidence is not used against the customer in the future. Therefore, a fraud investigator usually only focuses on newly detected case. Conversely, a suspicious activity investigator may need to review a history of the detected cases and make a decision after intensive research and analyses. In aspects of the present disclosure, the justification of the decision for not reporting a suspicious activity is stored in a database and is available for future reference.

In other aspects of the present disclosure, a computer system also records the identity of the person that decides not to report the detected case. The computer system may compare the decisions made by multiple persons for not reporting suspicious activities of the same suspect(s) to determine whether an investigator is attempting to hide a detected suspect or case.

For a large business, thousands of suspicious activities may be detected every month. A group of persons may be tasked with reviewing the detected cases to determine whether the business needs to file SARs on these cases. In aspects of the present disclosure, a computer system automatically allocates detected cases to different persons based on the policies set by the business. The computer system may monitor and record the status of each detected case. If a case review is delayed by a particular person, the computer system will alert the business of such delay.

In yet other aspects of the present disclosure, a computer system monitors the workload of each person who reviews detected cases. If a person has reviewed an unusually large number of cases in comparison to other persons who also reviewed detected cases during the same period of time, this person himself may become suspicious or questionable.

On the other hand, if a person has reviewed a small number of cases in comparison with other persons who also reviewed cases during the same period of time, this person may also become suspicious or questionable. In either of the above two situations, a manager of the business may want to investigate the situation and reach his own conclusion and resolution.

In general, different detection functions are used to detect suspicious activities because suspicious activities may arise in many different types of activities. Because the detection of suspicious activities is not clear, some detected cases may not be truly suspicious after investigation. Under such circumstances, such detected cases are dismissed as false detections or false positives. A false detection or false positive is generally referred to as the conclusion of an investigation of a case, but not the reason to justify why the case is dismissed.

For example, if a financial institution detects a case where several customers live at the same address and deposit a large amount of cash into the financial institution, this case may be about a possible drug dealer family, with many of the family members depositing their proceeds from selling drugs. After investigation, however, this case may actually be a group of students living together and depositing tips that they receive from working at a restaurant. The reason to justify the decision not to report this case should be "students living together are depositing tips they have received from part-time jobs." As such, due to the given reason, the conclusion of the detected case becomes a false detection or false positive.

In general, after the review of a detected case, the case can be classified as a false detection (or false positive) by the person who reviewed this case. In aspects of the present disclosure, a computer system provides information and/or statistics for a user to analyze all detected cases that have been classified as false detections. From these false detections, the user may identify detection functions that have generated a number of false detections that is greater than a threshold. The user can further improve the identified detection functions to improve the detection of future suspicious activities.

The USA PATRIOT Act, Bank Secrecy Act (BSA), Anti-money laundering (AML), and Anti-Terrorist Financing (ATF) have been important compliance matters in the financial industry since 9/11. Many financial institutions have invested large amounts of capital in these compliance matters, but still miss true money laundering and terrorist financing cases.

The primary cause for these compliance problems is that many financial institutions do not even detect basic money laundering cases, and senior managers of financial institutions have difficulty understanding these problems. Many financial institutions utilize a fraud detection principle for detecting money laundering activities and some even mix fraud cases and money laundering cases.

In reality, however, money laundering is very different from fraud. A fraud detection product can easily compare an account holder's current activities with the account holder's historical activities and detect possible fraud if the current activities deviate from the expected activities derived from the historical activities. For example, if a fraudster steals a credit card from a victim, the fraudster will conduct purchase activities that are different from the victim's historical activities. It is just a matter of time before the credit card company will detect the fraudulent activities and disables the credit card. If a new account does not yet have sufficient historical records, a fraud detection product compares the account holder's current activities with what the account holder said during the account opening process.

Because the goal of a fraud detection product is to stop losses as soon as possible, financial institutions usually run the fraud detection or risk-scoring in real time, or at least once daily. In contrast, real-time risk scoring, real-time detection, daily risk scoring, and daily detection methods that are effective for fraud detection cannot detect many basic money laundering activities. In fact, as explained earlier, a higher-risk customer may not be a money launderer. It is a waste of time to assume that higher-risk customers are conducting suspicious money laundering activities.

A financial institution typically has a Bank Secrecy Act Officer (BSA Officer) who is responsible for reporting suspicious money laundering or terrorist financing activities to FinCEN. The following case is an example of how BSA Officers inside financial institutions can waste a significant amount of time reviewing their real-time risk scoring or daily risk scoring results, while still missing true money laundering cases. This example consists of the following facts: (a) Client A sends less than $3,000 to XYZ around the $5^{th}$ day of each month; (b) Client B sends less than $3,000 to XYZ around the $8^{th}$ day of each month; (c) Client C sends less than $3,000 to XYZ around the $12^{th}$ day of each month; (d) Client D sends less than $3,000 to XYZ around the $17^{th}$ day of each month; (e) Client E sends less than $3,000 to XYZ around the $24^{th}$ day of each month; (f) Client F sends less than $3,000 to XYZ around the $29^{th}$ day of each month; (g) A, B, C, D, E and F are unrelated individuals; and (h) XYZ is a drug dealer in Los Angeles with no prior criminal record.

In the above example, if a BSA Officer compares a client's current activities with the client's historical activities to detect any change of behavior, the BSA Officer does not detect anything unusual because the clients have consistently conducted similar transactions each month. If the bank tellers ask the clients about the purpose of the fund transfers, the clients can easily lie. Because these clients conduct their transactions on different days throughout the month, a BSA Officer would not be able to detect any risk on any given day of the month.

Furthermore, these clients are not related, and therefore the BSA Officer would not see their aggregate activities. In addition, because each transaction only involves a small dollar amount occurring once a month and the recipient of the funds resides in a U.S. city with a large population and heavy commercial activities, none of these clients would be viewed as high risk or suspicious based on these transactions. As a result, a fraud detection product will miss these basic money laundering cases despite the fact that the BSA Officer is working diligently with the fraud detection product every day.

To detect these money laundering cases, in some configurations, a computer system collects transactional data from the financial institution and conducts data mining based on anti-money laundering and anti-terrorist financing scenarios across all the transactions of all clients for a specified period of time, such as 30 days or longer. A computer system may collect all funds transfer transactional details from different data sources, such as wire, ACH, card payments, mobile payments, etc., inside a financial institution. The computer system may then identify a common recipient of these funds transfer transactions.

When a common recipient is identified, the computer system can display all transactions sent to a common recipient to the BSA Officer. The BSA Officer reviews the identified transactions through the computer system. The BSA Officer also reviews all historical cases associated with the suspects of the newly detected case. If the BSA Officer (e.g., a responsible person) agrees that such transactions are suspicious activities because the common recipient receives too much money, the computer system assists the BSA Officer to file a SAR to FinCEN. If the BSA Officer decides not to file a SAR, the BSA Officer enters a reason into the computer system to justify his decision for not reporting such detected activities.

There are several methods to report SAR cases to FinCEN. One approach is to send the SAR report in electronic format directly to the server located at FinCEN. Under such circumstances, a BSA Officer can instruct the computer system that has detected suspicious activities to file a SAR report. The computer system will prepare the SAR report based on the suspect and the transactions identified by the BSA Officer, then transmit the SAR report to the computer system at FinCEN.

As one can understand, data mining a huge amount of transactional data of all clients of a financial institution accumulated over a long period takes some time even for a very small financial institution. Because a financial institution will not directly lose any money in a money laundering case, according to the regulatory guidelines, a BSA Officer has up to 30 days to file a SAR. This example illustrates that it is a waste of time and resources to conduct real-time risk scoring or daily risk scoring that actually misses true money laundering activities.

BSA Officers voice a common frustration that they are wasting time on false positives every day, at the expense of detecting actual money laundering cases. This frustration is the result of the prevailing misconception that money laundering and fraud are often crimes committed by the same offender and should be detected together based on detected change in behavior. After purchasing fraud detection products, some financial institutions try to detect both money laundering cases and fraud cases together. This has resulted in a huge amount of time, money, and resources being wasted. This misconception can be corrected through a proper understanding of the sophisticated facets of transactional risks.

Transactional risks are defined as risks directly associated with the transactions. For example, money laundering risk and fraud risk are directly associated with the transactions. Nevertheless, these risks possess very different characteristics. Customers who conduct money laundering through financial institutions intend to use the financial institutions as vehicles to achieve their goals. These money launderers usually pretend to be good customers because they need the financial institutions' assistance to accomplish their schemes. They do not mind paying extra fees or losing interest on their money, and thus from the financial institutions' perspective, these money launderers are desirable customers. This is one of the key reasons why financial institutions need to conduct data mining on all transactions to detect money laundering activities that are hidden behind the scene.

In comparison, fraud risks manifest themselves differently. Fraud committed by customers is generally classified into two categories: (1) third-party fraud; and (2) counter-party fraud. Third-party fraud is defined as fraud committed by a third party that is not the financial institution and is not the customer. For example, both the financial institution (e.g., primary party) and the customer (e.g., counter party) may become victims when a fraudster (e.g., third party) steals a checkbook from the customer. Under such circumstances, the transactions conducted by the third-party fraudster have nothing to do with the customer. It is therefore a waste of time, money, and resources when BSA Officers are misled by an ineffective fraud detection product to assume that a customer has conducted money laundering (e.g., when there is a change of behavior) simply because the customer is a victim of fraud committed by a third party.

Counter-party fraud is defined as fraud committed by a customer (e.g., counter party) who cheats the financial institution (e.g., primary party). Once the customer has successfully cheated the financial institution, the customer quickly disappears and does not conduct money laundering through the financial institution. A fraudster may use financial institution A to launder the money, which the fraudster has stolen from financial institution B. To financial institution B, this is a fraud case. To financial institution A, this is a money laundering case. Neither of financial institution A nor financial institution B, however, sees both the fraud case and the money laundering case occurring to this same customer. Clearly, a system that intends to detect fraud cases every day systematically creates many false positives for money laundering and actually misses the real money laundering cases. Using such an approach increases the workload of the BSA Officers and exposes the financial institution to unnecessary regulatory risk.

There are other risks under the category of third-party fraud. For example, counterfeit checks, credit card fraud, debit card fraud, ATM fraud, online fraud, etc., are typical risks under the category of third-party fraud. Similarly, there are many different risks under the category of counter-party fraud, such as check kiting, deposit fraud, loan fraud, etc. Therefore, a good transactional risk management system uses multiple detection algorithms that intelligently take into account each unique characteristic of the various types of fraud to successfully detect fraud.

Furthermore, as explained earlier, multiple customers may launder money or finance terrorists together by conducting one small transaction for each person on different days, and daily monitoring misses such cases. This leads to the logical conclusion that a system using a single method to detect behavior changes wastes resources and misses true money laundering and terrorist financing cases. In aspects of the present disclosure, money laundering and terrorist financing activities are detected by a different detection method, which conducts data mining on all transactions of the entire financial institution accumulated over a period of time based on a user-defined scenario.

In aspects of the present disclosure, a computer system uses multiple detection methods for monitoring transactions and integrates the detection results into a centralized case management platform. This approach consolidates and streamlines anti-money laundering, anti-fraud, and anti-financial crimes to improve detection while maintaining a holistic, accurate picture at all times. As a result, a financial institution can improve compliance with the regulatory requirements, eliminate risks, avoid losses, improve productivity, reduce resources used for managing transactional risks, reduce costs associated with hardware, database and software, lower IT maintenance workload, and increase overall profitability.

In aspects of the present disclosure, a computer system compares a transactional pattern of a customer (or a group of customers) with known money laundering transactional patterns to detect suspicious money laundering activities. If there is a match, a possible money laundering activity may have been detected.

For example, many perpetrators know that a bank has to file a Currency Transaction Report (CTR) to the U.S. government if more than $10,000 in cash is deposited into a bank account on the same day. To avoid the filing of CTRs, perpetrators often split one large cash deposit into multiple smaller cash deposits, each cash deposit occurring on a different day and each cash deposit being less than $10,000. This transactional pattern is called "structuring," a known money laundering transactional pattern, and a computer system can detect this type of transactional pattern. There are many other types of transactional patterns that are known as money laundering transactional patterns. A computer system can be designed to detect each of these known money laundering transactional patterns. As a result, even if there is no change of behavior, a money laundering activity can be detected based on the transactional pattern of the suspect or suspects.

In aspects of the present disclosure, the BSA Officer (or responsible person) investigates the detected case to determine whether it is a true money laundering case. In aspects of the present disclosure, the BSA Officer also reviews all historical cases associated with the suspect(s) of the currently detected case. In aspects of the present disclosure, if the BSA Officer agrees that such transactions are suspicious activities, the computer system assists the BSA Officer to file a SAR to FinCEN. In other aspects of the present disclosure, if the BSA Officer decides not to file a SAR, the BSA Officer enters a reason into the computer system to justify his decision for not reporting such detected activities.

In other aspects of the present disclosure, a group of customers with one or more common risk factors (or characteristics), such as a type of business, business model, organization structure, size, location, product, service, career type, position, etc., are compared together to detect suspicious money laundering activities. If a transactional activity (e.g., transactional pattern, transactional volume, transaction frequency, transaction trend, number of transactions, amount of transactions, transaction derivative, etc.) of one customer is different from the transactional activities of other customers, this customer may have conducted a suspicious money laundering activity. In aspects of the present disclosure, statistical figures such as mean, variance, standard deviation, percentile, etc. of the group of customers are used to facilitate such comparison. Similarly, if one customer behaves differently from other customers who have the same set of risk factors (or characteristics), this customer may have conducted a suspicious money laundering activity. As a result, even if there is no change in behavior in any account, a suspicious money laundering activity can be detected.

Sometimes, it is not easy to compare a group of customers together. For example, an MSB with 100 branches may have many more cash activities than another MSB with only two branches. In aspects of the present disclosure, to achieve a more effective comparison, it is useful to compare some derivatives (e.g., ratio of several numbers) instead of the original raw data. For example, a ratio can be "total cash withdrawal from a bank divided by total number of checks deposited into a bank." In this example, the number of checks deposited can be used to measure the size of the MSB's check-cashing operations. Therefore, the ratio "total cash withdrawal divided by total number of checks deposited" basically scales the check cashing operations of the 100-branch MSB and the check cashing operations of the two-branch MSB to about the same level, based on check-cashing activities so that they can be compared on a more level ground.

Many other derivatives can be used to achieve a better comparison. In general, a derivative for a more effective comparison may include "a first variable of interest divided by a second variable which measures the size of the business (or operations)." For example, "total ACH outgoing transactional amount divided by total number of checks deposited," "total wire outgoing transactional amount divided by total number of checks deposited," "total number of prepaid cards issued divided by total number of checks deposited," "total ACH outgoing transactional amount divided by total number of branches," "total wire outgoing transactional amount divided by total number of branches," "total number of prepaid cards issued divided by total number of branches," "total ACH outgoing transactional amount divided by total number of prepaid cards issued," "total wire outgoing transactional amount divided by total number of prepaid cards issued," etc., are just some examples of the possible derivatives that can be used. In aspects of the present disclosure, in addition to the ratios above, other forms of mathematical transformation create a derivative.

In aspects of the present disclosure, a computer system compares a derivative of a particular customer with the derivatives of a group of customers who have one or more common risk factors (or characteristics) with the particular customer (e.g., same type of business or profession). If the derivative of the particular customer noticeably deviates from the derivatives of the group of customers, the particular customer may have conducted a suspicious money laundering activity. In aspects of the present disclosure, statistical analysis such as mean, variance, standard deviation, percentile, etc., of the group of customers facilitate such comparison.

In aspects of the present disclosure, a computer system uses many different risk factors to determine the money laundering risk of each customer of a financial institution. For example, these risk factors may include an industry, category of the customer, business type of the customer, geographical area of the customer, country of the address of the customer, a nature of the customer's business product types of the business, services types of the business, structure of the business, profession of the customer, nationality, historical records (including the compliance records such as the number of Currency Transactional Reports, the number of Suspicious Activity Reports, the matches with the OFAC list, the matches with the 314(a) list, the matches with the Political Exposed Persons list, special designations by the compliance program, etc.), type of the transaction conducted, balance of the accounts, funds inflow, funds outflow, transactional pattern, number of transactions, amount of transactions, transactional volume, transactional frequency, transactional derivative, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, thousands of risk factors may be considered to determine the money laundering risk of a customer. For the purpose of this disclosure, a "risk factor" is also referred to as a "representative element of a risk dimension," or simply a "risk dimension."

According to aspects of the present disclosure, each attribute of a customer that can affect the risk of the customer is a risk factor. Additionally, each characteristic of a customer that can affect the risk of the customer may be a risk factor. Furthermore, each type of activity of a customer that can affect the risk of the customer is a risk factor. The risk factors may also be affected by other risks, such as a piece of information related to a customer, each type of transaction of a customer, and/or each transactional pattern of a customer. Each risk factor is assigned a risk value.

In some configurations, each degree of the same type of risk is a risk factor and is given a risk score. For example, a total cash transactional amount in a period of 30 days can be used to measure the degree of the risk associated with money laundering. For example, we can define a total cash transactional amount level (or total cash transactional amount degree) from $0 to $5,000 during a 30-day period to have a risk score of 10; from $5,001 to $50,000, a risk score of 50; from $50,001 to $250,000, a risk score of 100; from $250,001 to $1,000,000, a risk score of 200; from $1,000,001 to $10,000,000, a risk score of 500; and for $10,000,000 and above, a risk score of 1,000. In this example, a person with a total cash transactional amount of $60,000 during a period of 30 days is classified into the amount level of "between $50,001 and $250,000," and has a risk score of 100.

"Cash transaction amount" is just used as an example. Other considerations, such as number of cash transactions, acceleration of cash transaction, etc., can also be used to measure the degrees of risks associated with money laundering. In addition to cash, other financial transactions such as checks, wires, ATM, ACH, virtual currency, virtual securities, virtual instruments, credit card, debit card, prepaid card, monetary instruments, transfer, etc., can also be used to measure the degrees of risks associated with money laundering. Those skilled in the art can easily figure out numerous risk factors based on the above example.

In aspects of the present disclosure, a risk score based scenario is based on customer data. Each piece of information about the customer is a risk factor and is assigned a risk score. Additionally, or alternatively, a risk score based scenario is based on transactional data. Each amount level (or amount degree) of a type of transaction is a risk factor and is assigned a risk score.

In aspects of the present disclosure, customer data is associated with one or more of an industry category of the customer, a business type of the customer, a geographical area of the customer, a country of an address of the customer, a nature of a business of the customer, a product type of the business, a services type of the business, a structure of the business, a profession of the customer, a nationality of the customer, a historical record, a type of the transaction conducted, a balance of an account, funds inflow, funds outflow, a transactional pattern, a number of transactions, an amount of transactions, a transactional volume, a transactional frequency, a transactional derivative, a location of the transaction, a time of the transaction, a country of the transaction, a sender of a money transfer transaction, a location of the sender, a country of the sender, a nature of the sender, a recipient of a money transfer transaction, a location of the recipient, a country of the recipient, a nature of the recipient, a relationship, social status, political exposure, a historical transaction, a number of suspicious activity reports (SARs) filed for money laundering and terrorist financing cases, a category of a first financial institution, a business type of the first financial institution, geographical area of the first financial institution, country of a head office of the first financial institution, nature of the business of the first financial institution, age of a person, sex of the person, income level of the person, appearance of the person, judgment about the person, a personal condition of the person, a family condition of the person, a family member of the person, a family member's condition of the person, a friend of the person, a friend's condition of the person, a historical record of the person, an industry category of the person, a geographical area of the person, a country of an address of the person, a profession of the person, a job type of an employee, an education level of an employee, an income level of an employee, a length of employment at a current job, a performance review record, employment history, a duration of each employment in the employment history, a reason for termination of each employment in the employment history, an age of the employee, a sex of the employee, a personal condition of the employee, a family condition of the employee, a family member of the employee, a family member's condition of the employee, a friend's condition of the employee, a historical record of the employee, a type of work performed, a number of transactions performed, an amount of transactions performed, a largest amount of transaction, a number of transactions with a particular counter party, an amount of transactions with a particular counter party, a number of changes of a crucial record, a number of changes of a crucial record associated with a particular counter party, a geographical area of an employee's home, a geographical area of an employee's office, a country of the address of the employee, a due diligence result of the customer, a length of an account history, a number of name matches with gambling organizations in transactions, or a combination thereof.

In aspects of the present disclosure, transactional data is associated with one or more of cash, check, wire transfer, ATM (Automated Teller Machine), ACH (Automated Clearing House), virtual currency, virtual securities, virtual instruments, credit card, debit card, prepaid card, electronic fund transfer, wires, monetary instruments, letters of credit, notes, securities, commercial papers, commodities, precious metal, account opening, account closure, an account application, deposit, withdrawal, cancellation, balance check, inquiry, credit, debit, or a combination thereof. The transactional data can be from real transactions of the customer or anticipated transactions provided by the customer in a customer due diligence process during account opening.

In aspects of the present disclosure, each risk factor is given a risk score and a customer is given a total risk score, which is a summation of all risk scores of the risk factors associated with the customer. This process of producing a total risk score for each customer may be referred to as risk scoring. This total risk score is used to determine the level of risk associated with the customer. A summation is used as one example in this disclosure. In fact, many different types of mathematical transformations can also be used to achieve a similar effect.

In aspects of the present disclosure, each risk factor is given a risk score and a customer is given a total risk score, which is a value derived from a mathematic transformation of all risk scores of the risk factors associated with the customer.

As explained earlier, unlike a fraud situation, a higher-risk client may not be a suspect for money laundering or terrorist financing. High risk may just be the nature of the client. For example, MSBs, pawnshops, car dealers, pilots, flight attendants, etc., are often classified as higher-risk customers for anti-money laundering and anti-terrorist financing purposes, however, this does not mean that these customers are conducting money laundering activities or terrorist financing.

Nevertheless, because a customer has a high risk score, the customer may be closely monitored and a different monitoring method may be applied. The different method may include using more due diligence effort, time, data, information sources, questions, etc. during the investigation process. Therefore, in aspects of the present disclosure, the total risk score of a customer is used to determine the monitoring method applied to monitor the customer. If a total risk score of a customer is higher, a closer monitoring method is applied to monitor the customer. More due diligence will be conducted on higher-risk customers whose total risk scores are higher than a value determined based on group statistics of a group of customers. If a total risk score of a customer is lower, a more relaxed monitoring method is applied to monitor the customer. During continuous monitoring of a customer, if the total risk score of the customer has increased more than a threshold, the customer may have conducted suspicious activity. In some aspects of the present disclosure, for higher-risk customers, the threshold should be smaller so that the higher-risk customers are monitored more closely than lower-risk customers.

In other words, in some aspects of the present disclosure, a total risk score of a customer is not used to determine whether the customer is suspicious. Instead, a total risk score of a customer is used to select an algorithm or a set of algorithms for monitoring the customer or a method for conducting more due diligence during the investigation of detected suspicious activities. If the total risk score of a customer is higher than a threshold during the customer due diligence process at account opening, enhanced due diligence should be performed. An enhanced due diligence process means that more questions, data, information resources, researches, analyses, investigations, site visits, etc. will be used than with the standard due diligence process.

Sometimes, a customer with a very high risk score may be suspicious. Therefore, in aspects of the present disclosure, if the total risk score of a customer is higher than a predefined value, an alert about the customer will be triggered so that the investigator can investigate the potential case. The predefined value can be set by a software module, a person who designs the system, a person who tunes the system, a person who uses the system, or a combination thereof.

In aspects of the present disclosure, a group of customers having the same risk factor are compared together. For example, we can compare all the customers who are flight attendants together. In aspects of the present disclosure, if the total risk score of a particular flight attendant is much higher than a reference value derived from the total risk scores of all flight attendants, this particular flight attendant may have conducted some suspicious money laundering activities. The reference value comprises an average, a median, a mean, a mode, a weighted average, and/or other statistical values.

Statistical approaches can also be applied to facilitate the detection of suspicious activities. For example, mean, variance and standard deviation can be derived from the total risk scores of all the customers who are flight attendants. In aspects of the present disclosure, if the total risk score of a particular flight attendant is higher than the mean of total risk scores of all flight attendants by over 4 times the standard deviation, this particular flight attendant may have conducted suspicious activities.

The above reference "4 times" is just one example. The number "4" can be any number, such as 3.75, 4.21, 10, etc. In aspects of the present disclosure, if the total risk score of a particular flight attendant is higher than the mean of total risk scores of all flight attendants by over x times of the standard deviation, this particular flight attendant may have conducted suspicious money laundering activities, where x is a number assigned by the BSA Officer (or a responsible person). This statistical approach can be applied whenever a group comparison is used.

A flight attendant is merely one example to illustrate this method to detect suspicious money laundering activities among a group of entities. In practice, many other risk factors can be used for similar purposes. Because there are tens of thousands of risk factors, in aspects of the present disclosure, a computer system permits a user to select any risk factor to identify all customers who have the same risk factor. In aspects of the present disclosure, if a particular customer has a total risk score which is much higher than a reference value derived from the total risk scores of other customers who have the same risk factor, the particular customer may have conducted suspicious money laundering activities. The reference value comprises an average, a median, a mean, a mode, a weighted average, a percentile, and/or other statistical values. The 50th percentile is in the middle of a distribution. When a total risk score of an entity is in higher percentiles, the total risk score of the entity is higher than 50% of the total risk scores of the group of entities.

Instead of one risk factor, a group of risk factors can also be used. In fact, a group of risk factors may improve the accuracy of the detection results. For example, in addition to the risk factor of profession (e.g., flight attendant), the destination country of the flight on which the flight attendant works can be another useful risk factor to detect money laundering risk. For example, a flight attendant who works on a flight between New York and Chicago may have activities, which are different from the activities of another flight attendant who works on a flight between Miami and Mexico City. It may be more accurate to compare a subgroup of flight attendants who work on flights between Miami and Mexico City. In this example, two risk factors, profession and destination city of flight, are considered to improve the accuracy of detection.

In aspects of the present disclosure, a set of risk factors is used to identify a group of entities. If a particular entity has a total risk score that is much higher than a reference value derived from the total risk scores of all entities having the same set of risk factors, the particular entity may have conducted suspicious money laundering activities. The reference value comprises an average, a median, a mean, a mode, a weighted average, and/or other statistical values. To simplify the calculations, the standard group statistics such as mean, variance, standard deviation, etc., which can be easily calculated based on existing software developing tools, can be derived to facilitate such comparison among a group of entities. As a result, even if there is no behavior change in any account, a computer system can still detect suspicious money laundering activities based on the above approach.

Sometimes, it may be helpful to eliminate some entities from the group comparison process because such entities are very different from others. In aspects of the present disclosure, a computer system permits users to select some entities that will not be included in a group comparison process.

Detecting a flight attendant as having a suspicious money laundering activity is just one example. A similar method can be applied to many other different situations. For example, it is usually very difficult for banks or credit unions to detect a Money Services Business (MSB) customer as having suspicious money laundering or terrorist financing activity because an MSB has many transactions every day and one money laundering transaction may be hidden among many other normal transactions.

In aspects of the present disclosure, an additional risk factor (e.g., near Mexico border) is used to identify a group of MSBs (e.g., in addition to the first risk factor—type of business) which have this same set of risk factors. If a particular MSB has a total risk score higher than a reference value derived from the total risk scores of all MSBs having the same set of risk factors, the particular MSB may possibly have conducted suspicious money laundering activities. The reference value comprises an average, a median, a mean, a mode, a weighted average, and/or other statistical values. Similarly, the standard group statistics such as mean, variance, standard deviation, etc. can be derived to facilitate such comparison among a group of MSBs.

Sometimes, it is not easy to compare a group of MSBs because they may have different types of operations and different sizes. In aspects of the present disclosure, a part-time MSB and a full-time MSB are given two different risk factors because they may have different natures of business. In other aspects of the present disclosure, each of the different types of MSB products and/or services is given a risk factor. For example, each of money transfer, check cashing, currency exchange, prepaid card management, etc. is given a risk factor, although all of them can be offered by the same MSB. In aspects of the present disclosure, a set of risk factors that precisely defines the types of products and/or services is used to identify the risks.

In aspects of the present disclosure, some risk factors are adjusted based on the size of the operations so that a group comparison becomes more effective. For example, an MSB with 50 branches may naturally have 5 times the total cash transactional amount of another MSB with 10 branches. Sometimes, to conduct a group comparison, risk factors affected by the size of the operations may be adjusted to account for the size of the operations. For example, for an MSB with 50 branches, its total cash transactional amount in 30 days can be divided by 50 to establish an adjusted risk factor and a risk score for a group comparison. Branches are used here as an example to measure the size of the operations. Other information, such as number of customers, number of transactions, number of employees, size of assets, etc. can also be used to measure the size of the operations.

In aspects of the present disclosure, a set of risk factors, adjusted based on the size of operations (e.g., adjusted risk factors), are used to identify a group of entities which have this set of adjusted risk factors. The risk score of an adjusted risk factor is referred to as the adjusted risk score. If a particular entity has a total adjusted risk score that is much higher than a reference value derived from the total adjusted risk scores of all entities having the same set of adjusted risk factors, the particular entity may have conducted suspicious money laundering activities. The reference value comprises an average, a median, a mean, a mode, a weighted average, and/or other statistical values. In general, in aspects of the present disclosure, a detection algorithm that incorporates a risk factor in the detection algorithm can also be modified to incorporate an adjusted risk factor in the detection algorithm. A detection algorithm that incorporates a risk score in the detection algorithm can also be modified to incorporate an adjusted risk score in the detection algorithm.

To simplify the calculations, the standard group statistics such as mean, variance, standard deviation, etc., based on adjusted risk factors and adjusted risk scores can be derived to facilitate such comparison among a group of entities. As a result, even if there is no behavior change in any account, a computer system can still detect suspicious money laundering activities based on the above approach.

Because MSBs may have different transactional activities from other types of businesses, it is more effective to monitor MSBs based on their unique transactional activities. Therefore, in aspects of the present disclosure, a different set of detection algorithms may be used to monitor entities with a different set of risk factors. In aspects of the present disclosure, a set of risk factors is used to identify a group of entities that have this set of risk factors, and a particular set of detection algorithms are used to detect suspicious money laundering activities in this group of entities. In other words, a set of detection algorithms is selected based on a set of risk factors associated with a group of entities to monitor the group of entities.

In other aspects of the present disclosure, a set of risk factors is adjusted based on the size of operations and used to identify a group of entities that have this set of adjusted risk factors, and a particular set of detection algorithms are used to detect suspicious money laundering activities in this group of entities. In other words, a set of detection algorithms is selected based on a set of adjusted risk factors associated with a group of entities to monitor the group of entities.

Sometimes, it is meaningful to monitor entities with higher risks more closely than entities with lower risks. Therefore, different sets of detection algorithms are used to monitor different entities with different levels of risk. In aspects of the present disclosure, a set of detection algorithms is selected based a total risk score of an entity to monitor the entity. In other aspects of the present disclosure, a set of detection algorithms is selected based on a total adjusted risk score of an entity to monitor the entity where the total adjusted risk score is obtained from the risk scores of adjusted risk factors.

In aspects of the present disclosure, once an MSB is detected as having possible money laundering activities, a computer system can identify the transaction (or a group of transactions) that caused the detected MSB to have a higher total risk score than a reference value derived from the total risk scores of all MSBs. The reference value comprises an average, a median, a mean, a mode, a weighted average, and/or other statistical values.

Similarly, once an MSB is detected as having possible money laundering activities, a computer system identifies the transaction (or a group of transactions) that caused the detected MSB to have a higher total adjusted risk score than a reference value derived from the total adjusted risk scores of all MSBs. The reference value comprises an average, a median, a mean, a mode, a weighted average, and/or other statistical values. As a result, a money laundering transaction (or a group of money laundering transactions) can be identified through this approach. This approach of identifying a particular transaction (or a group of transactions) with a higher risk score (or higher adjusted risk score) can be used for other types of customers, not just for MSBs.

Conventionally, a higher risk score implies a higher risk. There is no rule, however, that prohibits a person or business from defining a lower risk score for a higher risk. To avoid confusion, the description in this disclosure is based on the convention that a higher risk score means a higher risk. Furthermore, a risk score can be a negative value. A negative risk score implies a reduced risk based on this convention.

As described above, an MSB is just one example. Other types of businesses, e.g., pawn shops, car dealers, etc., can be monitored in a similar way. As a result, risk factor, risk score, adjusted risk factor, adjusted risk score, total risk score, and total adjusted risk score can be used in a variety of methods to detect suspicious money laundering activities even if there is no behavior change in any account.

In fact, a government or non-government agency such as OCC, FDIC, FRB, NCUA, FinCEN, Securities and Exchange Commission (SEC), Financial Industry Regulatory Authority (FINRA), etc., can monitor financial institutions such as banks, credit unions, insurance companies, stockbrokers, etc. based on similar approaches as described above for monitoring MSBs. Different risk factors, risk scores, adjusted risk factors and adjusted risk scores can be defined for this monitoring purpose.

In aspects of the present disclosure, a computer system uses many different risk factors to determine whether a financial institution has complied with regulatory requirements for filing SARs to report money laundering and terrorist financing cases. For example, these risk factors may include a number of SARs filed for money laundering and terrorist financing cases, category of the financial institution, business type of the financial institution, geographical area of the financial institution, country of the head office of the financial institution, nature of the business of the financial institution, product types of the business, services types of the business, structure of the business, customer profile of the financial institution, historical records, type of the transactions conducted, funds inflows, funds outflows, transactional pattern, number of transactions, amount of transactions, transactional volume, transactional frequency, transactional derivatives, locations of the transaction, time of the transaction, countries of the transactions, senders of money transfer transactions, locations of the senders, countries of the senders, nature of the senders, recipients of money transfer transactions, locations of the recipients, countries of the recipients, natures of the recipients, relationships, social status of the customers, political exposure of the customers, political exposure of the senders, political exposure of the recipients, historical transactions, etc. In fact, thousands of risk factors may be considered to determine the compliance risk of a financial institution.

In aspects of the present disclosure, the number of branches is used to adjust the risk factors and risk scores. In other aspects of the present disclosure, the asset size is used to adjust the risk factors and risk scores. Many other factors can also be used to adjust the risk factors and risk scores. In this current example, the "number of SARs filed" risk factor may have a negative value because the more SARs filed by the financial institution, the less chance that the financial institution has failed to file SARs.

In aspects of the present disclosure, a set of risk factors is adjusted based on the size of operations and used to identify a group of banks that have this set of adjusted risk factors. If a particular bank has a total adjusted risk score that is much higher than a reference value of the total adjusted risk scores of all banks having the same set of adjusted risk factors, the particular bank may have not fulfilled its compliance obligation of detecting and reporting suspicious money laundering and/or terrorist financing activities. The reference value comprises an average, a median, a mean, a mode, a weighted average, and/or other statistical values. To simplify the calculations, the standard group statistics such as mean, variance, standard deviation, etc. can be derived to facilitate such comparison among a group of entities.

Furthermore, different detection algorithms may be used to monitor different banks with different sets of risk factors. In aspects of the present disclosure, a set of risk factors is used to identify a group of banks having this set of risk factors, and a particular set of detection algorithms is used to detect possible oversights in compliance matters in this group of banks. Therefore, in aspects of the present disclosure, a set of detection algorithms is selected based on a set of risk factors associated with a group of banks for monitoring the group of banks.

In other aspects of the present disclosure, a set of risk factors is adjusted based on the size of operations and used to identify a group of banks that have this set of adjusted risk factors, and a particular set of detection algorithms are used to detect possible oversights in compliance matters in this group of banks. In other words, a set of detection algorithms is selected based on a set of adjusted risk factors associated with a group of banks to monitor the group of banks.

Although banks are used in the above example, the same set of methods can be used to monitor credit unions, stockbrokers, insurance companies, other financial institutions, and other types of businesses. Moreover, the monitoring scope is not limited to compliance with anti-money laundering and anti-terrorist financing matters. In fact, all types of matters of all types of businesses can be monitored by the methods described in the present disclosure by properly defining the risk factors, risk scores, adjusted risk factors, adjusted risk scores, and detection algorithms associated with such matters.

MSBs are also under pressure to comply with many laws and regulations. Unlike banks or credit unions, however, MSBs do not really know who their customers are. A typical MSB provides money services to any consumer who walks into its office. Even if the MSB collects identification information from all of its clients, an MSB may not be able to correctly identify money laundering activities. For example, it is possible that one consumer uses his Mexican Passport to conduct one money transfer transaction of $7,000 by paying an MSB cash in the morning, and uses his California driver license to conduct another money transfer transaction of $8,000 by paying the same MSB cash in the afternoon. Because two identification documents are used, this same consumer may be viewed as two different persons. The MSB may fail to file a Currency Transaction Report as required by law because more than $10,000 cash has been provided by the same consumer. If the MSB has multiple branches, this situation becomes even more complicated because the same consumer can walk into different branches to conduct transactions based on different identification documents.

In aspects of the present disclosure, a computer system compares the name, phone number, address, date of birth, etc. of all consumers who conducted transactions with an MSB to identify all transactions that may be conducted by the same consumer. After all transactions associated with a consumer have been identified, a computer system can detect suspicious money laundering activities associated with the consumer based on the transactions associated with the consumer.

In aspects of the present disclosure, a BSA Officer (e.g., a person tasked with investigating) investigates the detected case to determine whether it is a true money laundering case. The BSA Officer also reviews all historical cases associated with the consumer of the newly detected case. If the BSA Officer agrees that the detected case is a suspicious money laundering case, the computer system assists the BSA Officer to file a SAR with FinCEN. If the BSA Officer decides not to file a SAR, the BSA Officer enters a reason into the computer system to justify his decision for not reporting the detected case.

Sometimes, a bank receives a wire transfer from a client of corresponding bank A and resends the wire transfer to another client of corresponding bank B because corresponding bank A and corresponding bank B do not have a direct banking relationship. This situation often arises during international wire transfers because banks in two different countries may not have a direct banking relationship. This type of wire transfer is often referred to as intermediary wire transfer.

A bank that provides intermediary wire transfer services is exposed to a very high money laundering risk because senders and recipients of intermediary wire transfers are not customers of the bank. In addition, the bank may not know the real background of the senders and the recipients of the wire transfers. It is possible that a sender is a terrorist financier and a recipient is the terrorist. A bank that handles intermediary wire services may unknowingly become a channel for money laundering and terrorist financing.

In some configurations of the present disclosure, a computer system compares names, addresses, countries, phone numbers, email addresses, etc. of all senders and recipients of intermediary wire transfers and identifies the transactions associated with each sender and each recipient. In aspects of the present disclosure, if the computer system detects an unusually large number of wire transfers from the same sender, the sender and the recipients may be involved in money laundering or terrorist financing activities. If the computer system detects an unusually large aggregate amount of wire transfers from the same sender, the sender and the recipients may be involved in money laundering activities.

Similarly, if the computer system detects an unusually large number of wire transfers to the same recipient, the senders and the recipient may be involved in money laundering or terrorist financing activities. If the computer system detects an unusually large aggregate amount of wire transfers to the same recipient, the senders and the recipient may be involved in money laundering activities.

If the computer system detects that an unusual number of wire transfers are sent from the same sender to the same recipient, the sender and the recipient may be involved in money laundering or terrorist financing activities. If the computer system detects that an unusual aggregate amount of wire transfers is sent from the same sender to the same recipient, the sender and the recipient may be involved in money laundering or terrorist financing activities.

In aspects of the present disclosure, a BSA Officer investigates such a detected case to determine whether it is a true money laundering case. The BSA Officer also reviews all historical cases associated with the suspects of the newly detected case. If the BSA Officer agrees that there is suspicious money laundering activity, the computer system assists the BSA Officer to file a SAR to the FinCEN. If the BSA Officer decides not to file a SAR, the BSA Officer enters a reason into the computer system to justify his decision for not reporting such detected activities.

As a large percentage of the population is quickly aging, the Elder Abuse Reporting Act (EARA) was recently established in some states to protect elders who are unable to protect themselves. Very often, an elderly person may give money to a perpetrator because the elderly person is cheated by the perpetrator. Therefore, financial institutions are training frontline personnel to observe and report what they see as possible elder abuse cases. This human-based approach is not effective because transactions can be performed remotely and perpetrators can skillfully cover up their activities. Moreover, human workers are susceptible to errors and mistakes. It is ineffective to depend on human workers to detect and report elder abuse cases.

For many businesses, the date of birth information of their customers is stored inside a database. In aspects of the present disclosure, a computer system collects the date of birth information and identifies elderly persons who are older than a pre-defined age. A computer system monitors the transactions of all elderly persons and detects any change in the activities of these elderly persons.

For example, if an unusually large amount of funds is sent out from an account of an elderly person, the financial institution may want to investigate the purpose of the funds transfer. In aspects of the present disclosure, if a check with an unusually large amount is deposited into an account of an elderly person, the financial institution may want to investigate whether a fake check was given to the elderly person in exchange for his/her real money or assets. If there is an unusual transactional pattern, (e.g., unusual frequency or volume) in the account of an elderly person, the financial institution may want to investigate the transaction(s). If the account balance of an elderly person is decreasing rapidly, the financial institution may want to investigate the transactions associated with this account.

In aspects of the present disclosure, risk factors, risk scores, adjusted risk factors, adjusted risk scores, total risk scores, total adjusted risk score, statistical approach, and the methods to select detection algorithms described earlier can be applied to detect possible elder abuse cases. Because elder abuse is different from money laundering, a different set of risk factors and risk scores may be used for elder abuse detection. For example, these risk factors may include age of the person, sex of the person, income level of the person, appearance of the person, judgment about the person, personal conditions of the person, family conditions of the person, family members of the person, family members' conditions of the person, friends of the person, friends' conditions of the persons, historical records of the person, industry category of the person, geographical area of the person, country of the address of the person, profession of the person, nationality, type of the transaction conducted, balance of the accounts, funds inflow, funds outflow, transactional pattern, number of transactions, amount of transactions, transactional volume, transactional frequency, transactional derivative, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, many different risk factors may be considered to determine the elder abuse risk of a person.

For example, in aspects of the present disclosure, a risk factor is used to identify a group of elderly persons having the same risk factor. If a particular elderly person has a total risk score higher than a reference value derived from the total risk scores of all elderly persons having the same risk factor, the particular elderly person may become a victim of a potential elder abuse case. The reference value comprises an average, a median, a mean, a mode, a weighted average, and/or other statistical values. In other aspects of the present disclosure, a set of risk factors is used to identify a group of elderly persons who have this set of risk factors. If a particular elderly person has a total risk score higher than a reference value derived from the total risk scores of all elderly persons having the same set of risk factors, the particular elderly person may become a victim of a potential elder abuse case. The reference value comprises an average, a median, a mean, a mode, a weighted average, and/or other statistical values.

To simplify the calculations, the standard group statistical values such as mean, variance, standard deviation, etc. can be derived to facilitate such comparison among a group of entities. As a result, even if there is no behavior change in an account, a computer system can still detect a possible elder abuse case based on the above approach.

Very often, a business may have a Compliance Officer that is responsible for all regulatory compliance matters. In aspects of the present disclosure, an investigator (e.g., a Compliance Officer) investigates detected cases to determine whether true elder abuse cases have occurred. The Compliance Officer also reviews all historical cases associated with the elderly person of the newly detected case. If the Compliance Officer agrees that the case is a possible elder abuse case, the computer system assists the Compliance Officer in reporting the detected case. If the Compliance Officer decides not to report the detected case, the Compliance Officer enters a reason into the computer system to justify his decision for not reporting the detected case.

According to the Sarbanes-Oxley Act (SOX), certain companies (e.g., publicly listed companies) have to conduct internal control monitoring to prevent fraud committed by employees. Traditionally, such internal control monitoring is performed by human workers (e.g., auditors) that spend several months each year auditing the financial records of a business. Such a human-based approach is not effective because human workers are prone to errors and mistakes. Furthermore, because it takes a substantial amount of time to audit financial records, it may be too late to prevent a crime.

In aspects of the present disclosure, a computer system monitors accounting general ledger items and detects any unusual patterns (e.g., unusual frequency, volume, acceleration, etc.) related to the general ledger items to identify suspicious internal fraud activities. For example, if a traveling expense general ledger item has suddenly grown by 500% this month when it is compared with the past twelve-month history, some employees may have abused their rights and caused the unusual expenses.

In aspects of the present disclosure, a computer system compares the current value of an accounting general ledger item with a reference value derived from the historical values of the same accounting general ledger item for the past x months, where the value x is predefined. If the current value is larger than the reference value by a noticeable margin, some employee may have committed fraud. The reference comprises an average, a median, a mean, a mode, a weighted average, and/or other statistical values. Further investigation can be conducted to determine why the general ledger item value has deviated from its historical values.

In other aspects of the present disclosure, a computer system compares an employee's current activities with his historical activities to detect any change. For example, if a loan officer has issued an unusually larger number of loans per month in comparison to historical monthly numbers, this loan officer's activities may be suspicious. If a loan officer has issued a loan with a loan amount unusually larger than the historical amounts, this loan officer's activities may be suspicious. If a loan officer has issued an unusual larger aggregate amount of loans per month compared to the historical monthly aggregate amounts, this loan officer's activities may be suspicious.

Very often, an activity can be measured by a value referred to as an activity value. For example, a loan officer's activities can be measured by the number of loans, largest amount of loan, aggregate amount of loans, average amount per loan, number of loans to the same customer, number of changes on loan records, number of changes on loan records with the same customer, frequency of changes on loan records, frequency of changes on loan records with the same customer, types of loans, etc. A bank teller's activities can be measured by the total number of transactions, aggregate amount of transactions, largest amount of transaction, average amount per transaction, types of transactions, the number of customers transacting business with the teller, the average number of transactions per customer, the number of transactions with the same customers, number of changes on customer records, number of changes on customer records with the same customer, frequency of changes on customer records, frequency of changes on customer records with the same customer, etc. In aspects of the present disclosure, a computer system compares the current value of an activity with a reference value derived from the historical values of the same activity. When the current value is larger than the reference value by a noticeable margin, the person who conducted the activity may have committed fraud. Further investigation can be conducted to determine whether this person has truly committed fraud. The reference value comprises an average, a median, a mean, a mode, a weighted average, and/or other statistical values.

In aspects of the present disclosure, a computer system compares an employee's activity with the activities of other employees who have the same role in the business. For example, if one teller (or loan officer, etc.) behaves very differently from other tellers (or loan officers, etc.) in the same branch, this teller (or loan officer, etc.) may have conducted some suspicious activities.

In aspects of the present disclosure, a computer system compares an activity value of a particular employee with a reference value derived from all the activity values for the same activity of all employees who have the same responsibilities as the particular employee. When the activity value of the particular employee noticeably deviates from the reference value, the particular employee may have committed fraud. Further investigation can be conducted to determine whether this employee has truly committed fraud. The reference value comprises an average, a median, a mean, a mode, a weighted average, and/or other statistical values.

When one employee is compared with a group of employees, the statistical approach used in the flight attendant example described earlier can be applied. For example, a comprehensive set of risk factors associated with employees can be identified and a risk score is assigned to each risk factor. As a result, each employee has a total risk score that is obtained from a mathematical transformation (e.g., summation) of all risk scores associated with the employee.

The set of risk factors for detecting fraud associated with employees may be different from the set of risk factors to detect other type of suspicious activities, such as money laundering. For example, the risk factors for detecting employee fraud may include job type of the employee, education level of the employee, income level of the employee, length of employment at the current job, performance review records, employment history, duration of each employment in the employment history, reasons for termination of each employment in the employment history, age of the employee, sex of the employee, personal conditions of the employee, family conditions of the employee, family members of the employee, family members' conditions of the employee, friends' conditions of the employees, historical records of the employee, type of work performed, number of transactions performed, amount of transactions performed, largest amount of transaction, number of transactions with a particular counter party, amount of transactions with a particular counter party, number of changes of crucial records, number of changes of crucial records associated with a particular counter party, geographical area of the employee's home, geographical area of the employee's office, country of the address of the employee, nationality, type of the transaction conducted, balance of the accounts, funds inflow, funds outflow, transactional pattern, number of transactions, amount of transactions, transactional volume, transactional frequency, transactional derivative, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, numerous risk factors may be considered to determine the employee fraud risk. In aspects of the present disclosure, different sets of risk factors may be used to detect different types of suspicious activities.

In aspects of the present disclosure, when the total risk score of a particular employee is higher than the mean of total risk scores of all employees having the same risk factor as the particular employee has by a noticeable margin, this particular employee may have conducted suspicious activities. The noticeable margin can be set in terms of a number of the standard deviations or other reference values.

Instead of one risk factor, multiple risk factors can be used to improve the accuracy of the detection result. In aspects of the present disclosure, if the total risk score of a particular employee is higher than the mean of total risk scores of all employees having the same set of risk factors as the particular employee has by a noticeable margin, this particular employee may have conducted some suspicious activities. In one example, the noticeable margin is set in terms of a number of the standard deviations or other reference values.

In fact, by identifying the risk factors associated with a group of entities and properly assigning a risk score to each risk factor, a statistical approach based on the total risk score of each entity for identifying a suspicious activity of a particular entity can be applied to many other situations in addition to money laundering, terrorist financing, and employee fraud.

In aspects of the present disclosure, many risk factors are associated with a group of entities. Each of the risk factors can be assigned a risk score. Each entity can be given a total risk score based on a mathematical transformation, such as a summation. For example, other possible mathematical transformations include, but are not limited to multiplication, division, and subtraction, summation of squares, square of summation, a mix of the above, and other like ways of combining risk scores.

In aspects of the present disclosure, when the total risk score of a particular entity is higher than the mean of total risk scores of all entities having the same risk factor as the particular entity has by a predefined margin, this particular entity may have conducted some suspicious activities. The predefined margin can be set in terms of a number of the standard deviations or other reference values.

In other aspects of the present disclosure, if the total risk score of a particular entity is higher than the mean of total risk scores of all entities having the same set of risk factors as the particular entity has by a predefined margin, this particular entity may have conducted some suspicious activities In aspects of the present disclosure, a computer system identifies one transaction (or a group of transactions) that has caused the particular entity to have a total risk score that is higher than the mean of total risk scores of all entities. Such a transaction (or a group of transactions) may be a suspicious activity.

The noted statistical approach is just one way of managing risks. Many other group comparison methods can also be used. Furthermore, suspicious activities may not be limited to illegal or prohibited activities. An activity becomes suspicious because it is different from normal activities. It may be harmless or even possibly an activity with good intentions. Therefore, investigation is often required to make the final determination of whether to report the detected case.

In aspects of the present disclosure, a responsible person investigates a newly detected case to determine whether it is illegal. The responsible person also reviews all historical cases associated with the suspect(s) of the newly detected case. When the responsible person agrees that the detected case is illegal, the computer system assists the responsible person to report the detected case. When the responsible person decides not to report the detected case, the responsible person enters a reason into the computer system to justify his/her decision for not reporting the detected case.

After the 9/11 tragedy, the U.S. Congress passed the Unlawful Internet Gambling Enforcement Act (UIGEA) because online gambling can be a vehicle for conducting money laundering and terrorist financing activities. Regulation GG was established in response to the Unlawful Internet Gambling Enforcement Act. According to Regulation GG, a financial institution needs to ask questions during the account opening process as to whether a new customer will conduct any online gambling activity. Because perpetrators know online gambling is illegal, they will lie during the account opening process. As a result, the "question asking" approach defined in Regulation GG is simply a formality. However, Regulation GG has specifically stated that Regulation GG does not modify the obligation of a financial institution to file a SAR under the Bank Secrecy Act.

In other words, if a perpetrator lied during the account opening process and actually conducts an illegal online gambling business, the financial institution has the obligation to report the case to FinCEN through a SAR. In aspects of the present disclosure, a computer system compares the senders and recipients of all funds transfer transactions during a period of time. If a customer has sent a large amount of money to a recipient and has also received a large amount of money from the same recipient during a period of time, such transactions may possibly be deposits of wager funds and payments for money earned from gambling activities between an online gambler and an online gambling organization. The computer system detects such cases as possible illegal online gambling cases. Once a case is detected, further investigation is required.

In aspects of the present disclosure, a computer system detects a customer as a possible online gambling organization when the computer system detects a large number of transactions with large dollar amounts associated with the customer because an online gambling organization typically deals with a large amount of money and a large number of clients. The computer system detects such a case as a possible illegal online gambling case. Once a case is detected, further investigation is required.

In aspects of the present disclosure, a computer system compares a list of known names of online gambling organizations with the senders and the recipients of funds transfer transactions associated with a customer. If there is a match, the customer may be involved in online gambling activities. The computer system detects this case as a possible illegal online gambling case. Once a case is detected, further investigation is required.

In addition to the noted transactional pattern monitoring, group comparison methods described earlier can also be applied to detect possible illegal online gambling activities. In aspects of the present disclosure, all risk factors related to online gambling are identified. For example, these risk factors may include due diligence results of the customer, length of the account history, industry category of the customer, business type of the customer, number of name matches with gambling organizations in transactions, geographical area of the customer, country of the head office of the customer, nature of the business of the customer, product types of the business, services types of the business, structure of the business, profession of the customer, nationality, historical records, type of the transaction conducted, balance of the accounts, funds inflow, funds outflow, transactional pattern, number of transactions, amount of transactions, transactional volume, transactional frequency, transactional derivative, number of charge backs, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, many different risk factors may be considered to determine online gambling risk. As explained earlier in this disclosure, adjusted risk factors can also be used so that adjusted risk scores can be applied based on the size of operations.

In aspects of the present disclosure, a risk factor is used to identify a group of customers that have the same risk factor. When a particular customer has a total risk score higher than a reference value derived from the total risk scores of all customers with the same risk factor, the particular customer may be involved in illegal online gambling. In other aspects of the present disclosure, a set of risk factors is used to identify a group of customers who have this set of risk factors. If a particular customer has a total risk score higher than a reference value derived from the total risk scores of all customers with the same set of risk factors, the particular customer may be involved in illegal online gambling. The reference value comprises an average, a median, a mean, a mode, a weighted average, and/or other statistical values. To simplify the calculations, the standard group statistics such as mean, variance, standard deviation, etc. can be derived to facilitate the comparison among a group of customers.

In aspects of the present disclosure, a responsible person (or the BSA Officer) investigates the detected case to determine whether it is a true online gambling case. The BSA Officer also reviews all historical cases associated with the suspect of the newly detected case. When the BSA Officer agrees that the detected case is a possible illegal online gambling case, the computer system assists the BSA Officer in filing a SAR to the FinCEN. When the BSA Officer decides not to file a SAR, the BSA Officer enters a reason into the computer system to justify his decision for not reporting the detected case.

The U.S. Congress has passed the Fair and Accurate Credit Transactions Act (FACT Act) to protect consumers. In particular, businesses are expected to identify and report identity theft cases. Financial institutions are also expected to file a SAR when identity theft cases are detected.

In aspects of the present disclosure, a computer system monitors consumer reports and other available information to detect a fraud or active duty alert that is included in a consumer report, a notice of a credit freeze, and/or a notice of an address discrepancy. If a suspicious activity case is detected, the computer system makes the detected case available for a responsible person to review.

In aspects of the present disclosure, a computer system monitors consumer reports and available information to detect a consumer report indicating a pattern of activity that is inconsistent with the history and usual pattern of activity of an applicant or customer. For example, a recent and significant increase in the volume of inquiries, an unusual number of recently established credit relationships, a material change in the use of credit, especially with respect to recently established credit relationships, or an account that was closed for cause or identified for abuse of account privileges by a financial institution or creditor may represent an unusual pattern. If a suspicious activity case is detected, the computer system makes the detected case available for a responsible person to review.

In aspects of the present disclosure, a computer system detects whether documents provided for identification appear to have been altered or forged. If a suspicious activity case is detected, the computer system makes the detected case available for a responsible person to review.

In aspects of the present disclosure, a computer system detects whether the photograph or physical description on the identification is not consistent with the appearance of the applicant or customer presenting the identification. If a suspicious activity case is detected, the computer system makes the detected case available for a responsible person to review.

In aspects of the present disclosure, a computer system detects whether other information on the identification is inconsistent with information provided by the person opening a new account or presenting the identification. If a suspicious activity case is detected, the computer system makes the detected case available for a responsible person to review.

In aspects of the present disclosure, a computer system detects whether other information on the identification is inconsistent with readily accessible information that is on file with the financial institution or creditor, such as a signature card or a recent check. If a suspicious activity case is detected, the computer system makes the detected case available for a responsible person to review.

In aspects of the present disclosure, a computer system detects whether an application appears to have been altered or forged, or gives the appearance of having been destroyed and reassembled. If a suspicious activity case is detected, the computer system makes the detected case available for a responsible person to review.

In aspects of the present disclosure, a computer system determines whether personal identifying information provided is inconsistent when compared against external information sources used by the financial institution or creditor. For example, the address may not match any address in the consumer report, or the Social Security Number (SSN) has not been issued, or is listed on the Social Security Administration's Death Master File. If a suspicious activity case is detected, the computer system makes the detected case available for a responsible person to review.

In aspects of the present disclosure, a computer system determines whether some personal identifying information provided by the customer is inconsistent with other personal identifying information provided by the customer. For example, there may be a lack of correlation between the SSN range and date of birth. If a suspicious activity case is detected, the computer system makes the detected case available for a responsible person to review.

In aspects of the present disclosure, a computer system determines whether personal identifying information provided is associated with known fraudulent activity as indicated by internal or third-party sources used by the financial institution or creditor. For example: the address on an application may be the same as the address provided on a fraudulent application; or the phone number on an application may be the same as the number provided on a fraudulent application. If a suspicious activity case is detected, the computer system makes the detected case available for a responsible person to review.

In aspects of the present disclosure, a computer system determines whether personal identifying information provided is of a type commonly associated with fraudulent activity as indicated by internal or third-party sources used by the financial institution or creditor. For example, the address on an application may be fictitious, a mail drop, or a prison; or the phone number may be invalid, or associated with a pager or answering service. If a suspicious activity case is detected, the computer system makes the detected case available for a responsible person to review.

In aspects of the present disclosure, a computer system determines whether the Social Security Number provided is the same as that submitted by other persons opening an account or other customers. If a suspicious activity case is detected, the computer system makes the detected case available for a responsible person to review.

In aspects of the present disclosure, a computer system determines whether the address or telephone number provided is the same as or similar to the account number or telephone number submitted by an unusually large number of other persons opening accounts or other customers. If a suspicious activity case is detected, the computer system makes the detected case available for a responsible person to review.

In aspects of the present disclosure, a computer system determines whether the person opening the account fails to provide all required personal identifying information on an application or in response to notification that the application is incomplete. If a suspicious activity case is detected, the computer system makes the detected case available for a responsible person to review.

In aspects of the present disclosure, a computer system determines whether personal identifying information provided is inconsistent with personal identifying information that is on file with the financial institution or creditor. If a suspicious activity case is detected, the computer system makes the detected case available for a responsible person to review.

In aspects of the present disclosure, a computer system determines whether the person opening the account cannot provide authenticating information such as answers to challenge questions, which are beyond that which generally would be available from a wallet or consumer report. If a suspicious activity case is detected, the computer system makes the detected case available for a responsible person to review.

In aspects of the present disclosure, a computer system determines whether there is unusual use of, or suspicious activity related to, the account. If a suspicious activity case is detected, the computer system makes the detected case available for a responsible person to review.

In aspects of the present disclosure, a computer system determines whether, shortly following the notice of a change of address for an account, the institution or creditor receives a request for a new, additional, or replacement card or a cell phone, or for the addition of authorized users on the account. If a suspicious activity case is detected, the computer system makes the detected case available for a responsible person to review.

In aspects of the present disclosure, a computer system determines whether a new revolving credit account is used in a manner commonly associated with known patterns of fraud. For example: the majority of available credit is used for cash advances or merchandise that is easily convertible to cash (e.g., electronics equipment or jewelry); or the customer fails to make the first payment or makes an initial payment but no subsequent payments. If a suspicious activity case is detected, the computer system makes the detected case available for a responsible person to review.

In aspects of the present disclosure, a computer system determines whether an account is used in a manner that is inconsistent with established patterns of activity on the account There is, for example: nonpayment when there is no history of late or missed payments, a material increase in the use of available credit, a material change in purchasing or spending patterns, a material change in electronic fund transfer patterns in connection with a deposit account; or a material change in telephone call patterns in connection with a cellular phone account. If a suspicious activity case is detected, the computer system makes the detected case available for a responsible person to review.

In aspects of the present disclosure, a computer system determines whether an account that has been inactive for a reasonably lengthy period of time is used (taking into consideration the type of account, the expected pattern of usage and other relevant factors). If a suspicious activity case is detected, the computer system makes the detected case available for a responsible person to review.

In aspects of the present disclosure, a computer system determines whether mail sent to the customer is returned repeatedly as undeliverable although transactions continue to be conducted in connection with the customer's account. If a suspicious activity case is detected, the computer system makes the detected case available for a responsible person to review.

In aspects of the present disclosure, a computer system closely reviews all transactions when the financial institution or creditor is notified that the customer is not receiving paper account statements. If a suspicious activity case is detected, the computer system makes the detected case available for a responsible person to review.

In aspects of the present disclosure, a computer system closely reviews all transactions when the financial institution or creditor is notified of unauthorized charges or transactions in connection with a customer's account. If a suspicious activity case is detected, the computer system makes the detected case available for a responsible person to review.

In aspects of the present disclosure, a computer system closely reviews all transactions when the financial institution or creditor is notified by a customer, a victim of identity theft, a law enforcement authority, or any other person that it has opened a fraudulent account for a person engaged in identity theft. If a suspicious activity case is detected, the computer system makes the detected case available for a responsible person to review.

In addition to monitoring transactional patterns as described above, group comparison methods described earlier can also be applied to detect possible identity theft cases.

Identity theft cases can be classified into two primary categories. The first category includes cases in which a victim's account, financial instrument, or identification document is stolen by a fraudster to conduct activities. Under such circumstances, as described earlier, a computer system can detect activities that deviate from the expected activities of the victim, which can be established from the historical activities of the victim.

The second category includes cases in which a victim's identity is stolen to open a new account and/or start some new activities. Under such circumstances, the victim is out of the picture from day one. Because there is no true historical activity of the victim, the expected activities of the victim cannot be correctly established for fraud prevention purposes. Although somebody can ask the perpetrator some questions and collect answers during the account opening process with the intention of establishing expected activities of the perpetrator, this question-and-answer approach may not work because the perpetrator knows how to answer questions for establishing his expected activities without triggering any alert.

To detect identity theft when there is no true historical activity available, in aspects of the present disclosure, all risk factors of a new account or new customer are identified. For example, these risk factors may include due diligence results of the customer, prior records of the customer with other businesses, credit report records of the customer, industry category of the customer, business type of the customer, geographical area of the customer, country of the address of the customer, nature of the business of the customer, product types of the business, services types of the business, structure of the business, profession of the customer, nationality, historical records, type of the transaction conducted, balance of the accounts, funds inflow, funds outflow, transactional pattern, number of transactions, amount of transactions, transactional volume, transactional frequency, transactional derivative, number of charge backs, location of the transaction, time of the transaction, country of the transaction, sender of a money transfer transaction, location of the sender, country of the sender, nature of the sender, recipient of a money transfer transaction, location of the recipient, country of the recipient, nature of the recipient, relationships, social status, political exposure, historical transactions, etc. In fact, numerous risk factors may be considered to determine the identity theft risk.

In aspects of the present disclosure, a risk factor is used to identify a group of persons who have the same risk factor. If a particular person has a total risk score which is much higher than a reference value derived from the total risk scores of all persons who have the same risk factor, the particular person may be involved in an identity theft case. A set of risk factors can be used to identify a group of persons who have this set of risk factors. If a particular person has a total risk score higher than a reference value derived from the total risk scores of all persons with the same set of risk factors, the particular person may be involved in an identity theft case. The reference value comprises an average, a median, a mean, a mode, a weighted average, and/or other statistical values. To simplify the calculations, group statistics such as mean, variance, standard deviation, etc. can be derived to facilitate such comparison among a group of persons.

In aspects of the present disclosure, a responsible person (or the Compliance Officer) investigates the detected case to determine whether it is a true identity theft case. The Compliance Officer also reviews all historical cases associated with the newly detected case. If the Compliance Officer agrees that the case is a possible identity theft case, the computer system assists the Compliance Officer to file a SAR with the FinCEN. If the Compliance Officer decides not to file a SAR, the Compliance Officer enters a reason into the computer system to justify his decision for not reporting the detected activities.

The Office of Foreign Assets Control (OFAC) has a very simple rule stating that it is illegal to have any business transaction with any entity on the list published by the Office of Foreign Assets Control. This list is commonly referred to as the "OFAC List." This rule applies to all U.S. persons and entities, including financial institutions. For example, Wal-Mart was fined by the OFAC for a violation of this rule. U.S. financial institutions that are under the tightest regulatory monitoring naturally must strictly comply with this rule.

In the beginning, it was a very simple rule. The implications of this rule, however, have become much more complicated over the past 20 years. A common issue occurs when people misspell (including mistype, mispronounce, etc.) their names. Even if an entity's name was misspelled but is on the OFAC List, a financial institution still has the obligation of identifying this entity as an entity on the OFAC List (generally referred to as an OFAC match).

The natural question is how much deviation from the original names on the OFAC List is classified as "misspelling." The OFAC and government regulators have never given any precise guidance for answering this question. A very common exercise an examiner or auditor may perform is the use a notorious name like "Osama bin Laden" as a sample to test a business. In general, a business is supposed to identify all business transaction associated with "Osama bin Laden," "Osama Laden," "Osama Laten," "Laten Osama," "Latin Obama," etc. as possible OFAC matches. Now, if the scope of deviation from the OFAC names is further broadened, whether a financial institution is supposed to identify a single word "Obama" which is a former U.S. president's name as a possible OFAC match is questionable. One can easily tell that such a simple OFAC rule has created a great deal of confusions in recent years.

In aspects of the present disclosure, an "OFAC Match Scale" is used to measure the degree of deviation. A value referred to as "Relative Correlation" ("RC value") may be generated by the OFAC Match Scale to measure the similarity between two names. For example, if a name has an RC value of 100%, it exactly matches an OFAC name on the OFAC list. If a name has an RC value of 97%, it may be different from an OFAC name on the OFAC list by one letter or two letters. If a name has an RC value of 0%, it is totally different from all OFAC names on the OFAC list.

In aspects of the present disclosure, the length of the name also affects the RC value. For example, if a name is different by one letter from an OFAC name, which has 25 letters, the RC value may be 96%, while another name may have an RC value of 90% although it is also different by just one letter from another OFAC name, which has 10 letters.

Some long words, such as international, incorporation, limited, company, organization, etc., are commonly used for business names, and such words also exist in the OFAC names list. As a result, these long words generate higher RC values for those businesses that use these long words in their names. To avoid unnecessary false positives, in aspects of the present disclosure, a commonly used long word may be replaced with a short word to reduce its impact on the RC value. For example, the word "international" can be replaced with "intl."

In addition, some countries do not use the descriptions "first name" and "last name." As a result, a person may use a different sequence of names when this person is asked to provide a first name and a last name. "Osama Laden" may become "Laden Osama." In aspects of the present disclosure, an OFAC match scale identifies a possible "off-sequence" OFAC match.

Moreover, some words are commonly used in certain cultures without contributing distinct differentiations. For example, "bin" means "son of" and "binti" means "daughter of" in the Muslim culture. Official names in the Muslim culture have either "bin" or "binti" in the name. For example, if a Muslim father has the name "John," his daughter "Mary" will have an official name of "Mary binti John" and his son "David" will have an official name "David bin John." Under such circumstances, the words "bin" and "binti", which are commonly used in Muslin names, will create "false similarity" between two Muslim names. To provide a more scientifically correct result, in aspects of the present disclosure, the OFAC match scale may exclude these kinds of "trivial words" before the calculation of the RC value. Sometimes, a name may be translated into English based on sound. Therefore, in aspects of the present disclosure, the OFAC match scale should measure the match of sound to determine the RC value.

In aspects of the present disclosure, a financial institution decides what threshold to use when it conducts an OFAC check. For example, if a financial institution uses a threshold of 75%, a possible OFAC match is detected when a name has an RC value of 75% or higher. Because each financial institution may have a different risk exposure from others, it is very likely that X is the best threshold for financial institution A while Y is the best threshold for financial institution B. As a general guideline, the X or Y value is selected in accordance with a risk-based principle.

In general, the higher threshold a financial institution uses, the fewer possible OFAC matches the financial institution detects. This saves time during the review process because more false positives are avoided. If the threshold is too high, however, it is possible that the financial institution may miss a reasonable deviation from an OFAC name, such as "Osama bin Laden." If the threshold is too low, it is possible that the financial institution may falsely detect many of its clients as possible OFAC matches. The best practice is to find a tradeoff between "too many possible OFAC matches to review" and "missing real OFAC name deviations caused by misspellings."

In aspects of the present disclosure, a user can randomly select a number of OFAC names from the OFAC List and find out how the OFAC match scale responds to deviations from these selected OFAC names. A user can then determine when he calls a "possible OFAC match" based on this test. It is advisable to keep this test result for future auditors and examiners to review.

There is a possibility that a particular name is very close to an OFAC name. For example, American Express, a very reputable credit card company, is often falsely detected as an OFAC match because of the word "express." Therefore, to avoid this type of frequent false positive, in aspects of the present disclosure, an exempt list is generated by users to include those well-known reputable businesses on the exempt list. The businesses on the exempt list are classified as false positives, either automatically by the computer or manually by users, when they are detected as possible OFAC matches.

Very often, a business may have an OFAC officer that handles all OFAC related matters. In aspects of the present disclosure, if an OFAC Officer (e.g., a responsible person) of a financial institution detects a possible OFAC match with an RC value over a pre-defined threshold, the OFAC Officer investigates whether this is a true OFAC match. If the OFAC Officer believes that it is a true match, the OFAC Officer should handle the case according to the guidelines issued by the Office of Foreign Assets Control. According to the OFAC regulations, in some cases, the OFAC Officer may need to block the transaction so that the person on the OFAC list does not benefit from the transaction. If the OFAC Officer decides that the OFAC match is a false positive after his investigation, the OFAC Officer should enter a reason into the computer system to justify his reason for not reporting such OFAC match case to the Office of Foreign Assets Control and/or not block the transaction.

Section 314(a) of the USA PATRIOT Act requires financial institutions to detect matches of names on a 314(a) list, which is periodically published by the FinCEN. The computer system can handle the 314(a) compliance matters using a similar approach to the handling of the OFAC compliance matters, as described above.

Sometimes, a 314(a) list also includes additional personal identification information, such as identification document number, date of birth, address, etc. In aspects of the present disclosure, in addition to the methods described above for detecting possible OFAC matches, personal identification information, such as identification document number, address, and/or date of birth, etc. is used by the computer system to determine whether a detected 314(a) match is a true match. This approach can reduce false positives in the 314(a) matching process.

In aspects of the present disclosure, if a Compliance Officer (e.g., a responsible person) of a financial institution detects a possible 314(a) match with an RC value over a pre-defined threshold, the Compliance Officer investigates whether this is a true 314(a) match. In aspects of the present disclosure, if the Compliance Officer believes it is a true match, the Compliance Officer reports the 314(a) match case to the FinCEN. If the Compliance Officer decides that the 314(a) match is a false positive after his investigation, the Compliance Officer enters a reason into the computer system to justify his reason for not reporting the 314(a) match to the FinCEN.

In aspects of the present disclosure, the computer system receives customer information and transactional data from the core data processing system of the financial institution or other data processing systems that may be internal to or external from the financial institution. The customer information may include background information.

In aspects of the present disclosure, the computer system receives information regarding suspicious activities observed by frontline personnel. For example, the computer system may receive information input from the frontline personnel. The computer system may also receive information provided by other internal or external sources.

Although "financial institutions" are used as examples for easy explanation, the present disclosure also applies to other types of businesses. In general, any business that needs to comply with laws and regulations may employ an intelligent alert system as described in the present disclosure.

In aspects of the present disclosure, the risk score of a risk factor or a degree of a risk factor can be assigned by a computer software module, a person who designs or tunes the system, or a user who uses the system. In most cases, the absolute value of the risk score is not crucial and the relative relationships among all risk scores may be more important.

Moreover, a subject's total risk score should only fluctuate within a reasonable range. In aspects of the present disclosure, if a subject's total risk score has suddenly increased and is beyond a threshold, the subject may have conducted a suspicious or unusual activity. That is, if a difference between a subject's first total risk score and second total risk score is greater than an increase threshold, where the first total risk score is less than the second total risk score, the subject may have conducted a suspicious or unusual activity. In other aspects of the present disclosure, if a subject's total risk score has suddenly decreased tremendously, the subject may also have conducted a suspicious or unusual activity. That is, if a difference between a subject's second total risk score and first total risk score is greater than a decrease threshold, where the first total risk score is greater than the second total risk score, the subject may have conducted a suspicious or unusual activity. Therefore, an alert will be sent to an investigator, a BSA Officer, a Compliance Officer, or another type of responsible people who will investigate the subject when its total risk score has suddenly increased or decreased tremendously.

The observed data of a subject may fluctuate from time to time. Thus, the intelligent alert system may permit a certain range of fluctuation of the subject's total risk score to avoid false alerts. In aspects of the present disclosure, the intelligent alert system increases a subject's permissible total risk score fluctuation range when the subject's total risk score is lower than a threshold. In other aspects of the present disclosure, the intelligent alert system decreases a subject's permissible total risk score fluctuation range when the subject's total risk score is higher than a threshold. The permitted fluctuation range may be determined (e.g., set) by a software module, a person who designs the system, a person who tunes the system, or a person who uses the system.

For example, if a subject's total risk score is higher than the mean of the total risk scores of all subjects plus a certain number of standard deviations of all risk scores, such as four standard deviations, the intelligent alert system may modify the subject's permissible total risk score fluctuate range to be within half a standard deviation without triggering an alert. In another example, if a subject's total risk score is within the mean of the total risk scores of all subjects plus a certain number of standard deviations, such as three standard deviations, the intelligent alert system may permit the subject's total risk score to fluctuate within a range of one standard deviation without triggering an alert.

In yet another example, if a subject's total risk score is within the mean of the total risk scores of all subjects plus a certain number of standard deviations, such as two standard deviations, the intelligent alert system may permit the subject's total risk score to fluctuate within a range of one and a half standard deviations without triggering an alert. In still yet another example, if a subject's total risk score is within the mean of the total risk scores of all subjects plus a certain number of standard deviations, such as one standard deviation, the intelligent alert system may permit the subject's total risk score to fluctuate within a range of two standard deviations without triggering an alert.

In the field of machine learning, a negative is a set of data that has not triggered an alert. A true negative is a set of data that has not triggered the alert and does not comprise a true case for triggering the alert. A false negative is a set of data that has not triggered the alert but comprises a true case for triggering the alert that the system has missed. As an example, a false negative money laundering case may cause a financial institution to be penalized by the U.S. government if the false negative case is discovered by the U.S. government Therefore, it is desirable to prevent false negatives in an alert system specified to prevent money laundering (e.g., anti-money laundering alert system).

For an anti-money laundering alert system in a U.S. financial institution, a true money laundering case is reported to FinCEN, a U.S. government organization. FinCEN has a set of communication protocols. Financial institutions in the U.S. can report cases to FinCEN by sending a file from the anti-money laundering alert system to the computer system at FinCEN based on FinCEN's communication protocols.

Conventionally, rule-based systems are used to detect suspicious activities and each rule may trigger an alert. Many financial institutions have used the rule-based approach, which can trigger numerous alerts. For example, there are over two hundred countries in the world. If a financial institution uses a rule-based approach to monitor the wire transfers to, or from, each country, the financial institution may have over two hundred branches at the country decision node of the decision tree. As another example, there are thousands of different industries. If a financial institution uses the rule-based approach to monitor the wire transfers to, or from, each industry, the financial institution may have thousands of branches at the industry decision node of the decision tree. Country and industry are two of many risk categories that have money laundering risks. Similarly, a wire transfer is one of many types of transactions that have money laundering risk. For example, cash, check, ACH, ATM, credit card, debit card, letter of credit, etc., are other possible types of transactions.

There are many money laundering risk factors. There are numerous (e.g., millions) of possible combinations of branches to form a path from the root of a decision tree to the leaf nodes of the decision tree. In other words, a rule-based system may use millions of rules to cover the entire scope of money laundering risk to detect suspicious money laundering activities. A rule-based system with a limited number of rules may have an increased number of false negatives (e.g., the system has missed true money laundering cases) and many false positives (e.g., the leaf nodes of the decision tree have an increased number of impurities and cannot achieve the goal of classification). Due to the number of false negatives and false positives when a rule-based approach is used, financial institutions hire investigators to review a large number of alerts. It is difficult for financial institutions to mitigate all false negatives with a rule-based system.

In the field of machine learning, conventional systems consider an accuracy of 70% as satisfactory. It is difficult, if not impossible, to train a machine learning model to have high accuracy, such as 100% accuracy. Unfortunately, although the 70% accuracy may be good for some purposes, this 70% target cannot satisfy the regulatory standards, such as those set by the U.S. government. As discussed, a financial institution may receive a severe regulatory penalty if it does not detect certain activity, such as money laundering. As such, a financial institution will not use an alert system with 70% accuracy. Therefore, conventional machine learning models are not satisfactory for an intelligent anti-money laundering alert system.

According to aspects of the present disclosure, the intelligent anti-money laundering alert system uses a risk-scoring approach. Each risk factor or a degree of a risk factor may be similar to a branch in a rule-based system. As such, the risk scoring process for producing a total risk score from many risk factors, as described in the present disclosure, may consolidate the information from many rules into the total risk score. For example, if a total risk score is generated from 10,000 risk factors, a user only needs to pay attention to those alerts that have the total risk score over a threshold without the need to evaluate each of the 10,000 risk factors. If a rule-based approach is used, each risk factor may have two possible outcomes, matched or not-matched. The total number of possible combinations of outcomes for 10,000 risk factors is two (2) to the power 10,000 (e.g., $2^{10,000}$). Therefore, an evaluation based on the total risk score has effectively replaced the need to evaluate each of the two (2) to the power 10,000 (e.g., $2^{10,000}$) possible outcomes. Because these $2^{10,000}$, outcomes could potentially generate $2^{10,000}$ different types of alerts, the intelligent anti-money laundering alert system can avoid at least $2^{10,000}$ alerts. Therefore, the intelligent anti-money laundering alert system is an improvement in view of the conventional rule-based system.

Although one total risk score can replace many rules, it may not replace all rules. For example, if a person frequently deposits a certain amount of cash (e.g., $9,900), which is slightly below the CTR reporting threshold of $10,000, the financial institution is expected to report this person to Financial Crimes Enforcement Network (FinCEN) as a structuring case. It is difficult to detect a structuring case accurately based on the total risk scores. Therefore, an alert system based on the risk score based technology may include some rules in addition to the criteria based on the risk scores.

In aspects of the present disclosure, the intelligent anti-money laundering alert system uses risk score based scenarios to replace rules. In one example, the intelligent anti-money laundering alert system may use approximately twenty to thirty scenarios. The scenarios may include both risk score based scenarios and non-risk score based scenarios.

In addition to, or alternate from, the scenarios, other conditions may be used to generate an alert. For example, a computer system, such as a machine learning network, may be trained to generate a model. After training, the discriminant used by the model may be converted into an if-then conditional format to trigger alerts.

For the purposes of this disclosure, a scenario may be defined as a condition or a set of conditions that can trigger an alert or can be used to classify a subject into a category for a particular purpose. For example, a customer with a total risk score within a certain range may not trigger an alert. Still, in this example, the total risk score can classify the customer into a specific risk category, such as high risk, medium risk, or low risk. As another example, a customer that was previously a suspect in a suspicious activity report (SAR) may not trigger an alert. In this example, the customer may be classified into a specific category, such as prior SAR suspect or another similar category. As another example, a customer matched with the OFAC list, the 314(a) list, the Political Exposed Person list, and/or other lists may be classified in one or more categories.

A scenario may consist of a rule, a set of rules, a criterion, or a set of criteria, based on rules, facts, behavior patterns, risk scores, risk dimensions, total risk scores, special categories, mathematic models, and/or machine learning models. The scenario may trigger an alert by using a rule-based method, a behavior-based method, a risk-based method, a model-based method, and/or a machine learning-based method (e.g., an artificial intelligence-based method). An intelligent alert system may include one or more scenarios.

As discussed, an alert may be triggered by a scenario. The scenario may be flagged when one or more conditions are satisfied. A potential case that has triggered an alert may be referred to as a positive. The potential case may include one or more alerts. Therefore, the cause for the potential case may be one or more scenarios. The potential case, or the positive, may be investigated. A true positive may refer to a potential case (e.g., positive) that is a true case. If the investigation indicates that the potential case is not a true case, the potential case may be referred to as a false positive. Consequently, the false positive may be dismissed and the associated alerts may be dismissed as false alerts. The true positive may be reported to an authority, such as FinCEN or law enforcement.

In other configurations, a posterior probability may be estimated via a Bayesian principle. The product of the posterior probability and evidence is a prior probability multiplied by class likelihood. Using the application of reporting suspicious money laundering activities to FinCEN as an example, the Bayesian equation is $p(S/c)p(c)=p(c/S)p(S)$. The evidence $p(c)$ is the probability of potential cases triggered by the cause c out of all potential cases. The class likelihood $p(S)$ is the probability of the true positives S (e.g., true SAR cases) out of all potential cases. The prior probability $p(c/S)$ is the probability of true positives triggered by the cause c out of all true positives. As a result, the posterior probability $p(S/c)$ may be determined as follows: $p(S/c)=p(c/S)p(S)/p(c)$. The posterior probability $P(S/c)$ is also the conditional probability that a potential case triggered by the cause c is a true positive. That is, although the conditional probability $P(S/c)$ is derived from the historical data, it is the best estimate for the future probability that a potential case triggered by the cause c will become a true positive. As such, the posterior probability may also be referred to as the conditional probability for the future, or future conditional probability.

Many risk factors (e.g., thousands of risk factors) may affect money laundering risk. In some configurations, the number of scenarios used by the intelligent money laundering alert system is not a large number when the risk score based scenarios are used as a portion of the scenarios. As an example, the intelligent money laundering alert system may use thirty scenarios. A potential case can be triggered by one or more of the scenarios. In this example, a vector with thirty elements may represent the possible causes of the potential case. Consequently, in this example, there are $2^{30}$ different possible combinations of causes. Each triggered scenario is identified by a flag. For example, a cause vector may be initialized to have a value of "0" for each element. If a scenario is triggered, the value of an element corresponding to the scenario may change from "0" to another value, such as "1."

For example, if a potential case is triggered by a first scenario and a third scenario, the vector, x, may include "1" at the first and third positions, and "0" at all the other positions. That is, the vector can be represented as x=(1,0, 1,0,0,0, . . . , 0). As another example, if a potential case is triggered by a third scenario and a fourth scenario, the third and fourth positions of the vector may include a value of "1," and all other positions may include a value of "0." In this example, a vector, x, may be represented as x= (0,0,1,1,0,0, . . . , 0). In the present disclosure, a vector that includes scenarios (e.g., causes) for triggering alerts for a potential case may be referred to as a cause vector.

A scenario may include one or more conditions for classifying a subject into one or more categories; however, the scenario itself may not trigger a potential case. A potential case may be triggered by multiple scenarios in an associated cause vector. For example, if a scenario intends to classify a subject into the prior SAR suspect category, such a scenario may not trigger a money laundering alert by itself. However, if a customer is a prior SAR suspect and has triggered another scenario (e.g., sending over $10 million to a higher-risk country), a potential case may be triggered. Still, the cause vector may have two scenarios, one for the money transfer transaction and another for prior SAR suspect. It is a good idea to include various special categories (e.g., prior SAR suspect) into the cause vector as these special categories may improve the accuracy of suspicious activity detection.

A potential case with multiple triggered scenarios in the cause vector may be more likely to become a true positive. For example, if a customer receives $250,000 from a wire transfer, one scenario in the cause vector may be flagged (e.g., triggered). This cause vector, with one flagged scenario, may register as a potential case, which may or may not be a true money laundering case. Similarly, if a customer withdraws $250,000, another scenario in the cause vector may be flagged. Still, this potential case may or may not be a true money laundering case However, if a customer receives $250,000 from a wire transfer and then withdraws $250,000 cash from the account, two different scenarios may be flagged in the cause vector. The cause vector, with two flagged scenarios, may register as a potential case, which is more likely to be a true money laundering case because the combined activities described by these two different scenarios match a common money laundering behavior pattern. Therefore, rather than calculating the conditional probability based on one flagged scenario, it is desirable to calculate the conditional probability of a potential case based on a cause vector with multiple flagged scenarios.

If a cause vector has thirty scenarios, because each scenario has two possibilities (e.g., triggered and not triggered), thirty scenarios may have up to $2^{30}$ possible combinations. However, because no case will be triggered if none of the scenarios are triggered, the total possible combination for triggering a case is $(2^{30}-1)$. Each combination may have a unique conditional probability to trigger a potential case. It may be impractical to calculate these conditional probability values because $2^{30}$ is a very large number. In practice, a potential case averages five or fewer simultaneously triggered scenarios. Thus, the actual total number of meaningful combinations of scenarios that can trigger a potential case is a much smaller number and can be managed via a computational device associated with the intelligent alert system. For example, if the maximum number of possible scenarios in one potential case is five, the total number of possible potential cases that can be triggered by these thirty scenarios is $C(30,1)+C(30,2)+C(30,3)+C(30,4)+C(30,5)$, where $C(m, n)$ is the possible number of different choices to select n objects out of m subjects. For example, $C(30, 1)$ is 30 because there are 30 possible choices to select 1 out of 30 objects. $C(30, 2)$ is 435. $C(30,3)$ is 4,060. $C(30,4)$ is 27,405. $C(30,5)$ is 142,506. The total number of possible cause vectors is 174,436. These cause vectors and their associated conditional probability values can be managed via a computational device and a database associated with the intelligent alert system.

An investigator may use the intelligent alert system to investigate a potential case triggered by a cause vector. The cause vector may include multiple flagged scenarios. The potential case may be a false positive or true positive. A true positive refers to a potential case that is a true case. A false positive refers to a potential case that is not a true case. If it is a false positive, all the alerts of the potential case are dismissed as false alerts. If it is a true positive, the potential case becomes a true case that may be reported to an authority, such as FinCEN.

In general, the investigation of one potential case is time consuming. In the U.S., it is common for a large financial institution to hire hundreds of investigators. Each investigator is tasked with investigating whether the potential cases, triggered by various anti-money laundering systems, are true money laundering cases. If there is a true money laundering case, the financial institution is required by U.S. law to report the money laundering case to FinCEN within thirty days. However, as discussed above, whether a potential case is a true money laundering case is a subjective opinion of the investigator.

If the investigator reports a false positive as a true money laundering case, there is no penalty because the financial institution is protected by the safe harbor rule. In general, because there is a huge regulatory penalty for failing to report a true money laundering case to FinCEN, it is desirable to report a potential case to FinCEN instead of dismissing the potential case. Therefore, it is a general practice for investigators to treat a potential case as a true positive as long as there is reasonable doubt. Current U.S. law does not require the investigator to prove that a potential case is a true case. That is, an investigator is inclined to report a potential case if there is a good chance that it is a true case. This also means that probability plays a role in this decision-making process.

A user's decision making may be improved based on knowledge of a conditional probability, $p(S/x)$, of a potential case becoming a true SAR case based on the cause vector x. For example, if the conditional probability is greater than a threshold, the user may want to report the case to FinCEN without spending time on investigation. In some configurations, the intelligent alert system automatically reports a case to an appropriate entity (e.g., FinCEN) when the conditional probability for the case is greater than a threshold. The threshold may be set by a software module, a person who designs or tunes the system, and/or a user of the system. Alternatively, the threshold can be set by the intelligent alert system, which learns the preference of the user by evaluating the past behavior of the user. For example, if a user often files a SAR when the conditional probability of the cause vector is greater than a value Z, the system can use the value Z as the threshold to automatically file a SAR for the user in the future. In other configurations, the system stores potential cases in a database to determine the conditional probability. For each potential case, the system also stores the associated cause vector. The system may also store the investigation results, such as whether the potential case triggered by the cause vector has been accepted by the investigator as a true positive or has been dismissed by the investigator as a false positive.

As users continue to use the intelligent alert system, the system accumulates historical data in the database. In aspects of the present disclosure, for any given period of time, the system may determine, from the database, how many potential cases were triggered by a cause vector, x, and how many of the potential cases triggered by the cause vector, x, have become true positives (e.g., SAR cases reported to FinCEN). The ratio of the number of true positives triggered by the cause vector over the number of potential cases triggered by the cause vector is the conditional probability $p(S/x)$. The conditional probability may also be referred to as a posterior probability. The posterior probability indicates the probability of a future potential case triggered by the cause vector becoming a true case reported to FinCEN. In general, the conditional probability of a potential case is equivalent to the conditional probability of the cause vector that triggered the potential case.

In aspects of the present disclosure, the intelligent alert system calculates and displays the conditional probability of each potential case based on its cause vector. The conditional probability indicates the probability of the potential case triggered by the cause vector becoming a true positive reported to FinCEN. In other aspects of the present disclosure, the intelligent alert system accepts a potential case as a true positive and reports it to FinCEN in response to the conditional probability of the cause vector being higher than a predefined value. This predefined value is also referred to as a true positive acceptance threshold.

The intelligent alert system may also dismiss a potential case as a false positive in response to the conditional probability of the cause vector being less than a false positive rejection threshold. The false positive rejection threshold and true positive acceptance threshold may be set by a software module, a person who designs or tunes the system, and/or user of the system. Alternatively, these thresholds can be set by the intelligent alert system, which learns the preference of the user by evaluating the past behavior of the user. For potential cases that have not been accepted as true positives and have not been dismissed as false positives, the investigators may manually review the potential cases and decide whether each of the potential cases is a false positive or true positive.

The data for determining the conditional probability may be obtained during a time period. For example, the time period can be the past 12 months, the past three years, or any period. In some configurations, the conditional probability is determined from a rolling time period, which continues to move forward. For example, if the environment (e.g., business policies, customer demographics, products, services, etc.) has changed, the old probability values may not be accurate anymore after the change. Moreover, if the financial institution modifies a scenario, the old probability values may be affected. Therefore, a rolling time period (e.g., the past three years) provides the intelligent alert system the ability to continue adjusting itself to generate the most current and accurate probability values.

Many computer systems run data processing batch by batch (e.g., one batch per month). Instead of a time period, a number of batches may also be used to define the amount of historical data that is used for the probability calculations. For example, instead of a rolling time period of the past three years, the computer system can use a rolling time period of the past 36 batches if the computer system runs one batch per month.

In other configurations, the intelligent alert system purposely leaves some potential cases for the investigators to handle. The intelligent alert system may use the results of these cases to train the system, i.e., adjust the probability values to better fit the current environment. Therefore, the intelligent alert system is a learning system that improves predictions when more potential cases are evaluated by human investigators.

The intelligent alert system may generate a flag or display a message for a potential case triggered by a cause vector when the cause vector has not generated a potential case during a specified time period. Under such circumstances, a user may manually investigate the potential case to determine whether it is a false positive or true positive. The outcome of the manual investigation may be used to calculate conditional probability values for the cause vector. The calculated conditional probability values may be used to evaluate future potential cases. This manual investigation process has the equivalent effect of supervised training and improves the accuracy and reliability of the intelligent alert system.

The intelligent alert system may also display or link to the historical potential cases and/or true positives that were triggered by the cause vector. In addition, users may view additional details (e.g., drill down) for each case. Thus, investigators may use historical data as a reference when determining whether to pursue a potential case.

The system may also display or link to historical potential cases that were triggered by the same suspect of the current potential case and the decisions regarding those potential cases. Investigators may drill down to the detailed background information and transactional information of the suspect. As a result, an investigator can determine whether the current potential case is a false positive or true positive.

In some cases, there may be insufficient cause for reporting the current potential case to an authority. However, the current potential case combined with historical potential cases together may have sufficient cause for reporting. Under such circumstances, the true cause for reporting the case consists of the cause vector of the current potential case in addition to the cause vectors of the historical potential cases. The historical potential cases may be referred to as prior potential cases. A combined cause vector may be used for this true cause. The combined cause vector may be a combination of multiple cause vectors of multiple potential cases.

As an example, a cause vector x1 of a current case may have "1" at the first and fifth position of the vector, and "0" at all other positions (e.g., x1=(1, 0, 0, 0, 1, 0, 0, . . . 0)). In this example, the cause vector x2 of a historical potential has "1" at the third and fifth position, and "0" at all other positions (e.g., x2=(0, 0, 1, 0, 1, 0, 0, . . . 0)). The combined cause vector x3 (e.g., a combination of x1 and x2) has "1" at the first position, the third position, and the fifth position, and "0" at all other positions (e.g., x3=(1, 0, 1, 0, 1, 0, 0, . . . 0)). Although only one cause vector of one historical potential case is used in the above example, a combined cause vector may consist of multiple cause vectors of multiple historical potential cases.

In other configurations, an investigator has manually reviewed multiple historical potential cases and the current potential case to determine whether the combined case is a false positive (e.g., not to be reported) or a true positive (e.g., to be reported). The outcome of the manual investigation may be used to calculate a conditional probability value p(S/cbv) (e.g., the posterior probability value) for the combined cause vector cbv. The combined cause vector cbv is a combination of the cause vector of the current potential case and one or more cause vectors of historical potential cases.

In some cases, it is difficult for the intelligent alert system to know which historical potential cases have been investigated by the investigator. As such, the intelligent alert system may prompt the investigator to choose the historical potential cases, which will be combined with the current case to be reported to the authority.

Additionally, in some cases, it is difficult for the intelligent alert system to know which scenarios of a combined cause vector or a cause vector caused the investigator to report the potential case. Therefore, the intelligent alert system may prompt the investigator to choose the scenarios that caused the investigator to report the potential case.

Many reports of suspicious activities request the investigator to provide comments or narratives of the potential cases. To improve processing times, it is desirable for the intelligent alert system to automatically populate comments or narratives of the reported cases. In general, the information for writing the comments or narratives consists of the background information and the transactional information of the suspect. Because this information is stored in the database, the intelligent alert system can learn from the user how to write the comments or narratives as explained later in this disclosure.

In aspects of the present disclosure, the intelligent alert system prompts the investigator to select the historical potential cases to be combined with the current potential case for reporting. Based on the cause vectors of the selected historical potential cases and the cause vector of the current potential case, the intelligent alert system prepares a comment or narrative. The prepared comment or narrative is provided in the report for the combined case.

When the intelligent alert system fills out the comment or narrative, the intelligent alert system may also identify the combined cause vector of the reported case. Thus, a conditional probability value p(S/cbv) may be associated with the identified combined cause vector cbv based on results of the human investigation.

The intelligent alert system may prompt the investigator to select the scenarios of a cause vector, or a combined cause vector, that caused reporting of the potential case. Based on the selected scenarios, the intelligent alert system prepares a comment or narrative to fill out a report for the case. These selected scenarios form a real cause vector of the reported case. The scenarios of the real cause vector of the reported case are identified. The conditional probability values of the real cause vector may be calculated based on results of the human investigation.

Each person may have a unique writing style (or preference), thus, an investigator initially may not like the comment or narrative generated by the intelligent alert system. If the investigator does not like the generated comment or narrative based on the chosen scenarios and there is no way to modify it, the investigator may not bother to select the scenarios that enable the intelligent alert system to generate the comment or narrative. Under such circumstances, the intelligent alert system may not learn the real reasons why the investigator has decided to report the case to the authority. Consequently, the intelligent alert system may not be able to calculate future conditional probability values of the real cause vector based on the human investigation results.

Therefore, it is desirable for the intelligent alert system to learn and adapt to the writing style (or preference) of the investigator. In some configurations, the intelligent alert system learns the writing style (or preference) of the investigator and generates the future comment or narrative based on the investigator's writing style (or preference).

In other configurations, to learn a person's writing style (or preference), the intelligent alert system displays a comment or narrative for a first chosen scenario based on a pre-stored default comment or narrative for the first chosen scenario. The pre-stored default comment or narrative comprises two primary portions. The first primary portion consists of facts, such as suspect name, identification information, background of the suspect, relationships of the suspect, location of the event, description of the event, date and time of the event, information related to the event, transactional details, etc. The second primary portion may contain words, phrases, sentences, symbols, etc., that are used to link the facts together. These words, phrases, sentences, symbols, etc., are collectively referred to as the "linking words."

The facts may be obtained from the stored data or information associated with the intelligent alert system. The investigators may rarely modify the stored facts. An investigator may modify the linking words based on the investigator's writing style (or preference). Therefore, the intelligent alert system tracks the facts and linking words for the comments and narratives. The intelligent alert system may also track where the facts are stored in memory (e.g., database) and the relationships among the facts.

In general, the writing style (or preference) of a person is determined by the linking words and the presentation sequence of the facts (e.g., the format). The writing style (or preference) may not be determined based solely on the choices of the facts themselves because the investigator should include the related facts and avoid changing the facts. In some cases, when the same scenario detects two different cases, the facts may be different Still, the linking words and the sequence of the presentations of the facts (e.g., the format) may remain the same in the comment or narrative because the same investigator has the same writing style (or preference).

In some configurations, the intelligent alert system provides an editing capability for the investigator to add, delete, or modify the linking words that link the facts together. The intelligent alert system may provide an editing capability for the investigator to add, delete, or modify the facts in the narrative. The intelligent alert system may provide an editing capability and database searching capability for the investigator to extract additional facts from the database and insert them into the narrative.

After the investigator has revised the comment or narrative for the first chosen scenario, the investigator may store the revised comment or narrative as the next default comment or narrative. In the future, when the investigator selects the first chosen scenario again for other cases, the revised comment or narrative (e.g., the next default comment or narrative) based on a different set of facts may be displayed for the investigator to edit. It is likely that, after a few revisions, the investigator will be satisfied with the then-current revised version and may not want to edit again. Through this evolutional revision process, the intelligent alert system learns from the investigator and will generate a comment or narrative that matches the writing style (or preference) of the investigator.

The intelligent alert system can handle a second chosen scenario based on the same approach described above for the first chosen scenario. The intelligent alert system can handle other chosen scenarios through the same manner. Over time, the intelligent alert system will gradually learn how to write a comment or narrative for each scenario based on the investigator's preference.

As discussed, based on the learning, the intelligent alert system may automatically generate the comment or narrative for the investigator. Based on aspects of the present disclosure, there will be no need for the investigator to write a comment or narrative. The investigator may select the scenarios, and in response, the intelligent alert system automatically fills out the SAR form and the comment or narrative. The intelligent alert system may then report the case to the proper authority. Currently, an investigator may spend several hours writing a comment or narrative for a SAR case. The intelligent alert system can eliminate a tremendous amount of labor for the investigator.

In some cases, a person's writing may depend on his/her mood. For example, a person in a good mood may write the narrative in detail. As another example, a person in a bad mood may write a poor or incomplete narrative. Aspects of the present disclosure eliminate the influence of the human writer's mood on the narrative, such that the narrative maintains a consistent standard.

In an exemplary situation, when the intelligent alert system detects a customer, John Doe, deposits $9,990 on June 1, and $9,995 on June 2, into an account at Bank ABC, an alert may be generated with a default narrative as follows: "Mr. John Doe deposited $9.990 on June 1, and $9.995 on June 2, into Bank ABC." In the short narrative of the present example, the underlined words are the facts and the remaining words are the linking words.

In one example, an investigator may change the narrative as follows: "Mr. John Doe deposited $9.990 on June 1, and $9.995 on June 2, into Bank AB According to the Bank Secrecy Act, we are reporting this case as a suspicious activity because this is a typical cash structuring pattern." In the above narrative, the underlined words are the facts and the remaining words are the linking words. When the investigator saves the SAR form on John Doe, the intelligent alert system stores the revised narrative as the default narrative.

At a later time, the intelligent alert system may detect a customer, Jack Daniel, who deposits $9,999 on July 1, and $9,999 on July 2, into an account at Bank ABC. In response, the intelligent alert system may generate a SAR case with the default narrative as follows: "Mr. Jack Daniel deposited $9.999 on July 1, and $9.999 on July 2, into Bank ABC. According to the Bank Secrecy Act, we are reporting this case as a suspicious activity because this is a typical cash structuring pattern."

In one example, the investigator may change the narrative to the following narrative: "According to the Bank Secrecy Act, a financial institution needs to report a cash structuring activity through Suspicious Activity Report (SAR). We have identified that ML Jack Daniel deposited $9.999 on July 1, and $9.999 on July 2, into Bank ABC. This is a typical cash structuring activity to avoid the filing of the Currency Transaction Report (CTR). Therefore, we are reporting this case as a suspicious structuring activity case through a SAR." When the investigator saves the SAR form on Jack Daniel, the intelligent alert system stores the revised narrative as the default narrative.

At a later time period, the intelligent alert system detects a customer, Jim Beam, who deposits $9,980 on August 3, and $9,985 on August 4, into an account at Bank ABC. In response, the intelligent alert system may generate a SAR case with the default narrative as follows: "According to the Bank Secrecy Act, a financial institution needs to report a cash structuring activity through Suspicious Activity Report (SAR). We have identified that Mr. Jim Beam deposited $9.980 on August 3, and $9.985 on August 4, into Bank ABC. This is a typical cash structuring activity to avoid the filing of the Currency Transaction Report (CTR). Therefore, we are reporting this case as a suspicious structuring activity case through a SAR."

An investigator may see the above narrative and may want to add a few words as follows: "According to the Bank Secrecy Act, a financial institution needs to report a cash structuring activity through Suspicious Activity Report (SAR). We have identified that ML Jim Beam deposited $9.980 on August 3, and $9.985 on August 4, into Bank ABC. This is a typical cash structuring activity to avoid the filing of the Currency Transaction Report (CTR). Therefore, we are reporting this case as a suspicious structuring activity case through a SAR. Mr. Jim Beam opened the bank account on Mar. 1, 2019, and the average account balance during the past three (3) months is $123,197." In this case review process, the investigator has included additional facts that are extracted from the database of the intelligent alert system. These additional facts are underlined in the following sentence: "Mr. Jim Beam opened the bank account on Mar. 1, 2012, and the average account balance during the past three (3) months is $123,197." When the investigator saves the SAR form on Jim Beam, the intelligent alert system stores the revised narrative as the default narrative.

At yet another later time period, the intelligent alert system detects a customer, Remy Martin, who deposits $9,998 on September 5, and $9,998 on September 6, into an account at Bank ABC. In response, the intelligent alert system may generate a SAR case with the default narrative as follows: "According to the Bank Secrecy Act, a financial institution needs to report a cash structuring activity through Suspicious Activity Report (SAR). We have identified that Mr. Remy Martin deposited $9.998 on September 5, and $9.998 on September 6, into Bank ABC. This is a typical cash structuring activity to avoid the filing of the Currency Transaction Report (CTR). Therefore, we are reporting this case as a suspicious structuring activity case through a SAR. Mr. Remy Martin opened the bank account on Feb. 15, 2019, and the average account balance during the past three (3) months is $83.225."

The investigator may see the above narrative and decide there is no need to make any changes. Until the investigator makes changes in the future, cases detected by the same scenario will use the following comment or narrative: "According to the Bank Secrecy Act, a financial institution needs to report a cash structuring activity through Suspicious Activity Report (SAR). We have identified that (Suspect Name) deposited (First Cash Transactional Amount) on (First Deposit date), and (Second Cash Transactional Amount) on (Second Deposit Date), into Bank Name). This is a typical cash structuring activity to avoid the filing of the Currency Transaction Report (CTR). Therefore, we are reporting this case as a suspicious structuring activity case through a SAR. (Suspect Name) opened the bank account on (Account Opening Date), and the average account balance during the past three (3) months is (Average Account Balance)." The underlined words will be extracted from the database of the intelligent alert system. The remaining words of the narrative are the preferred linking words used by the investigator that the intelligent alert system has learned from the investigator based on his writing of narrative for the past cases detected by the same scenario.

In the above example, the set of facts consists of Suspect Name, First Cash Transactional Amount, First Deposit Date, Second Cash Transactional Amount, Second Deposit Date, Bank Name, Account Opening Date, and Average Account Balance. These different pieces of facts can be extracted from a storage location, such as a database.

Moreover, John Doe, Jack Daniel, Jim Beam, and Remy Martin are the same type of fact under the field name "Suspect Name." Each suspect name may be defined as a fact corresponding to other suspect names. For example, Remy Martin may be a corresponding piece of fact of Jim Beam. Similarly, a set of corresponding pieces of facts may be defined under the following fields: First Cash Transactional Amount, First Deposit Date, Second Cash Transactional Amount, Second Deposit Date, Bank Name, Account Opening Date, and Average Account Balance.

When the intelligent alert system shows the default narrative based on a new set of facts of a new suspect, the intelligent alert system replaces each old fact of the old suspect with the new corresponding fact of the new suspect. In the above example, the old suspect name Jim Beam is replaced with the new suspect name Remy Martin; $9,980 is replaced with $9,998; August 3 is replaced with September 5; $9,985 is replaced with $9,998; August 4 is replaced with September 6; Bank ABC is replaced with Bank ABC; Mar. 1, 2019 is replaced with Feb. 15, 2019; and $123,197 is replaced with $83,225. The linking words are unchanged.

If the investigator has used the same default narrative for a predefined number of times without revising it, the default narrative has matched the writing style (or preference) of the investigator. Under such circumstances, the intelligent alert system may skip or recommend the investigator to skip the narrative reviewing process.

In other configurations, in addition to providing one comment or narrative for each scenario, the intelligent alert system provides an introduction section for each case. Additionally, or alternatively, the intelligent alert system may provide a conclusion section for each case. The introduction section is placed at the beginning of the overall narrative and the conclusion section is placed at the end of the overall narrative. For example, if a case has three scenarios chosen by the investigator, the overall comment or narrative will have one introduction section, three comment or narrative sections to match three chosen scenarios, and one conclusion section.

In aspects of the present disclosure, the introduction section and the conclusion section can also be modified and saved by the investigator. Similarly, the intelligent alert system will learn to construct the investigator's preferred introduction section and conclusion sections. This general format to include an introduction section and a conclusion section provides additional flexibility for the investigator to write a more comprehensive and universal narrative.

In some configurations, if a case contains multiple suspects, each suspect is detected by a set of scenarios. The overall comment or narrative for the case may contain the introduction section, a relationship section that describes the relationships of these suspects, a single set of comment (or narrative) sections for each scenario, and the conclusion section.

Updating the linking words and the relative positions of facts in the default narrative based on different sets of facts can simplify the SAR case review and filing process. For example, when the intelligent alert system detects an alert on a suspect, the intelligent alert system sends the current matched scenarios and all the scenarios that match the historical alerts on the suspect to the computer system of the investigator. The investigator selects a scenario constituting the reason to file a SAR and sends the selected scenario back to the intelligent alert system. The intelligent alert system searches the database to identify the default narrative for the selected scenario and sends the default narrative based on the facts of the suspect back to the computer system of the investigator. The investigator reviews the narrative and may make changes, if needed.

When the investigator saves the revised narrative, the computer system of the investigator sends the revised narrative back to the intelligent alert system. The intelligent alert system stores the revised narrative and sends the SAR form with the revised narrative to the computer system of the BSA Officer. If the BSA Officer approves the SAR form, the intelligent alert system sends the SAR form to the computer system of FinCEN. If the investigator does not see the need to make any change on the default narrative, the intelligent alert system can directly send the SAR with the default narrative to the computer system of the BSA Officer for approval.

In some cases, the investigator is also the BSA Officer or the BSA Officer permits the investigator to directly file a SAR without any need for approval. In these cases, the investigator may accept the default narrative based on the then-current facts. In response, the intelligent alert system may directly send the SAR with the default narrative based on the current facts to the computer system of FinCEN.

After the investigator has continuously accepted the default narrative for a scenario based on different sets of facts without any change for a predefined number of times, the intelligent alert system can assume that the default narrative has matched the writing style (or preference) of the investigator for that scenario. Therefore, when a future true-positive case is detected with the same scenario again on a then-current suspect, the intelligent alert system can directly send the SAR with the default narrative based on the then-current facts of the then-current suspect to the computer system of FinCEN. The situation has eliminated the labor associated with the investigator and the BSA Officer.

The above description for one chosen scenario can also be applied for multiple chosen scenarios. For example, if the investigator has continuously accepted the default narratives for all the chosen scenarios of detected cases based on different sets of facts for a predefined number of times, the intelligent alert system can send the SAR with the default narratives of the multiple chosen scenarios based on the then-current facts of the then-current suspect to the computer system of FinCEN.

In addition to the SAR filing application, aspects of the present disclosure may be used by a computer system to automatically generate different types of reports based on the preferences of human writers. For example, a hospital may need to generate a report for each patient. A police department may need to generate a report for each incident. A school may need to generate a report for each student. There are many other needs to generate reports. Conventional reports are generated by using tremendous human resources. Aspects of the present disclosure can reduce the human resources used in generating reports.

Reports may be classified into different types of reports based on different factors, such as reasons, purposes, criteria, scenarios, etc. For example, for a hospital, different types of reports may be used based on the reason a patient checked into the hospital. As an example, the reasons can be heart surgery, baby delivery, etc. A patient may have multiple reasons for checking into a hospital. Additionally, for each main reason, there may be multiple sub-reasons. For example, if a patient checks into the hospital because of a need for a heart surgery, there are many reasons for the need. It is desirable to classify the reasons in detail because each different reason may require a different type of writing style (or preference) to generate a report. As another example, there are many different reasons, purposes, criteria, scenarios, etc., for a police department to generate a report for an incident. In yet another example, there are many different reasons, purposes, criteria, scenarios, etc., for a school to generate a report for each student.

Reports may be written based on one or more facts. These facts may be stored in a database and consist of the data entered by humans, detected by sensors, collected from different sources, and/or derived from other data. Furthermore, a human will use words, phrases, sentences, symbols, etc., to link the facts together to form a report. For easy reference, the words, phrases, sentences, symbols, etc., to link the facts together are collectively referred to as the "linking words."

In some configurations, a computer system stores facts in a database. A computer system provides an editing capability for a human writer to create a set of factors, which may comprise reasons, purposes, criteria, scenarios, etc. The computer system may provide an editing capability for a human writer to use a set of facts to create a default narrative for each factor. Additionally, the computer system provides an editing capability for a human writer to write linking words for the default narrative of each factor. The computer system may also store the default narrative of each factor. The default narrative comprises facts and linking words.

In other configurations, the computer system stores a default narrative for each factor in a database. In these configurations, the default narrative includes linking words, the position of each fact in the narrative, and the storage location in a database to store each fact. For example, a default narrative can be "(object 1) had a car accident on (object 2)." In this example, object 1 and object 2 are two facts. The computer system stores, in a database, the entire sentence that includes the linking words "had a car accident on" and the positions of object 1 and object 2 in this sentence. In addition, the computer system stores, in the database, the table names and the field names of object 1 and object 2, respectively.

Data fields with the same definition may be stored in the same database table. For example, all patients' names are stored in the same database table that lists the names of all patients. Therefore, when two different sets of facts are used to write two narratives for two cases, a corresponding pair of facts, which are at the same position inside each respective narrative, are in the same database table. When multiple database tables are used to generate a fact, the database keys to link these multiple database tables can also be stored in the database. As a result, when a default comment or narrative based on an old set of facts is used to generate a new narrative for a new set of facts, the computer system identifies each corresponding pair of facts and replace the old facts with the corresponding new facts.

For example, object 1 is the "patient name field" stored in the patient table, and object 2 is the "date field" in an event table. In the above example, "Jack Daniel had a car accident on Jan. 20, 2018" and "Jim Beams had a car accident on Feb. 3, 2018" are based on the same narrative format, but contain two different pieces of facts (e.g., patient names and event dates). The linking words of these two scenarios are identical, which are "had a car accident on."

In some configurations, a computer system lists a set of factors, which may include reasons, purposes, criteria, scenarios, etc. The computer system may permit a human writer to select a factor to display the default narrative based on a new set of facts. The human writer may add, delete, or modify the linking words of the narrative displayed by the computer system.

In other configurations, the computer system provides database searching and editing capabilities, such that a human writer can add, delete, or modify the facts and change the positions of the facts in a narrative displayed by the computer system. The human writer may store the revised narrative as the new default narrative, which includes the facts, the position of each piece of fact, and the linking words. The computer system stores the database table, key, and field information for obtaining each fact of the new default narrative.

In aspects of the present disclosure, a human writer selects a factor to display a new default narrative based on a new set of facts, and the same set of linking words that were stored in the database. The computer system extracts each new piece of the new facts based on where the old corresponding piece of the old facts was stored in the database. The computer system may display each new fact among the linking words in the narrative based on the position of each old corresponding fact in the narrative.

In some configurations, the computer system provides functionality for a human writer to add, delete, or modify the linking words of the new default narrative displayed by the computer system. The human writer may also add, delete, or modify the facts and change the position of the facts in the new default narrative displayed by the computer system. The human writer may store the revised new default narrative as the next new default narrative again.

The above process may be repeated, such that a human writer can continue to revise the default narrative based on a new set of facts and store the revised default narrative as the next new default narrative. As a result of this evolutional process, the future default narrative may match the preference of the human writer.

In aspects of the present disclosure, if the human writer has not changed the narrative for different cases using different sets of facts for a predefine number of instances based on the same factor selected by the human writer, the narrative is considered to have matured for the selected factor. The predefined number can be defined by a person and/or a computer system.

In some configurations, if the human writer has not changed the linking words displayed by the computer system for different cases using different sets of facts for a predefined number of instances based on the same factors selected by the human writer, the linking words are considered to have matured for the selected factor. The predefined number of instances can be defined by a person and/or a computer system.

In other configurations, if a narrative has matured for a factor selected by a human writer, the computer system automatically skips or recommends the human writer to skip the narrative reviewing process and uses the current default narrative as the standard narrative format to generate a report for the selected factor. The standard narrative format contains the facts that may be different in each report and the identical set of linking words that match the writing style (or preference) of the human writer.

In some configurations, if the linking words have matured for a factor selected by a human writer, the computer system automatically skips or recommends the human writer to skip the narrative reviewing process and uses the current default linking words as the standard linking words to generate a report for the selected factor.

In other configurations, if the human writer has selected multiple factors to write a report, the computer system uses the selected factors to generate one narrative section for each factor and combines multiple narrative sections together based on the multiple selected factors to generate the report.

An introduction section can be inserted at the front of the report. The introduction section includes facts and/or linking words. The facts and/or linking words may be revised by the human writer through multiple reports to eventually match the writing skill (or preference) of the human writer based on the evolutional process explained in the present disclosure.

A linking section may be inserted at the middle of the report. The linking section includes facts and/or linking words, which may be revised by the human writer through multiple reports to eventually match the writing skill (or preference) of the human writer based on the evolutional process explained in the present disclosure.

A conclusion section can be inserted at the end of the report. The conclusion section includes facts and/or linking words, which may be revised by the human writer through multiple reports to eventually match the writing skill (or preference) of the human writer based on the evolutional process explained in the present disclosure.

As a result of the present disclosure, the computer system learns the writing style (or preference) of each human writer and may automatically generate a variety of reports for each human writer based on his/her writing style (or preference).

One or more of the examples above are based on the anti-money laundering application in financial institutions. Nevertheless, the present disclosure can also be applied to many other different types of applications for different organizations and different purposes. For example, the intelligent alert system can be used by a government organization to identify any employee who may potentially steal confidential information from the government. The intelligent alert system can be used by a school to identify any student who may potentially drop out of the school. The intelligent alert system can be used by a social network company to identify any member that may potentially conduct illegal activity on the social network. The intelligent alert system can be used by an employer to identify any employee who may potentially quit the job. The intelligent alert system can be used by a marketing company to identify a target for a potential business transaction. The intelligent alert system can also be a mobile application used by an individual to identify a potential stock or commodity for investment purposes. As a public health application, the intelligent alert system can be a mobile app, which monitors the health condition of a person and sends a message if there is a potential health concern. There are countless applications for the intelligent alert system. The following procedure is an example of how to design and develop an intelligent alert system to monitor a group of subjects for any specific goal.

In some configurations, an intelligent alert system assigns scores to various factors. Additionally, or alternatively, the intelligent alert system assigns scores to each degree of each factor. A degree of a factor is used to distinguish a different level of impact of the factor. For example, sending a wire transfer is a risk factor to be considered for anti-money laundering purposes. However, the dollar amounts of the wire transfers may have different impacts. For example, a wire transfer amount from 0 to $10,000 may have a low level of money laundering risk while a wire transfer amount from $250,000 to $1,000,000 may have a high level of money laundering risk. Factors may be based on data associated with subjects that have positive or negative impacts for achieving the goal. The intelligent alert system assigns a score to each factor. The intelligent alert system may identify the possible degrees of factors in the data associated with the subjects that have positive or negative impacts to achieving the goal. The intelligent alert system assigns a score to each degree of each factor. In other configurations, the intelligent alert system generates a total score for each subject under monitoring by summing all scores of the factors or degrees of factors associated with the subject.

The intelligent alert system uses a set of scenarios based on different criteria. The criteria may include factors from data associated with the subjects, degrees of factors from data associated with the subjects, and/or scores derived from the data associated with the subjects. Additionally, or alternatively, the criteria may be based on rules derived from a decision tree, special categories associated with the subjects, an if-then conditional format derived from a model trained by the machine learning network, an if-then conditional format derived from a behavior pattern, an if-then conditional format derived from a transactional pattern, factors established by a software module, and/or factors established by a user or designer of the system.

Through the above methods, the scenarios of the intelligent alert system are established by a variety of methods. These scenarios may trigger alerts to generate potential cases and each potential case may have one scenario or multiple scenarios in its cause vector. The intelligent alert system may list a set of potential cases triggered by one or more scenarios. Investigators may review the potential cases to determine which cases are true positives and which cases are false positives. Additionally, the investigator may review the current potential cases together with the historical potential cases to determine which combinations of cases are true positives or false positives.

In some configurations, the intelligent alert system enables investigators to review the scenarios of the potential cases to determine which combinations of scenarios generate true positives and which combinations of scenarios generate false positives. The intelligent alert system also provides investigators the ability to review the scenarios of the current potential cases together with the scenarios of the historical potential cases to determine which combinations of scenarios are true positives and which combinations of scenarios are false positives.

Although a combined cause vector is obtained from the combination of a number of cause vectors, a combined cause vector has the same form of a cause vector. By definition, a combined cause vector is the cause vector of the combined case. Therefore, the conditional probability of a combined cause vector P(S/cbv) and the conditional probability of a cause vector P(S/x) may be calculated via a similar method.

Furthermore, although a cause vector (or a combined cause vector) may trigger a potential case for investigation, the reason for reporting the case may be based on a subset of scenarios of the cause vector. To maintain accuracy of posterior probability calculation, it is desirable to identify the subset of scenarios that form the real cause vector for the true positive.

The intelligent alert system provides investigators the ability to review the scenarios of a potential case to identify the real cause vector if the potential case is a true positive. The investigator may review the scenarios of a combined potential case to identify the real cause vector if the combined potential case is a true positive. The intelligent alert system may store the investigation results of each potential case and the associated cause vector (or real cause vector). As explained earlier, once the real cause vector has been identified, the set of scenarios that constitute the real cause vector can be used to generate a set of narratives and the SAR form can be automatically filled out and sent to FinCEN.

In other configurations, the intelligent alert system stores investigation results of a combined case and the associated combined cause vector (or the real combined cause vector) of the combined case. Each combined cause vector (or the real combined cause vector) may consist of one or more scenarios. The results and other information may be stored in a database or other data structure.

After the investigators have used the intelligent alert system for a period of time, the intelligent alert system accumulates a large amount of data associated with the subjects. The data may include historical potential cases, historical investigation results (e.g., true positives or false positives), and the associated cause vectors (or real cause vectors). As a result, the system's accuracy may improve as the system's use increases. That is, the system's accuracy may be improved through the accumulation of data For clarity, a cause vector or a real cause vector is generally referred to as a cause vector hereinafter. Moreover, a cause vector generally includes both a cause vector and a combined cause vector hereinafter. Therefore, a cause vector generally refers to a cause vector, a combined cause vector, a real cause vector, and/or a real combined cause vector.

In some configurations, after an amount of historical data is greater than a threshold, the system calculates the conditional probability for each cause vector. The threshold may be based on a number of true cases, potential cases, data size, and/or other factors. The conditional probability of the cause vector, based on a given time period, is the number of true positives triggered by the cause vector divided by the total number of potential cases triggered by the cause vector.

In aspects of the present disclosure, the intelligent alert system dismisses a potential case triggered by a cause vector as a false positive when the conditional probability of the cause vector is lower than a false positive rejection threshold. The false positive rejection threshold may be set by a software module, a person who designs the system, a person who tunes the system, and/or a user of the system.

In some cases, if potential cases triggered by a cause vector always have a low conditional probability, the scenarios of the cause vector may not be properly defined. Under such circumstances, the users adjust the scenarios of the cause vector so that these scenarios will increase probability predictions. The intelligent alert system may prompt the user to make such changes.

The intelligent alert system may accept a potential case triggered by a cause vector as a true positive in response to the conditional probability of the cause vector being higher than a true positive acceptance threshold. The true positive acceptance threshold may be set by a software module, a person who designs the system, a person who tunes the system, and/or a user of the system.

A vector of multiple elements can be converted into a combination of multiple vectors. For example, vector A has three elements, v1, v2, and v3. In this example, vector A can be the combination of three vectors (e.g., vector B having element v1, vector C having element v2, and vector D having element v3). For clarity, vector A is referred to as a parent vector. Vector B, vector C, and vector D may be referred to as child vectors. In the following disclosure, the cause vector will be considered the parent vector.

The above example assumes that a child vector has only one element. In general, a child vector may have multiple elements. For example, vector A of the above example may have a child vector with elements v1 and v2. Because each element can be included into or excluded from the parent vector to form a child vector, a parent vector with N elements may have a total of $2^N$ possible combinations, including itself with all N elements and a null vector with no elements. Therefore, a parent vector with N elements may have $2^N-2$ possible meaningful child vectors. Each element of a cause vector corresponds to a scenario. When the element is one, the corresponding scenario is included. When the element is zero, the corresponding scenario is excluded. A subset of the scenarios of the parent cause vector may form the scenarios of a child cause vector.

In general, an increase in the number of scenarios of a cause vector may increase the conditional probability value of the cause vector. For example, if a first cause vector only has scenario A as its vector element and a second cause vector has both scenario A and scenario B as its vector elements, the conditional probability value of the second cause vector should be the same or higher than the conditional probability value of the first cause vector.

Therefore, a parent cause vector has the same conditional probability value as, or a higher conditional probability value than, any of its child vectors. That is, if a child vector already has a conditional probability value greater than the true positive acceptance threshold, the conditional probability value of the parent cause vector is also greater than the true positive acceptance threshold.

In other configurations, the intelligent alert system accepts a potential case triggered by a cause vector as a true positive when the conditional probability value of one of its child vectors is equal to or greater than a threshold. The threshold may be set by a software module, a person who designs the system, a person who tunes the system, and/or a user of the system.

A current potential case may be combined with a group of historical potential cases to form a combined cause vector. The intelligent alert system may accept the combined cause vector of the potential cases as a true positive when the conditional probability value of one of the child vectors of the combined cause vector is the equal to or greater than a threshold. The threshold may be set by a software module, a person who designs the system, a person who tunes the system, and/or a user of the system.

It may be difficult for the intelligent alert system to try all possible combinations of historical potential cases to determine whether a specific combination of historical potential cases together with the current potential case will satisfy the automatic true positive acceptance criteria. Therefore, in some configurations, the intelligent alert system accepts a combined cause vector as a true positive when the conditional probability value of one of the child vectors of the combined cause vector is equal to or greater than a threshold. The threshold may be set by a software module, a person who designs the system, a person who tunes the system, and/or a user of the system.

In general, all potential cases related to one subject may be related to each other. Additionally, all potential cases related to a group of related subjects may be related to each other. For example, if five students live in the same dormitory, all potential cases related to any one of these five students are related cases. The scope of relationships to define related potential cases may be set by a software module, a person who designs the system, a person who tunes the system, and/or a user of the system.

If the intelligent alert system has been used for an extended period of time, it may not be practical or efficient to use all related potential cases. That is, the number of related potential cases may be too large, thereby decreasing performance. Therefore, it may be desirable to limit the scope of related cases to a period of time. In other configurations, a combined cause vector may be generated from a current potential case and a group of related historical potential cases, which occurred within a predefined time period. The intelligent alert system may accept the combined cause vector as a true positive when the conditional probability value of a child vector of the combined cause vector is equal to or greater than a threshold. The threshold may be set by a software module, a person who designs the system, a person who tunes the system, and/or a user of the system. The predefined period of time is set by a software module, a person who designs the system, a person who tunes the system, and/or a user of the system.

The intelligent alert system provides an opportunity for investigators to investigate cases that are not automatically dismissed as false positives and not automatically accepted as true positives. The intelligent alert system records the investigation results of each potential case and the associated cause vector for the potential case. This information may be used to calculate future conditional probability values of the cause vector.

Because the intelligent alert system continues to use the investigation results to further adjust future conditional probability values, the intelligent alert system may adjust itself to future environmental changes. The more potential cases the intelligent alert system can handle without human interaction, the fewer potential cases are left for investigators to handle.

The intelligent alert system may exclude cases that are automatically accepted as true positives or dismissed as false positives from the calculations of the posterior probability values. This approach avoids problems caused by positive feedback. For example, if a potential case triggered by a cause vector x has been automatically accepted as a true positive, the value of the conditional probability $p(S/x)$ may increase if the results of this case are included into the calculations of the posterior probability values of cause vector x. Consequently, the next potential case triggered by the cause vector x may be automatically accepted as a true positive. The automatic acceptance of future potential cases triggered by the cause vector x will continue because the posterior probability value continues to increase. In other words, once a potential case triggered by a cause vector has been automatically accepted as a true positive, all future potential cases triggered by the same cause vector will be automatically accepted as true positives if the accepted cases are included into the calculations of the posterior probability values of the cause vector. This is not desirable because this process of "no return" has deprived the intelligent alert system of the ability to re-adjust itself backward when the environment changes in the future.

In some configurations, the intelligent alert system does not automatically dismiss a potential case when the conditional probability value of the potential case is lower than the false positive rejection threshold. As a result, an investigator may fine-tune the conditional probability value through this potential case. For reference, this case is referred to as a false positive validation case. The number, percentage, and/or frequency of the occurrence of the false positive validation cases is determined by a software module, a person who designs or tunes the system, and/or a user of the system.

Additionally, in some cases, the intelligent alert system may not automatically accept a potential case as a true positive when the conditional probability value of the potential case is higher than the true positive acceptance threshold. As a result, an investigator may fine-tune the conditional probability value through this potential case. For clarity, this case is referred to as a true positive validation case. The number, percentage, and/or frequency of the occurrence of the true positive validation cases is determined by a software module, a person who designs or tunes the system, and/or a user of the system.

In some cases, certain subjects are handled differently for different reasons. For example, some subjects are placed on a "Do Not Compare List" or a "White List." A potential case associated with a subject on such a list can be treated as a false positive without any need for an investigation. For example, it may be a politically correct decision to put a political figure on the "Do Not Compare List" of an anti-money laundering system regardless of what has been detected. Similarly, for other purposes, a potential case associated with a subject on another list can be treated as a true positive without any need for an investigation.

Because these cases are treated differently, they are considered outliers. It is desirable to exclude these outliers from the calculations of the posterior probability values. The intelligent alert system may skip a potential case that is associated with a subject on a "Do Not Compare List" or a "White List." The skipped case may not be used when calculating posterior probability values of cause vectors.

In some cases, an alert triggered by a scenario about a subject may turn out to be a false alert because the scenario is not suitable to monitor the subject. For example, a cash-intensive business may naturally have more cash than other types of businesses and a scenario to compare the amount of cash between this business and others may not be meaningful and suitable. Under such circumstances, the investigator can mark the scenario as verified for this subject. This means that the scenario has already been verified by an investigator on this subject and there is no need to take any action if another alert is triggered by this scenario on this subject. Therefore, a potential case triggered by a scenario with a verified status is also considered an outlier.

In other configurations, the intelligent alert system skips a potential case that is associated with a subject with the verified status on the scenarios that triggered the potential case. The intelligent alert system does not include the skipped case into the calculations of posterior probability values of cause vectors.

When an investigator dismisses a potential case as a false positive, the intelligent alert system prompts the investigator to determine whether the scenario that triggered the potential case should be marked verified. If this scenario is not marked verified, it may trigger another false positive in the future. Therefore, it is desirable to mark a scenario verified when a potential case triggered by the scenario is determined to be a false positive.

The number of potential cases used to calculate a conditional probability value may also affect the reliability of the conditional probability value. For example, if only one potential case has been triggered by a cause vector x and the potential case has been accepted by an investigator as true positive, the conditional probability p(S/x) may not be reliable, even though it has a value of 100%. However, if five potential cases have been triggered by a cause vector x and the conditional probability p(S/x) is 100%, this conditional probability may be more reliable in comparison to the previous example.

The intelligent alert system may automatically dismiss a potential case triggered by a cause vector as a false positive when the conditional probability of the cause vector is less than a threshold A and the number of potential cases triggered by the cause vector and used to calculate the conditional probability is larger than a threshold B. Each of the thresholds A and B may be set by a software module, a person who designs or tunes the system, and/or a user of the system.

The intelligent alert system accepts a potential case triggered by a cause vector as a true positive when the conditional probability of the cause vector is higher than the threshold A and the number of potential cases triggered by the cause vector and used to calculate the conditional probability is larger than the threshold B. Each of the thresholds A and B may be set by a software module, a person who designs or tunes the system, and/or a user of the system.

It may be desirable to use different conditional probability thresholds for subjects in different categories when the intelligent alert system automatically accepts potential cases as true positives or rejects potential cases as false positives based on the conditional probability thresholds. For example, a financial institution may file a SAR on a potential case related to a subject who was a suspect of a past SAR case even though the conditional probability of the current potential case is lower than the true positive acceptance threshold.

In some configurations, the intelligent alert system uses a different true positive acceptance threshold and false positive rejection threshold for subjects in different categories. The different categories may be defined by a software module, a person who designs or tunes the system, and/or a user of the system. In the anti-money laundering application example, these categories may include a customer who was a suspect of a prior SAR, a customer who had a match with the OFAC list, a customer who had a match with the 314(a) list, a customer who had a match with the political exposed person list, a customer who had a match with other watch lists, higher-risk customer, medium-risk customer, lower-risk customer, higher-risk counter-party, medium-risk counter-party, lower-risk counter-party, higher-risk country, medium-risk country, lower-risk country, higher-risk area, medium-risk area, lower-risk area, higher-transactional amount, medium-transactional amount, lower-transactional amount, etc.

Because these categories can also be the factors (e.g., risk factors) used for score (e.g., risk score) assignment and calculation purposes, it is desirable to use different true positive acceptance thresholds and false positive rejection thresholds for different factors. In aspects of the present disclosure, the intelligent alert system permits a user to assign a true positive acceptance threshold and a false positive rejection threshold to each factor.

In some configurations, the intelligent alert system accepts a potential case as a true positive if the conditional probability of the cause vector is higher than one of the true positive acceptance thresholds of the factors associated with the potential case. The intelligent alert system may reject a potential case as a false positive if the conditional probability of the cause vector is lower than one of the false positive rejection thresholds of the factors associated with the potential case.

Such an approach may be complicated when many factors are involved. Therefore, it is desirable to only choose some important factors to assign different true positive acceptance thresholds and false positive rejection thresholds. In other configurations, the intelligent alert system permits a user to select a set of factors and assign a true positive acceptance threshold to each selected factor. A user may also select a set of factors and assign a false positive rejection threshold to each selected factor.

As such, the intelligent alert system may accept a potential case triggered by a cause vector as a true positive if the conditional probability of the cause vector is higher than one of the true positive acceptance thresholds of the selected factors associated with the potential case. Additionally, the intelligent alert system may reject a potential case triggered by a cause vector as a false positive if the conditional probability of the cause vector is lower than one of the false positive rejection thresholds of the selected factors associated with the potential case.

To increase the accuracy, it is desirable for the total number of potential cases to be greater than a threshold when calculating the conditional probability. The threshold may be a number of cases or a period of time. The threshold may be set by the users as desired.

In some configurations, the intelligent alert system records the potential case, the investigation results, the associated cause vector, and the date and time when the record is established. The intelligent alert system may calculate the conditional probability of a cause vector x, which is the number of true positives triggered by the cause vector x divided by the total number of potential cases triggered by the cause vector x.

After calculating the conditional probability value, the intelligent alert system also records into a database additional values, such as: (1) the number of true positives triggered by the cause vector x by that time, (2) the total number of potential cases triggered by the cause vector x by that time, and (3) the date and time of the calculation, which may be referred to as the last calculation time for cause vector x. As a result of storing these additional values, the intelligent alert system does not need to repeat the same calculations to obtain the same values again for the cause vector x.

The intelligent alert system may update the conditional probability of the cause vector x, which is based on the sum of the number of true positives triggered by the cause vector x (before the last calculation time) and the number of true positives triggered by the cause vector x (after and including the last calculation time) divided by the sum of the total number of potential cases triggered by the cause vector x (before the last calculation time) and the total number of potential cases triggered by the cause vector x (after and including the last calculation time).

In the above calculations, the number of true positives triggered by the cause vector x (before the last calculation time) plus the number of true positives triggered by the cause vector x (after and including the last calculation time) is the same as the number of true positives triggered by the cause vector x at the time of current calculation. Similarly, the total number of potential cases triggered by the cause vector x (before the last calculation time) plus the total number of potential cases triggered by the cause vector x (after and including the last calculation time) is the same as the total number of potential cases triggered by the cause vector x at the time of current calculation. Therefore, the above calculations will reach the same conditional probability $p(S/x)$, which is the number of true positives triggered by the cause vector x divided by the total number of potential cases triggered by the cause vector x.

Both the number of true positives triggered by the cause vector x (before the last calculation time) and the total number of potential cases triggered by the cause vector x (before the last calculation time) may be stored in the database after the last calculation of the conditional probability. Therefore, the intelligent alert system can search the database to find these two values. Therefore, the intelligent alert system calculates two new values based on the potential cases detected after and including the last calculation time. This approach has reduced many calculations, which reduces an amount of data stored in memory.

In aspects of the present disclosure, once the calculations of the conditional probability value have been completed, in addition to the potential case, investigation results, and the cause vector x, the intelligent alert system stores additional values, such as: (1) the number of true positives triggered by the cause vector x by that time, (2) the total number of potential cases triggered by the cause vector x by that time, and (3) the date and time of the calculation, which may be referred to as the new last calculation time for cause vector x. As a result, these values will simplify the next round of calculations of the conditional probability for potential cases triggered by cause vector x.

The above method can be further modified during the software coding process. In aspects of the present disclosure, the intelligent alert system keeps two counters for a cause vector x, one counter for the number of true positives (NTPX), the other counter for the number of potential cases (NPCX).

In aspects of the present disclosure, the intelligent alert system resets both counters, NTPX and NPCX, to zero to start the counting. As one example, a potential case triggered by cause vector x may be manually reviewed by an investigator and determined to be a true positive. In this example, the intelligent alert system adds one to the NTPX counter, because the number of manually reviewed true positives triggered by cause vector x has increased by one. For the current example, the system also adds one to the NPCX counter, because the number of potential cases triggered by cause vector x has increased by one.

As another example, a potential case triggered by cause vector x is manually reviewed by an investigator and determined to be a false positive. In this example, the intelligent alert system adds zero to the NTPX counter because the number of manually reviewed true positives triggered by cause vector x has not increased, and adds one to the NPCX counter because the number of potential cases triggered by cause vector x has increased by one.

In other configurations, the conditional probability $p(S/x)$ for a new potential case triggered by cause vector x is NTPX divided by NPCX. This method can reduce the complexity in the calculations of the conditional probability $p(S/x)$ and simplify the software coding effort.

Although a cause vector x is used in the examples, the above methods can be used for any cause vector. The intelligent alert system may have many pairs of counters, each pair for a cause vector. As explained earlier, the total number of pairs is a limited number because only a very small number of scenarios may coexist in the same cause vector to trigger a potential case.

By using the above methods, the intelligent alert system may reduce an amount of time for calculations. Moreover, the conditional probability values increase in accuracy when more potential cases are used in the calculations to derive the conditional probability values.

Because the intelligent alert system continues to learn from human workers, it is only a matter of time before the intelligent alert system automatically detects an alert, makes the decision to file a SAR, fills out the SAR form, writes a narrative, and sends the SAR form to FinCEN. The intelligent alert system will reduce human resources and will handle the SAR compliance matter similarly to a manner in which a human handles SAR compliance matters.

Although the detection of suspicious activities, investigation of SAR cases, and filing of suspicious activity reports are used as an example, the same set of methods in the present disclosure can be used to handle the detection of currency transactions, investigation of CTR cases, and filing of Currency Transaction Reports (CTRs) to FinCEN.

Similarly, the same set of methods in the present disclosure can be used to handle the detection of potential OFAC matches, investigation of the potential matches, and reporting true matches to the Office of the Foreign Assets Control (OFAC). Under such circumstances, the relative correlation (RC) value used to measure the degree of match is equivalent to the risk score used to measure the degree of risk. Therefore, instead of using risk score based scenarios, the intelligent alert system can use RC-based scenarios.

The OFAC list is just one example of many regulatory lists. The same set of methods in the present disclosure can be used for the detection, investigation, and reporting of matches for all types of regulatory lists, such as 314(a) list, denied persons list, political exposed persons list, and any other lists published by government organizations, and/or non-government organizations. People familiar with the regulatory compliance requirements can appreciate that the set of methods in the present disclosure can be used to detect, investigate, and report any subject to comply with any types of regulatory reporting requirements.

As discussed, the present disclosure describes functions that may be implemented by the intelligent alert system for various applications that may generate an alert. A human may review the alert and perform follow-up actions based on the alert review. In some configurations, the intelligent alert system learns from the human actions, makes decisions on behalf of the human, and implements the follow-up actions for the human. As a result, the intelligent alert system reduces the human effort and time, and may replace some or all humans in such an application.

In general, because a financial institution may suffer huge losses in a fraud case, financial institutions set low thresholds in their intelligent alert systems to produce fraud alerts. These low thresholds produce an increased number of false positives. Investigating the fraud alerts to distinguish actual fraud from a false positive is both labor-intensive and time-consuming.

Aspects of the present disclosure are directed to a computer system and network that dismiss false positives and confirm true positives. In other configurations, the dismissal of false positives and confirmation of true positives may be automatic (e.g., no need for any human investigation). The dismissal of false positives and confirmation of true positives may improve fraud detection and reduce damages (e.g., financial loss) that results from fraud.

In aspects of the present disclosure, in response to detecting an alert, an intelligent alert system sends at least a portion of transaction details to the consumer protection system. The alert may be generated in response to a transaction between a payer and payee. The payer may be a customer of the financial institution. The consumer protection system may be a computer system or a device interface. The transaction details may be transmitted via a communication channel. In the present disclosure, the communication channel refers to a wired network (e.g., Internet, etc.), a wireless network (e.g., mobile phone network, etc.), and/or another type of communication channel. Unless otherwise indicated, transmissions between devices, individuals, systems, organizations, and/or other entities of the present application may be performed via a communication channel.

The transaction details may include one or more of a transactional date, a transactional time, a transactional amount, a payer's account number, a payer's routing number, a payer's card number, a payer's wallet number, a payer's phone number, a payer's email address, a payer's other contact information, a payer's personal identification information, a SWIFT number of payer's bank, a payee's account number, a payee's routing number, a payee's card number, a payee's wallet number, a payee's phone number, a payee's email address, a payee's other contact information, a payee's personal identification information, a SWIFT number of payee's bank, and other information that can be used to define the transaction. The payer can be an individual or an organization. The payee can be an individual or an organization.

In aspects of the present disclosure, the consumer protection system sends a portion of the transactional details to the payer (e.g., the customer of the financial institution). The portion of the transactional details may be transmitted to a payer's device. The payer's device (e.g., device interface) may include, for example, a mobile phone, a tablet, a notebook, a computer system, etc. The transmission may be facilitated based on the payer's phone number, payer's email address, payer's device interface address, and/or payer's other contact information.

The payer may review the portion of transactional details to determine whether the transaction is legitimate. The payer accepts the transaction if the transaction is legitimate. Alternatively, the payer rejects the transaction if the transaction is not legitimate. The payer's input (e.g., confirmation or rejection) is transmitted from the payer's device to the consumer protection system via the communication channel.

In aspects of the present disclosure, the consumer protection system sends the payer's reply to the intelligent alert system that generated the potential fraud case alert. If the payer accepts the transaction, the intelligent alert system dismisses the alert as a false positive. If the payer rejects the transaction, the intelligent alert system informs the transactional system of the financial institution to stop the transaction. The process of stopping the transaction does not include human interaction. That is, the process is automated. The intelligent alert system can work with the consumer protection system to stop fraud or dismiss a false alert without any human intervention.

Moreover, a payer's rejection of the transaction may indicate that a perpetrator may have stolen the financial instrument, financial account information, identity, etc. from the payer. Under such circumstances, the consumer protection system sends an alert to one or more devices associated with financial institutions, merchants, and any organizations that have subscribed to the services provided by the consumer protection system. As a result, once the payer has rejected a transaction, the payer is protected because the perpetrator cannot use the same method to commit another crime against the payer through the financial institutions, the merchants, and the organizations that have received the alerts.

Given time, all financial institutions, merchants, and any types of organizations that have the need to stop financial crimes may subscribe to the alert services provided by the consumer protection system. Many types of financial crimes, such as check fraud, credit card fraud, debit card fraud, ATM fraud, Internet banking fraud, ACH fraud, wire fraud, virtual currency fraud, identity theft, etc. may be reduced or even eliminated through this method. As such, an amount of financial crimes may be reduced.

Furthermore, in aspects of the present disclosure, consumers and organizations can be encouraged to open accounts with the consumer protection system to become members of the consumer protection system. In some configurations, during the account opening process, the consumer protection system collects a portion of the new member's identification information, such as name, birth date, address, zip code, city, country of residence, etc.

In other aspects of the present disclosure, the consumer protection system collects, through a device interface, from the new member financial instrument numbers and financial account numbers, such as checking account number, savings account number, routing number, credit card number, debit card number, ATM card number, virtual currency wallet number, insurance account number, trading account number, cryptocurrency wallet address number, and any other information that can identify a financial account, a financial instrument, or any financial vehicles that can be used to conduct a transaction. For increased security, the consumer protection system may collect all of a member's financial instrument numbers and financial account numbers.

Additionally, the new member may be prompted, through a device interface, to provide expiration dates and descriptions of the financial instruments, financial accounts, and financial vehicles. Furthermore, the consumer protection system may also prompt the member to provide identification information of the member's device, such as phone number, email address, device interface address, IP address, etc. The member can be either an individual or an organization. This process to collect information from the member is referred to as a "registration process" or an "ownership registration process." The registration process may collect one or more of the identification information, financial instrument numbers and financial account numbers, expiration dates and descriptions, and device identification information.

After a member has opened an account with the consumer protection system and completed the registration process, the member will be protected against many types of financial crimes. For example, a subject (e.g., an individual or an organization) may conduct a transaction with an online merchant with a credit card. The merchant receives the credit card information (e.g., number and expiration date) and transmits the credit card number information and a portion of the transactional details to the consumer protection system. The consumer protection system sends the portion of the transactional details to a device (e.g., a mobile phone) of a member whose credit card number matches the credit card number provided by the subject. The portion of the transactional details may be transmitted based on the member's device identification information provided by the member.

The member may either accept or reject the transaction via the device. If the member accepts the transaction, the consumer protection system informs the merchant system that the transaction has been accepted by the registered owner of the credit card. The merchant system proceeds to complete the transaction without worrying about fraud.

The intelligent alert systems may not be used by all financial institutions, as some financial institutions may have their own system. In the example below, the financial institution systems do not use the intelligent alert system. Additionally, in this example, after the merchant system submits the transaction to the financial institution system for approval, the financial institution system detects the transaction as a fraud alert. In response to detecting the fraud alert, the financial institution system may send a portion of the transactional details and the credit card number to the consumer protection system. Because the member has already accepted the transaction, there is no need to bother the member again. The consumer protection system can inform the financial institution system that the member has already accepted the transaction. The financial institution system can proceed to approve the transaction if there is no other issue, such as insufficient credit, etc. This process can be completed without any human intervention.

In aspects of the present disclosure, if the member rejects the transaction through their device interface, the consumer protection system informs the merchant system that the transaction has been rejected by the registered owner of the credit card. Consequently, the merchant system rejects the transaction of the subject. In this process, there is no third party human involvement to prevent fraud. The merchant system can work with the consumer protection system to stop fraud without any human intervention.

In some cases, the member's rejection of the transaction may indicate that a fraudster has stolen the financial instrument, financial account information, financial vehicle, identity, etc. from the member. Under such circumstances, the consumer protection system sends an alert to one or more devices of financial institutions, merchants, and/or organizations that have subscribed to the alert services provided by the consumer protection system. The devices of the financial institutions, merchants, organizations, etc. communicate with associated computer systems to prevent future financial crimes based on the alert. As a result, once the member rejects a transaction, the member is protected because the perpetrator cannot use the same method to commit another crime against the member at the financial institutions, the merchants, the organizations, etc. that have received the alert.

Although an online merchant was used in the above example, the same method may be applied for all types of merchants. Moreover, although a credit card was used in the above example, other type of financial instruments, financial accounts, financial vehicles, etc. may be used. For reference purposes, the definition of a device interface is provided in the summary section of the present disclosure.

A check deposit fraud case refers to a fraud case when a person deposits a check and quickly withdraws a large amount of cash based on the deposited check before the financial institution can discover that the deposited check is invalid. A check deposit fraud case can easily happen in those financial institutions that do not withhold the deposited checks until the checks are cleared.

As an example application of the consumer protection system, when a subject cashes (or deposits) a check with a financial institution (e.g., bank, credit union, money services business, etc.), the financial institution can send the checking account number, the routing number, the payee name, the check sequential number, and the dollar amount shown on the check to the consumer protection system. The consumer protection system sends the payee name, the check sequential number, and the dollar amount to a device (e.g., a mobile phone) of a member whose checking account number and routing number match the checking account number and routing number shown on the check provided by the subject. The payee name, the check sequential number, and the dollar amount may be transmitted based on the member's device identification information provided by the member to the computer protection system.

The member may either accept or reject the transaction via the device. If the member accepts the transaction, the consumer protection system informs the financial institution that the transaction has been accepted by the registered owner of the checking account. The financial institution proceeds to cash (or deposit) the check without worrying about counterfeit check fraud, altered check fraud, or check deposit fraud.

In aspects of the present disclosure, if the member rejects the transaction through the device interface, the consumer protection system informs the financial institution that the transaction has been rejected by the registered owner of the checking account. Consequently, the financial institution rejects the check provided by the subject.

In addition, the consumer protection system sends an alert to one or more devices of financial institutions, merchants, and/or organizations that have subscribed to the alert services provided by the consumer protection system. The devices of the financial institutions, merchants, organizations, etc. communicate with associated computer systems to prevent future financial crimes based on the alert.

For example, in aspects of the present disclosure, when a subject enters a password to conduct a virtual currency transaction based on a payer's wallet address, the virtual currency transactional system sends the payer's wallet address and a portion of the transactional details to the consumer protection system. The consumer protection system sends a portion of the transactional details to the mobile phone of a member who has registered the wallet address in his account. The member can either accept or reject this virtual currency transaction through a mobile app. The member's action (e.g., member's reply) on his mobile phone can be sent back to the consumer protection system. The consumer protection system can send the member's reply to the virtual currency transactional system. As a result, the virtual currency transactional system can stop the transaction if the member rejects the transaction, even though the subject has entered a correct password. On the other hand, the virtual currency transactional system can complete the transaction if the member accepts the transaction and the subject has entered the correct password. In some configurations, if the member rejects the account access by a perpetrator, the consumer protection system will send an alert to the device interfaces of all alert subscribers to protect the member.

The example provided above is not limited to a mobile device. Other types of devices interfaces are contemplated. Additionally, the user may accept or reject a transaction via an application of the device interface. The transaction based on a virtual currency account can be used for any type of account (e.g., online banking account, insurance account, trading account, etc.) as long as the member has registered the account number with the consumer protection system.

Financial institutions may also be members of the consumer protection system. In some configurations, the computer system of a financial institution sends all the addresses of its customers' device interfaces (e.g., phone numbers, email addresses, etc.), account names, and account numbers to the consumer protection system. The consumer protection system may contact the customers via the device interfaces and prompt them to download an application on the device interfaces (e.g., mobile phones, computers, etc.). In addition, the consumer protection system may prompt the customers to register their account numbers, financial instrument numbers, and other financial data with the consumer protection system through the application. In aspects of the present disclosure, the consumer protection system conducts verification on the information provided by the customers. As a result, all of these customers can become members of the consumer protection system.

Furthermore, if a customer finds out that his/her financial instrument (e.g., checkbook, credit card, debit card, ATM card, etc.) is lost or stolen, the customer may immediately inform the consumer protection system. In response, the consumer protection system informs the computer system of the financial institution to block all transactions associated with the lost or stolen financial instrument. As a result of this proactive action by consumers, financial institutions and merchants are protected by the consumer protection system without any human intervention.

In one possible scenario, all financial institutions, merchants, and organizations subscribe to the alert services provided by the consumer protection system. As a result, the consumer protection system can automatically stop perpetrators from committing crimes against financial institutions, consumers, merchants, and any organizations without any human intervention.

Fraudsters may try to open membership accounts with the consumer protection system and may try to register the financial instrument numbers, financial account numbers, and other financial information of victims based on the contact information (e.g., phone numbers, email addresses, etc.) of the fraudsters. Therefore, the internal fraud prevention of the consumer protection system is important.

In aspects of the present disclosure, when a person tries to open a membership account with the consumer protection system, his/her identification information will be scanned against blacklists provided by various sources, such as an internal blacklist, etc. If there is a match, the consumer protection system will not open the account.

In aspects of the present disclosure, the consumer protection system may periodically scan the members against the regulatory lists, such as the OFAC list, Denied Persons List, etc. This function can be achieved by the popular PATRIOT OFFICER system, available from GlobalVision Systems, Inc. of Chatsworth, CA The consumer protection system is not a financial institution and does not have the regulatory obligations that financial institutions have. Still, it is a desirable to identify members on the regulatory lists and inform the financial institutions when a customer is an identified member of a regulatory list.

This can be an additional service provided by the consumer protection system. Theoretically, if a financial institution makes sure that all of its customers become members of the consumer protection system, the financial institution may not need to worry about the compliance with the regulatory requirements to scan customers against the regulatory lists. This service will be an incentive for financial institutions to cooperate with the consumer protection system. Small financial institutions can save compliance overhead by working with the consumer protection system.

In aspects of the present disclosure, when a person tries to open a membership account with the consumer protection system, the consumer protection system asks the person to provide his/her device interface number (e.g., mobile phone number). In aspects of the present disclosure, the consumer protection system sends a passcode to the device interface (e.g., mobile phone) number via a message and requests the person to enter the passcode into the interface provided by the consumer protection system to open the account. If the person enters the correct passcode into the screen before the passcode expires, the person truly possesses the device interface (e.g., mobile phone). If the person cannot enter the correct passcode, something is wrong and the consumer protection system rejects the person's application for opening an account. This provision makes sure that one person cannot open an account for another person and frame the other person as a fraudster.

In aspects of the present disclosure, the consumer protection system purposely sends the passcode to a different interface that is not used by the member to open a membership account. For example, if the member communicates with the consumer protection system through the Internet, the consumer protection system sends the passcode to the mobile phone of the member. If the member communicates with the consumer protection system through the mobile app, the consumer protection system sends the passcode to an email address of the member.

In aspects of the present disclosure, the consumer protection system compares the mobile phone number and the person's name with the customer records of the mobile phone network carrier that offers the mobile phone services to the owner of the mobile phone. An anomaly may be detected when the name of the person who applies for a membership account with the consumer protection system is different from the name of the customer who subscribes to the mobile phone services. The name of the mobile phone services subscriber may be obtained from the records of the mobile phone network carrier. The consumer protection system may reject the person's application for opening an account in view of the anomaly.

Checking the customer records of the mobile phone network carrier may be time consuming. In aspects of the present disclosure, the consumer protection system first opens a membership account and then checks the customer records of the mobile phone network carrier. If an existing member's name and mobile phone number do not match the customer records of the mobile phone network carrier, the consumer protection system may conduct a background check on this member.

In general, if something suspicious is detected before a membership account is opened, the consumer protection system can reject the application for membership. If something suspicious is detected after a membership account is opened, the consumer protection system can conduct a background check on the member. In aspects of the present disclosure, the consumer protection system does not provide any services to the member (e.g., freezes the account) until the background check has been successfully completed and the member has proven to be innocent.

In aspects of the present disclosure, the consumer protection system conducts account ownership verification based on the method explained below. For example, if a member has registered four financial accounts A, B, C, and D with the consumer protection system. The consumer protection system can transfer a first amount out from account A and a second amount out from account B, then transfer a third amount into account C and a fourth amount into account D. The consumer protection system asks the member to provide the correct values of A, B, C, and D, which are the values randomly set by the consumer protection system. If the member cannot provide the correct answers, the consumer protection system conducts a background check on this member.

The account ownership verification can be conducted for any number of accounts, and is not limited to four accounts. Both the "transfer out" actions and the "transfer in" actions are used so that the member will not feel as if the consumer protection system has taken money from the member. However, either the "transfer out" action or the "transfer in" action is sufficient to verify the accounts. For example, if the member needs to pay a membership fee, only the "transfer out" action is sufficient to verify the accounts.

The account ownership verification may be performed via other processes. For example, if the member has only registered one financial account, the consumer protection system can transfer out two amounts (e.g., X and Y), and ask the member to provide the correct values for the two amounts. After the member has provided the correct answers, the consumer protection system can transfer the combined value (e.g., X+Y) back to the financial account so that the member does not lose any money.

In other configurations, the consumer protection system randomly generates a passcode, equivalent to a dollar amount that may contain a dollar value and a cent value. The consumer protection system sends the passcode to a transactional system that conducts a transaction with the registered financial account of the member based on the value of the passcode.

In aspects of the present disclosure, the consumer protection system prompts the member to enter the passcode through a member's device interface. If the passcode received from the member is the same passcode sent from the consumer protection system to the transaction system, the member has control over the registered financial account. This process has achieved the account verification goal.

For verification purposes, the passcode can be any number. However, the member may feel bad when the consumer protection system transfers out a large amount of money from the registered financial account of the member. Therefore, using a small number may be a good idea so that the member will not feel bad.

In aspects of the present disclosure, the consumer protection system asks a new member to enter the zip code of his/her current residence. If the geo-location of the member's device interface (e.g., mobile phone) is far away from the zip code of the member's current residence, the consumer protection system may conduct a background check on this member.

In aspects of the present disclosure, the consumer protection system can continue to monitor the geo-location of the device interface of the new member. The monitoring determines an amount of time when the geo-location of the member's device interface is far away from the zip code. If the amount of time exceeds a threshold, the consumer protection system may conduct a background check on this member.

In aspects of the present disclosure, when a member conducts a face-to-face transaction with a merchant, the consumer protection system prompts the merchant to enter the name of the member or a partial name of the member based on an official identification card provided by the member. If the name or partial name is different from, or does not correspond to the member's name or partial name in the records of the consumer protection system, the consumer protection system conducts a background check on this member.

In aspects of the present disclosure, when a member conducts a face-to-face transaction with a merchant, the consumer protection system prompts the merchant to enter the birth date of the member or a partial birth date of the member based on an official identification card provided by the member. If the birth date or partial birth date is different from, or does not correspond to the member's birth date or partial birth date in the records of the consumer protection system, the consumer protection system conducts a background check on this member.

In aspects of the present disclosure, if a background check of a member fails, the consumer protection system may close the member's account. In aspects of the present disclosure, if the background check shows that a member has lied, the consumer protection system may close the member's account. In aspects of the present disclosure, once the consumer protection system has closed a member's account due to a fraudulent circumstance (e.g., failed background check), the consumer protection system will add the member to its internal blacklist.

In aspects of the present disclosure, the consumer protection system records the time stamp when each financial instrument, financial account, financial vehicle, financial information, etc., is registered by the member. In other aspects of the present disclosure, the consumer protection system verifies the accuracy and the ownership of each financial instrument, financial account, financial vehicle, financial information, etc. that is registered by the member and only starts to provide services for a specific financial instrument, financial account, financial vehicle, financial information, etc. after its verification is successful. Therefore, in the database of the consumer protection system, each financial instrument, financial account, financial information, etc. may have a "start service time stamp" which is different from, or later than "the registration time stamp."

In aspects of the present disclosure, if any of the registered financial instruments, financial accounts, financial vehicle, financial information, identity, etc. is inaccurate, the consumer protection system may inform the member to make the correction. The consumer protection system monitors and records the number of corrections made by each member. In aspects of the present disclosure, if a number of corrections is greater than a threshold, the consumer protection system may consider conducting a background check on the member.

In aspects of the present disclosure, whenever a member registers a new financial instrument number, the consumer protection system scans the new financial instrument number against all the financial instrument numbers of all members in the database. If there is any match, additional actions, such as a background check, may be performed. The financial instrument number may also refer to a financial account number, financial vehicle, or other types of financial information. In aspects of the present disclosure, the consumer protection system conducts background checks on both the member who registers the new financial instrument number and the member with a matching financial instrument number.

In some configurations, a financial institution sends a financial instrument number, a portion of transactional details, and a device interface address (e.g., a mobile phone number) to the consumer protection system for verification purposes. In response, the consumer protection system compares the device interface address provided by the financial institution with the device interface address provided by a member. The member is identified based on a financial instrument number. If the member has a different device interface address, additional actions may be performed. In aspects of the present disclosure, the consumer protection system conducts a background check on the member when the member's device interface address is different from the device interface address provided by the financial institution.

In aspects of the present disclosure, the above method to detect inconsistent device interface addresses may also be used to detect inconsistencies of other types of information, such as name, birthday, etc. If an inconsistency is detected, the consumer protection system conducts a background check on the member having the inconsistent information.

When the consumer protection system receives a "verification inquiry" from a financial institution, a merchant, or another organization regarding a transaction associated with a particular financial instrument of a member, the inquiry results may indicate the accuracy of the financial instrument (or financial account, financial vehicle, financial information, etc.). For example, if a member has frequently accepted transactions regarding a financial instrument, and no financial institution, merchant, or other organization has ever complained about the reply from the member, it further confirms that the member is the true owner of the financial instrument.

In aspects of the present disclosure, the consumer protection system records the inquiries, the time stamps of the inquiries, and the inquiry results for each financial instrument of a member. Each inquiry result consists of two parts. One is the "yes" or "no" answer given by the member, the other is whether the inquirer has complained later about the answer provided by the member.

In aspects of the present disclosure, the consumer protection system records the chargebacks and the time stamps of the chargebacks for each financial instrument, financial account, financial vehicle, financial information, etc. of a member. The chargeback information is provided by the merchants through device interfaces provided by the consumer protection system. If a number of chargebacks by a member is greater than a threshold, the consumer protection system may conduct a background check on the member.

In aspects of the present disclosure, the consumer protection system determines whether a member is credible based on the historical inquiries, the time stamps of the inquiries, the inquiry results, the chargebacks, the time stamps of the chargebacks, etc. for all financial instruments of the member. In other aspects of the present disclosure, the consumer protection system establishes a credibility score for each member. In other aspects of the present disclosure, the consumer protection system provides the credibility scores of members to financial institutions, merchants, or other organizations as services.

It is possible that a fraudster tries to take over the account of a member by changing the contact information, device interface addresses, etc. of the member. Therefore, security should be used to protect the member against any change of a member's contact information, device interface addresses, etc.

In aspects of the present disclosure, the consumer protection system asks a challenge question when the member tries to change his/her contact information. In other aspects of the present disclosure, a set of challenge questions is designed by a member when the member tries to open a membership account. A challenge question should not have "yes" or "no" as an answer. Therefore, it is a good idea to design a challenge question based on "who, where, what, when, how, etc."

In aspects of the present disclosure, the consumer protection system uses a previous inquiry history or a previous user action as a challenge question. For example, the question can be "which store asked you to confirm a transaction through the consumer protection system on about September 22?" Another example can be "which financial instrument did you register with consumer protection system on about January 16?" If these types of challenge questions are used, the application running on the device interface (e.g., mobile app) of the member should only show a limited length of history, e.g., 7 days, so that a fraudster cannot find the answers to the challenge questions from the application running on the device interface.

In aspects of the present disclosure, the consumer protection system keeps all historical records for a period of time, e.g., five years. For example, when a member replaces an old credit card number with a new credit card number, the old credit card number and all related records, including the replacement date, are stored in a database. Such record keeping can also be handled by the PATRIOT OFFICER system, which is popular in the financial industry.

Although the consumer protection system does not process any financial transactions, its operations may be similar to a financial institution. Each member can be viewed as a customer. Each registered financial instrument, financial account, financial vehicle, financial information, identification information, etc. can be viewed as one account under the customer. Each inquiry from a third party can be viewed as a type of transaction. Each inquiry result can be viewed as a type of transaction. Each chargeback can be viewed as a type of transaction. Each complaint from a third party about the member can be viewed as a type of transaction. Therefore, the intelligent alert system can also be used to produce alerts based on the data in the database of the consumer protection system. As a result, the intelligent alert system empowers the consumer protection system to prevent the fraud committed by members or prospective members.

An individual is typically identified by his/her name, date of birth, place of residence, a unique government issued identification number such as social security number, driver's license number, passport number, etc. However, partial identification information, such as the person's initials is far from being sufficient for identification purposes. Similarly, other partial information such as the last four digits of the social security number or driver's license number, the street number, last four digits of the zip code, the last digit of the month of birth, etc. is also insufficient for identification purposes.

Nevertheless, in aspects of the present disclosure, if several pieces of such partial identification information from the same subject are combined together through a pre-agreed data manipulation process, they form a set of encoded data, or an identity code, that can be used for identification purposes even though nobody understands the meaning of the identity code.

Similarly, in aspects of the present disclosure, to provide higher security and privacy, an advanced encryption technique encrypts the identification information to form an identity code. If we purposely hide or destroy the key for decryption, there may be no chance to recover the identification information behind the identity code.

In yet another application of the present invention, we can combine the above encryption with encoding of partial identification information to form an identity code. The chance to recover the original identification information from this identity code is practically zero. Although it is not possible to decode and/or decrypt an identity code to obtain the original identification information, two matched identity codes will signify that the original identification information of two subjects, which both correspond to this matched identity code, may match each other with a very high probability.

For example, the probability for two persons to have the same last five digits in both the social security number and driver's license number is 1 out of 10 to the power of 10 or 1 out of ten billion. The probability for these two persons to also have the same last two digits for year of birth is 1 out of 10 to the power of 12 or 1 out of one trillion. Furthermore, if these two persons also have the same zip code, the probability will become 1 out of 10 to the power of 17, which practically may never happen. By combining these pieces of information together through a pre-agreed data manipulation process, we can construct a set of encoded data, which becomes an identity code.

For a person with an English name, we can include, for example, the first two letters of the first name and the first two letters of the last name as a portion of the identity code. Although these four letters cannot provide sufficient information about the person's name, adding these four letters into the identity code can substantially decrease the chance for two persons to have the same identity code.

It is conventional in the computer industry to use a single byte to represent an English letter. In aspects of the present disclosure, an English letter is transformed into another byte that has a different meaning. For example, letter A can be transformed into letter W. Such a transformation has the effect of hiding the original meaning. For example, the name "John" can be transformed into "Oh!a." People who do not know the transformation rule have no idea what Oh!a means. The bytes produced by the transformation can be used to form an identity code that has nothing to do with the original meaning before the transformation.

Some countries do not use English as their official language and a unit of multiple bytes may be used to encode their languages (e.g., UTF-8, UTF-16, UTF-32, GB 18030, etc.). Modern POSIX documentation defines "character" as a sequence of one or more bytes representing a single graphic symbol or control code. Therefore, regardless of which character coding method is used, the languages used by different countries or cultures may consist of single-byte and multiple-byte units. To avoid confusion, a single-bye unit or a multiple-byte unit is generally referred to as a character in the present disclosure.

In aspects of the present disclosure, a transformation converts each original multiple-byte unit into a new multiple-byte unit to hide the original meaning. The new multiple-byte units produced by the transformation can be used to form an identity code, which hides the original meaning.

In another application of the present disclosure, a transformation converts each byte in an original multiple-byte unit into a new byte to hide the original meaning. The new multiple-byte units produced by the transformation can be used to form an identity code that hides the original meaning.

In yet another application of the present disclosure, an algorithm breaks the original set of multiple-byte units into a set of bytes, selects some bytes from the set of bytes, transforms them into a different set of bytes, rearranges their sequence, and then recombines them together to form a new set of multiple-byte units. The new set of multiple-byte units can be used to form an identity code that hides the original meaning. People who do not know the transformation rule have no idea what the original set of multiple-byte units is.

The above methods to form an identity code are just some examples. There are numerous ways to convert a set of bytes or multiple-byte units, regardless of the language, into an identity code. Although the identity code can be theoretically converted back to recover some original bytes or multiple-byte units, the original information cannot be recovered if only a small portion of the original bytes or multiple-byte units are used for the conversion.

Similarly, if we encrypt a sufficient amount of identification information to form an identity code, the chance for two persons to have the same identity code can be reduced to almost zero. For example, hashing, a type of encryption method, can encrypt the identification data of two subjects. If the identification information of two subjects stored in two databases have the same hashing result (e.g., hash), they are likely to be the same subject.

The above methods to use different types of transformation rules to form an identity code are just some examples. There are numerous possible transformation rules.

In general, transformations can be classified into three types: multiple-to-one, one-to-multiple, or one-to-one. The input to the transformation is the source. The output of the transformation is the image. A multiple-to-one transformation may convert multiple different sources into the same image. A one-to-multiple transformation may convert one unique source into multiple different images. A multiple-to-one transformation and a one-to-multiple transformation can cause confusion. Therefore, it is desirable to use a one-to-one transformation, which converts a unique source into a unique image.

If we use a one-to-one transformation method to convert a sufficient amount of identification information of each subject into a corresponding set of image data, the set of image data can be used to identify the subject even though it does not contain any of the original identification information. As a result, when two sets of image data are identical, their corresponding sets of source data are also identical. This means that these two matched sets of image data may belong to the same subject.

In aspects of the present disclosure, we use the image data of a subject to identify the subject. The image data is produced through a one-to-one transformation from the identification data. The image data of the subject is also referred to as the token of the identification information of the subject, a token of the subject, or an identity code.

When two parties discuss matters based on the same identity code, they know they are discussing the same subject. No third parties can understand the true identity behind this identity code; and thus, the privacy of the subject is preserved. An identity code can be used to identify any subject, such as a person, an object, an organization, a legal entity, a tangible property, an intangible property, a document, a concept, a plan, a design, a benefit, an asset, a liability, a trade secret, an equity, money, confidential information, a financial instrument, a non-financial instrument, etc. while at the same time maintaining privacy.

To achieve the goal of using the same one-to-one transformation method by two parties, in aspects of the present disclosure, a pre-agreed rule or set of rules is used to select, encode, arrange, encrypt, convert, and/or transform the pieces of identification data from a subject to form an identity code, which is essentially unique to that subject and which conceptually serves as a public proxy for that subject's private identification data, a token of the subject's private identification data, or a token of the subject.

In aspects of the present disclosure, the identity code is established based on a pre-agreed relatively simple transformation of the private identification information such as a straightforward concatenation of only some specified individual digits and letters selected from the original identification information.

In other aspects of the present disclosure, the identity code is established through a pre-agreed relatively complex transformation of the specified digits, letters, and bytes. The transformation could include known methods of data conversion, transformation, encryption, and/or encoding of the selected pieces of the identification data, thus further protecting the privacy of the original identification data from unauthorized access.

Moreover, because only a small and relatively meaningless portion of the private information is used to generate the identity code, even if that portion is recovered by a malicious third party, the privacy of the remaining identification information will still be preserved and it will not be possible to steal the identity of the concerned subject.

In aspects of the present disclosure, multiple computer systems are connected through a network (e.g., the Internet). Each of the computer systems may reside at one organization. In aspects of the present disclosure, a central computer system is connected to the network to control the functions, the mechanism, and the communication of the computer systems connected to the network.

In aspects of the present disclosure, a one-to-one transformation converts the identification information of each customer into a unique identity code, which is a set of image data, in each organization. The identity codes of all customers are stored in a database in each organization. The relationship information (e.g., account number, customer number, etc.) to link each identity code to its customer is also stored in the database.

In aspects of the present disclosure, a computer interface is provided on each of the computer systems so that a person in an organization can select any customer, and send the customer's identity code to the central computer system of the network. The organization that sends the identity code is referred to as the originator organization or the sender of the identity code.

In aspects of the present disclosure, when the central computer system receives an identity code from an originator organization, the central computer system sends the identity code to all the other computer systems on the network. Each of the other computer systems on the network scans the received identity code produced by the originator organization against all of the identity codes stored in its database. These identity codes stored in the database are the images or tokens of the identification information of the customers in the organization.

In aspects of the present disclosure, if there is a match between the received identity code and one of the identity codes stored in the database, the computer system of the organization with the match sends a message to the central computer system to indicate that a match is found in the organization. The organization that has the matched identity code is referred to as matched organization or a recipient with a matched identity code.

In aspects of the present disclosure, the computer system which has a matched identity code uses the relationship information (e.g., account number, etc.) to identify the corresponding customer whose identification information was converted into the matched identity code.

In aspects of the present disclosure, the computer system of the matched organization sends to the central computer system additional information associated with the customer who has the matched identity code. The additional information may include background information and transactional information of the customer who has the matched identity code.

In aspects of the present disclosure, the central computer system sends the additional information received from the computer system of the matched organization to the computer system of the originator organization, which sends the identity code.

In aspects of the present disclosure, the computer system of the originator organization uses the relationship information (e.g., customer number, etc.) to identify the customer whose identification information was converted into the identity code. This customer is referred to as the originator customer.

In aspects of the present disclosure, the computer system of the originator organization sends to the central computer system additional information associated with the originator customer. The additional information may include background information and transactional information of the originator customer.

In aspects of the present disclosure, the central computer system sends the additional information associated with the originator customer to the computer system of the matched organization. In aspects of the present disclosure, the central computer system sends the contact information of a contact person in the originator organization to a contact person in the matched organization. In aspects of the present disclosure, the central computer system sends the contact information of a contact person in the matched organization to a contact person in the originator organization. As a result, the users of the computer systems on the network can communicate with one another and coordinate their efforts regarding a common subject, which is represented by the identity code, without disclosing any identification information about the user's own subject that is not already known to the other users.

In aspects of the present disclosure, the computer system of the originator organization uses the additional information of the matched customer received from the matched organization and the originator organization's own information to conduct an analysis to drive a new piece of information about the originator customer. For example, the new piece of information may be related to a potentially fraudulent activity, a money laundering activity, a crime, etc. related to the originator customer. The new piece of information may also be related to a good activity, such as anonymous donation, etc. When more information is available from more data sources, a better analysis can be performed to produce a better forecast, estimate, conclusion, etc.

Similarly, in aspects of the present disclosure, the computer system of the matched organization uses the additional information of the originator customer received from the originator organization and the matched organization's own information to conduct an analysis to drive a new piece of information about the matched customer. For example, the new piece of information may be related to a potentially fraudulent activity, a money laundering activity, a crime, etc. related to the matched customer.

In aspects of the present disclosure, the computer system of an originator organization sends to the central computer system an identity code and a piece of related information, which needs to be verified. In aspects of the present disclosure, the central computer system sends to all other computer systems on the network the identity code and the piece of related information received from the originator organization. In aspects of the present disclosure, the computer system of a matched organization uses the matched identity code to identify the matched customer, then to verify whether the received piece of related information is accurate. In aspects of the present disclosure, the computer system of the matched organization sends to the central computer system a message to indicate whether the piece of information related to the identity code is accurate. In aspects of the present disclosure, the central computer system sends to the computer system of the originator organization the message received from the matched originator that indicates whether the piece of information related to the identity code is accurate.

The above method has a broadcasting effect. The method can be used when the originator organization does not know which other organizations may be able to verify the piece of related information. Therefore, the central computer system sends the identity code to all other computer systems on the network.

Sometimes, the originator organization knows which other organization can verify the piece of related information. Under such circumstances, in aspects of the present disclosure, the computer system of an originator organization sends to the central computer system an identity code, a piece of related information to be verified, and identification information of a specific computer system on the network.

In aspects of the present disclosure, the central computer system sends to the specific computer system the identity code and the piece of related information received from the originator organization. In aspects of the present disclosure, the specific computer system uses the matched identity code to identify the matched customer, then to verify whether the received piece of related information is accurate. In aspects of the present disclosure, the specific computer system sends to the central computer system a message to indicate whether the piece of information related to the identity code is accurate. In aspects of the present disclosure, the central computer system sends to the computer system of the originator organization the message received from the specific computer system that indicates whether the piece of information related to the identity code is accurate. Instead of verifying whether a piece of information related to the identity code is accurate, in aspects of the present disclosure, the originator organization can ask the matched organization to send certain information about the matched customer based on the identity code.

The above applications are very useful. For example, if a consumer applies for a new account with Organization ABC and claims he has an account with Bank XYZ, Organization ABC can quickly verify whether the information provided by the consumer is correct if both Organization ABC and Bank XYZ are on the network of the present disclosure, although the identification information of the consumer has never been transmitted over the network. Only the identity code, which cannot be understood by any third parties, has been transmitted over the network. The privacy of the consumers is fully protected.

In aspects of the present disclosure, to verify whether the consumer truly owns the account at Bank XYZ, Organization ABC may ask the consumer to provide an account number, recent transaction amounts, recent transactional dates, other recent activities, background information, or any other information that may be stored with Bank XYZ. Alternatively, in aspects of the present disclosure, to verify whether the consumer truly owns the account at Bank XYZ, Organization ABC may collect information from Bank XYZ through the consumer's identity code, and then asks the consumer to answer some questions based on the information. For example, the question may be "what was the last transaction amount in that account?" What was the last transaction date? If the consumer can answer all these questions correctly, it is likely that the consumer owns the account at Bank XYZ.

Because some consumers may not have good memory, in aspects of the present disclosure, the questions can be designed to have multiple choices. For example, the question may ask the consumer to pick one out of five figures as the last transaction amount. In aspects of the present disclosure, after the consumer has answered a series of questions correctly, Organization ABC can feel confident to open an account or conduct a transaction for the consumer, or fulfill a request by the consumer without worrying about identity theft.

In aspects of the present disclosure, the computer system of an originator organization sends to the central computer system an identity code and a set of requests, which may include requests for information, requests for actions, or other type of requests. In aspects of the present disclosure, the central computer system sends to all other computer systems on the network the identity code and the set of requests received from the originator organization.

In aspects of the present disclosure, the computer system of a matched organization uses the matched identity code to identify the customer whose identification information corresponds to the identity code. For requests for information, the computer system of the matched organization collects the pieces of the information of the customer based on the set of requests. For requests for actions, the computer system of the matched organizations instructs device interfaces of the matched organization to take the requested actions.

In aspects of the present disclosure, the computer system of the matched organization sends to the central computer system the collected information based on the matched identity code. In aspects of the present disclosure, the central computer system sends to the compute system of the originator organization the collected information based on the matched identity code.

The above applications can be used, for example, by law enforcement organizations. For example, if a law enforcement agency (e.g., FBI) needs information about a criminal John Doe, the law enforcement agency can send the identity code of John Doe to all organizations connected to the network to collect information about John Doe. The requests may include, for example, information regarding the address, phone number, email address, balance of account, the largest wire transaction amount, the date of the transaction, the recipient of the wire, the sender of the wire, etc. The government agency can instantly collect all the information it needs about John Doe from all organizations connected to the network, although the identification information of John Doe has never been transmitted over the network. Only the identity code, which cannot be understood by any third parties, has been transmitted over the network. The information collection about John Doe by the government agency is kept secret.

For example, if the law enforcement agency wants to find or arrest the criminal John Doe, the law enforcement agency can send the identity code of John Doe to all organizations connected to the network and request them to freeze all accounts of John Doe and stop all transactions with John Doe. The computer systems of all matched organizations instruct the device interfaces controlled by the organizations to freeze John Doe's accounts, and stop John Doe's transactions so that John Doe cannot survive in the modern computer-controlled world. It is just a matter of time before John Doe surrenders to the law enforcement agency. Because only the identity code, which cannot be understood by any third parties, has been transmitted over the network, the plan of the government agency to find or arrest John Doe is kept secret.

Although customers are used as an example in the above explanations, the applications of the present disclosure can be used for any tangible or intangible subjects, including customers, employees, contractors, suppliers, collection items, intellectual properties, trade secrets, etc. Although background information and/or transactional information is used in the above explanations, any type of information can be used in the applications of the present disclosure.

The applications of the present disclosure have established a brand new private and confidential communication network for computer systems. An identity code is used as a token to identify all subjects that may reside in the databases of the computer systems connected to the network. The central computer system is the control and communication center of the network. The communication may consist of a group communication when multiple computer systems have the same identity code. The communication may also consist of a point-to-point communication, when a specific pair of computer systems communicate with each other. The communication between the central computer system and the computer systems on the network can be achieved through email, a phone call, file transfer protocol (FTP), web service, mobile app, or any communication method that is available for computer communication purposes. FIG. 1A illustrates an example of an intelligent alert system 500 (e.g., a device interface) and a computer network 600, such as a local area network, according to aspects of the present disclosure. In some configurations, the intelligent alert system 500 enables a BSA Officer 100, Compliance Officer 200, investigator 300 and Other Responsible Person 400 to comply with different types of laws and regulations and send SAR cases directly to another computer system 700 at FinCEN.

The Compliance Officer 200 configures and/or adjusts the parameters of the computer system 500 via the computer network 600. The computer system 500 uses an internal workflow function to send a potential case through the computer network 600 to the investigator 300. After the investigation, the investigator 300 sends the potential case and her investigation results through the computer network 600 to the computer system 500. The computer system 500 uses an internal workflow function to send the potential case and investigation results through the computer network 600 to the BSA Officer 100 for approval. After the BSA Officer 100 has approved the investigation results, if the potential case is a true positive, the computer system 500 receives the approval from the BSA Officer 100 through the computer network 600. Then, the computer system 500 sends the true positive to the computer system 700 at FinCEN.

In some financial institutions, the same person may have multiple job roles. For example, one person can be the BSA Officer, the Compliance Officer, and the investigator. Under such circumstances, the intelligent alert system uses its internal workflow function to assign different jobs to this person based on his different roles at different stages of the workflow.

After the computer system 500 has learned the experience of the investigator 300, the computer system 500 will become smarter and will automatically accept a potential case as a true positive if the conditional probability for the potential case to become a true positive is higher than a predefined value. Under such circumstances, the computer system 500 directly sends the true positive to the computer system 700 at FinCEN without any third party human involvement. The more the computer system 500 has been used by the investigator 300, the smarter the computer system 500 becomes. Over time, the computer system 500 will handle a majority, or all, of the potential cases by itself with little human involvement.

Figure 1B:
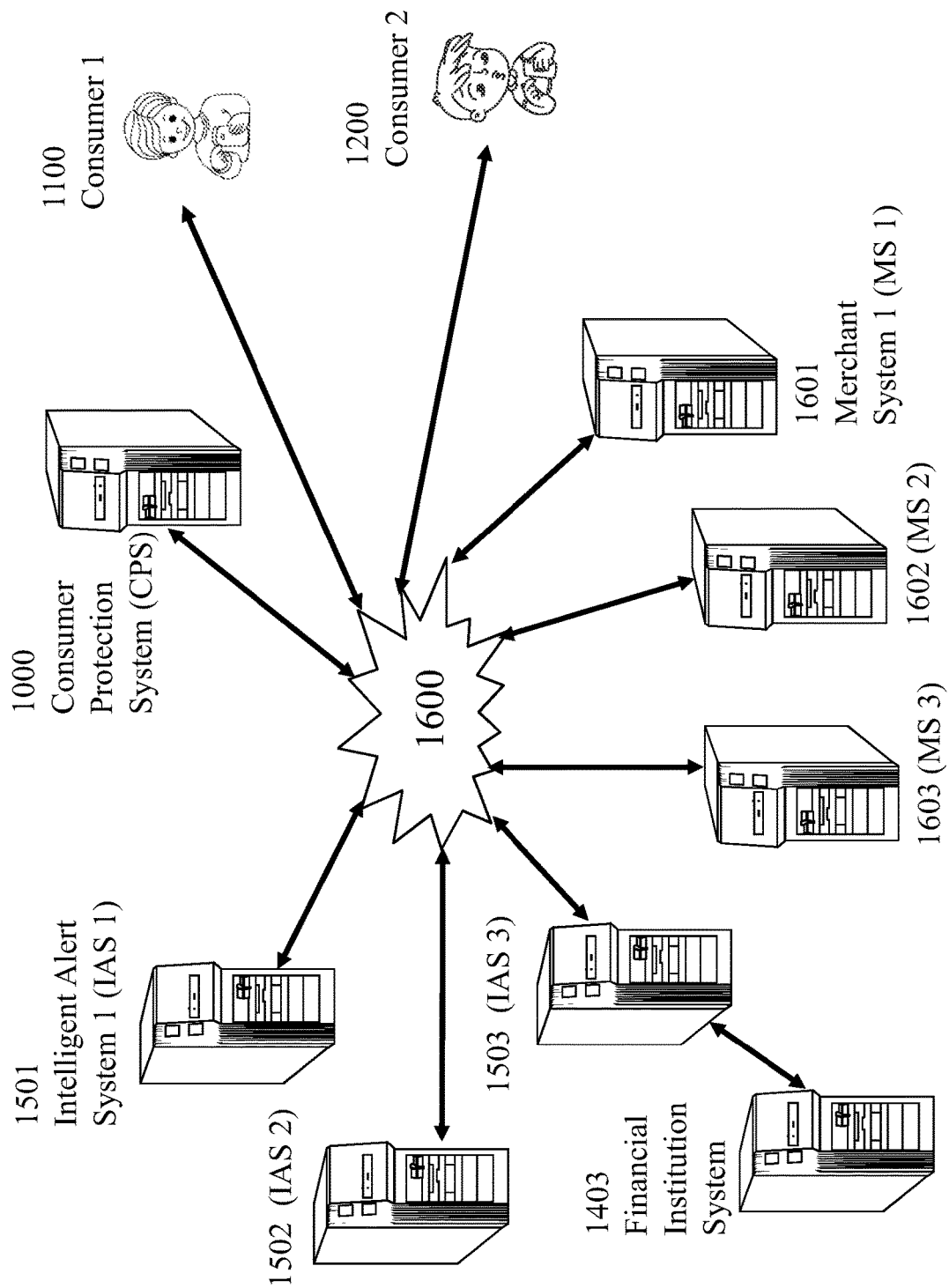
FIG. 1B illustrates a system and network diagram of a consumer protection system, according to aspects of the present disclosure.

FIG. 1B illustrates an example of a computer system 1000 (e.g., a device interface) that protects consumers according to aspects of the present disclosure. In some configurations, the computer system 1000 connects to three intelligent alert systems 1501, 1502, and 1503 residing at three financial institutions, three merchant systems 1601, 1602, and 1603 residing at three merchant sites, and two consumers 1100 and 1200. The connections may be established via a network 1600, which may be a wired network and/or a wireless network. As an example, the intelligent alert system 1503 also connects to a financial institution system 1403 that processes transactions for the financial institution. The connection between the intelligent alert system 1503 and the financial institution system 1403 may be established via an internal network inside the financial institution.

Figure 1C:
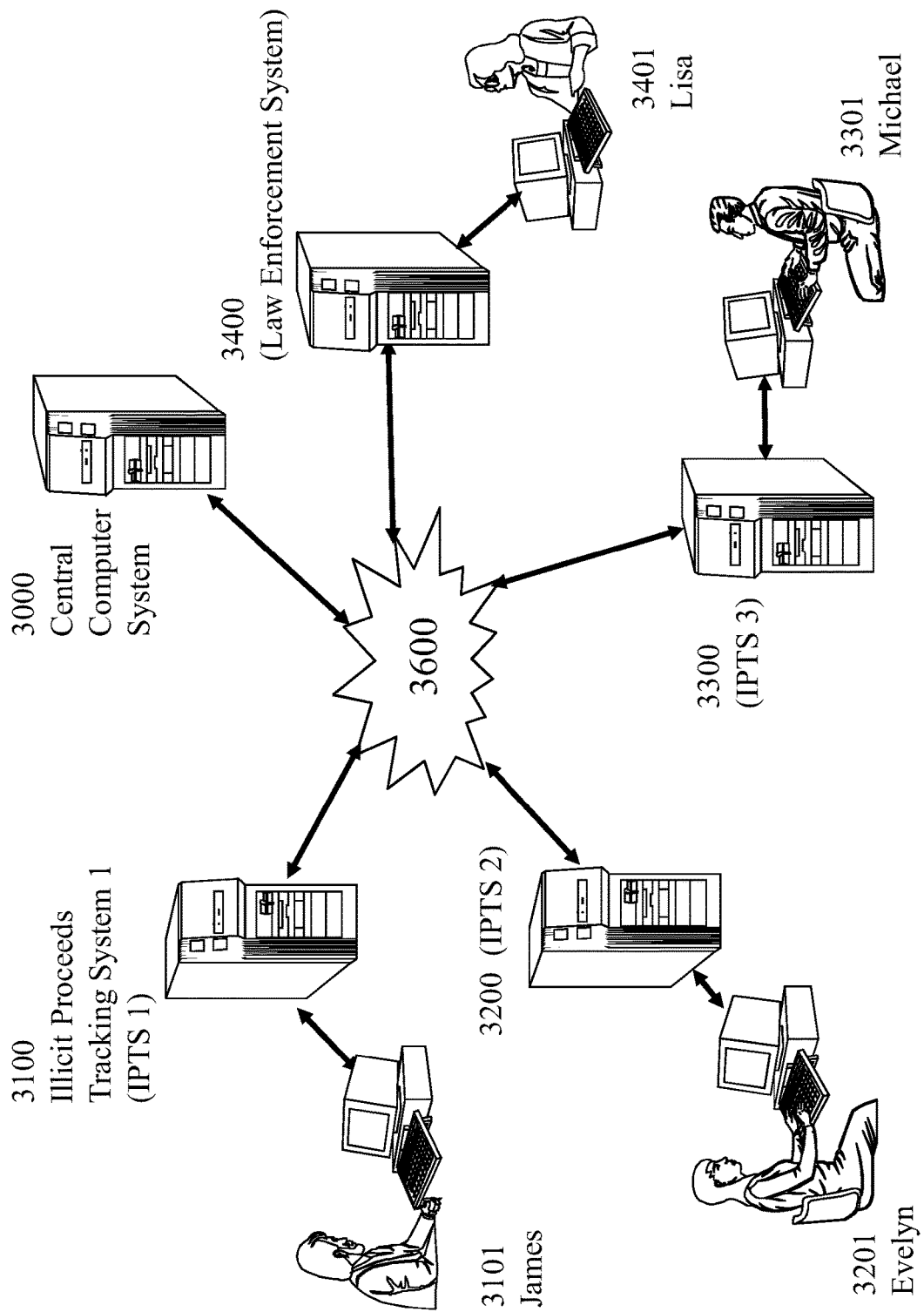
FIG. 1C illustrates a system and network diagram of an illicit proceeds tracking system, according to aspects of the present disclosure.

FIG. 1C illustrates an example of a central computer system 3000 (e.g., a device interface) connecting to a network of computer systems (e.g., device interfaces) according to aspects of the present disclosure. In some configurations, the central computer system 3000 connects to three illicit proceeds tracking systems 3100, 3200, and 3300 residing at three financial institutions, and a law enforcement system 3400 residing at a government agency. The connections may be established via a network 3600, which may be a wired network and/or a wireless network (e.g., the Internet). Each of the illicit tracking systems and the law enforcement system also connects to a user via an internal network inside the organization. In this example, James 3101, Evelyn 3201, and Michael 3301 work for three different financial institutions. Lisa 3401 works for a government law enforcement agency.

Emails are often used by computer hackers to spread computer viruses or malware. How to conduct email address spoofing is taught on the Internet and even kids in primary schools can learn how to spoof email address and pretend to be another person to send email.

Many people do not open any emails from unknown sources. Even after opening emails from friends, many people do not open any attachments or click on any links in the email because they are not sure whether the emails are truly sent by their friends. As a result, many people try to avoid including attachments or URL links in their emails. However, without the ability to include an attachment or a URL link, an email has limited usage. Email fraud has damaged the original purposes of email communication.

Some companies have used secure email systems that require recipients to log into a website to read emails and reply to emails. Although these secure email systems have preserved the confidentiality of the email contents, they have created additional risks to email recipients. Because of the prevalence of email address spoofing, the recipients may fall into the trap of a phishing scheme when he logs into a fake secure email website.

In aspects of the present disclosure, an email certification system is designed to certify email. Either an individual or a business can open an account with the email certification system based on a procedure similar to a bank account opening procedure or an account opening procedure, such as the consumer protection system. In aspects of the present disclosure, for an individual account, in addition to personal identification information, the email certification system collects and stores with the individual's account the email address and the device interface address (e.g., mobile phone address, the mobile phone number, user ID, IP address, etc.) of the individual.

For fraud prevention purposes, during the account opening process and/or the ongoing security maintenance process, the email certification system sends a one-time passcode via email to the email address of the individual. If the individual can correctly enter the passcode into the user interface provided by the email certification system, it is reasonably safe to assume that the individual truly controls the email account. In aspects of the present disclosure, the person who opens an account with the email certification system is prompted to download a mobile app or a piece of software provided by the email certification system.

For a business account, which may send a large quantity of marketing promotional emails, the email certification system stores with the business account the identification information of the business and the email address of the business. Additionally, the email certification system stores with the business account the identification information, the email address, and the device interface address (e.g., mobile phone number, mobile phone address, user ID, IP address, etc.) of the authorized person of the business.

For fraud prevention purposes, during the account opening process and/or the ongoing security maintenance process, the email certification system sends a one-time passcode via email to the email address of the authorized person of the business. If the authorized person of the business can correctly enter the passcode into the user interface provided by the email certification system, it is reasonably safe to assume that the authorized person of the business truly controls the email account. In addition, the email certification system sends a one-time passcode via email to the email address of the business. If the authorized person of the business can correctly enter the passcode into the user interface provided by the email certification system, it is reasonably safe to assume that the authorized person of the business truly controls the email account of the business. Moreover, in aspects of the present disclosure, the authorized person of the business is prompted to download a mobile app or a piece of software provided by the email certification system.

If a person has multiple personal email addresses and multiple business email addresses, in some aspects of the present disclosure, each of the email addresses needs to be verified by the one-time passcode verification method to make sure that this person truly controls the email account of each email address. The following example illustrates how the email certification system works.

When Johnnie with email address Johnnie@walker.com wants to send an email with an attachment to his friend Jack with email address Jack@daniel.com and send a courtesy copy (e.g., the CC field of the email) to his friend Remy with email address Remy@martin.com and a blind courtesy copy (e.g., the BCC field of the email) to Jim with email address Jim@beam.com, Johnnie can use his conventional email communication method to list Jack@daniel.com in the To field of the email; Remy@martin.com in the CC field of the email; and Jim a Jim@beam.com in the BCC field of the email. In addition, Johnnie includes a designated email address of the email certification system into the To field and/or the CC field of the email.

For the purposes of explanation, let us assume this designated email address for the email certification system is certify certify@globeam.com. As a result, Johnnie's email will be sent to four recipients with email addresses Jack@daniel.com, Remy@martin.com, Jim@beam.com, and certify@globeam.com.

In aspects of the present disclosure, once the email certification system receives the email from Johnnie, the email certification system contacts Johnnie via a mobile app, a personal communication device, or any device interface to ask Johnnie whether he has sent such email. In this example, the email certification system contacts Johnnie via the mobile app, which he downloaded from the email certification system during the account opening process.

In aspects of the present disclosure, if Johnnie confirms that he has sent the email, the email certification system will send an email, text message, or other types of message including an email certification code to Jack@daniel.com, Remy@martin.com, and Jim@beam.com. In aspects of the present disclosure, the email certification system will send an email, text message, or other type of messages including an email certification code to Johnnie@walker.com.

In other aspects of the present disclosure, the email certification system forwards the email from Johnnie to Jack@daniel.com, Remy@martin.com, and Jim@beam.com. In addition, the email can also be forwarded to Johnnie@walker.com so that Johnnie knows what has happened. Moreover, in the forwarded email, the email certification system lists an email certification code and prompts Jack, Remy, or Jim to go to a website of the email certification system to verify the email certification code, or use the mobile app or software provided by the email certification system to verify the validity of the email based on the email certification code.

Jack, Remy, or Jim can go to the website of the email certification system to enter the email certification code. The email certification system will confirm that Johnnie is the sender and has certified the email.

Jack, Remy, or Jim has an option not to verify the validity of the email. However, skipping this verification process has a risk because a fraudster can also spoof the email address of the email certification system and fabricate a fake email with a fake email certification code to fool the recipient. It is advisable for the email recipient to verify with the email certification system whether the received email is truly sent by the sender whom the recipient knows.

In aspects of the present disclosure, if each of Jack, Remy, and Jim has opened an account with the email certification system and downloaded the mobile app or the software provided by the email certification system, the email certification system can use the email addresses of Jack, Remy, and Jim to identify their device interface addresses (e.g., mobile phone numbers, mobile phone addresses, IP addresses, user IDs, etc.) and inform them that Johnnie has sent the email. Under such situations, there is no need for Jack, Remy, or Jim to go to the website of the email certification system to verify the email certification code.

As a result of the confirmation by Johnnie via the email certification system, Jack, Remy, or Jim can open the email attachments or click on the links inside the email from Johnnie without any concern about fraud. Even if Johnnie is in a different time zone and has already fallen asleep when Jack, Remy, or Jim wakes up, Jack, Remy, or Jim can confidently open the email from Johnnie, click on the URL links, open the attachments, or take an action in response to Johnnie's email without bothering Johnnie to find out whether Johnnie has truly sent the email.

Because there are trillions of emails sent through the Internet every day, a very long email certification code is specified to uniquely identify each email. In some aspects of the present disclosure, when Jack, Remy, or Jim goes to the email certification system to verify whether Johnnie has truly sent the email, the email certification system also asks Jack, Remy, or Jim to enter his own email address or other email identification information, e.g., time stamp, sender's email address, etc., in addition to entering the email certification code. This request for additional information can enhance the security of the email certification system and reduce the need for having a long email certification code to avoid duplications because the probability for a recipient to receive the same email certification code issued by the email certification system again within a short period of time is practically zero.

With the combination of an email certification code and a recipient email address (or other unique information associated with the email), even if an email certification code is reused again, each email can be uniquely identified because the recipient email address or other unique information about the email can distinguish one email from others. Under such circumstances, a short email certification code can be used. A shorter email certification code is easier to produce.

It may become inconvenient if a sender needs to certify every email he sends. A general guideline is that a sender may only want to certify an email if the email contains an attachment, a URL link, a critical message, an important message, a private matter, a confidential matter, or an unusual purpose. This situation is similar to sending traditional letters via post office where people do not certify every letter they send.

In aspects of the present disclosure, if Johnnie denies that he has sent the email, the email certification system will send an email or text message to Jack@daniel.com, Remy@martin.com, Jim@beam.com, and/or Johnnie@walker.com and warn them that the email was not sent by Johnnie. As a result, the email certification system will protect Jack, Remy, and Jim against computer hacking and email fraud. It also warns Johnnie that he should investigate this matter because Johnnie's computer may have been compromised.

In other aspects of the present disclosure, if Johnnie denies that he has sent the email, the email certification system will warn Jack, Remy, and Jim via a mobile app, a personal communication device, or any device interface that Johnnie did not send them any email and they should not open the email from Johnnie. Under such situations, Jack, Remy are Jim are protected against computer hacking and email fraud. Johnnie is alerted of potential hacking of his email account.

In some aspects of the present disclosure, if Johnnie denies that he has sent the email, it is possible that a hacker has taken over his email account to commit fraud. To prevent fraud, the email certification system sends Johnnie's email address to participating organizations (e.g., financial institutions, merchants, other businesses, etc.) so that they can be alerted of the situation that Johnnie's email address may have been compromised. They can scan Johnnie's email address against the email addresses from their own records to prevent fraud or other crimes. In addition, the illicit proceeds tracking system can use such information to prevent fraud or other crimes.

In some aspects of the present disclosure, if the email certification code is not valid, the recipient of the fake email that contains the invalid email certification code can forward the fake email to the fraud prevention department of the email certification system. The fake email may contain an IP address and other information that can be used to identify the fraudster. The illicit proceeds tracking system can use such information to track the fraudsters to prevent other crimes.

In aspects of the present disclosure, if Johnnie neither confirms nor denies that he has sent the email within a reasonable amount of time, e.g., ten minutes, the email certification system will send an email or text message to Jack@daniel.com, Remy@martin.com, Jim@beam.com, and/or Johnnie@walker.com and warn them that Johnnie has not certified the email yet and they should not open the email. As a result, the email certification system will protect Jack, Remy, and Jim against computer hacking. It also warns Johnnie that he should investigate this matter. It is possible that Johnnie's computer has been compromised.

In the above example, a sender of an email certifies the legitimacy of the email when the sender confirms the sending of the email. The recipient of the email certifies the receipt of the email when the recipient enters the email certification code into the website of the email certification system or when the recipient confirms the receipt of the email via the mobile app, a personal communication device, or a device interface.

Given time, the email certification system will become popular and all consumers will know that they should not click on any attachments or links inside any email even if the recipient list includes the email address of the email certification system (e.g., verify@globeam.com) until they have verified that the sender has truly sent the email through a website, a mobile app, a personal communication device, or any device interface provided by the email certification system. As a result, more consumers will open accounts with the email certification system and download the mobile app provided by the email certification system. The email certification system will become very popular.

In aspects of the present disclosure, a computer communication link is established between the sender's email application module (e.g., Outlook, Gmail, Hotmail, etc.) and the sender's mobile app (or software interface) provided by the email certification system so that the sender can directly confirm the sending of the email from the sender's email application module without the need to physically touch the sender's mobile phone (or device interface).

Similarly, in aspects of the present disclosure, a computer communication link is established between the recipient's email application module (e.g., Outlook, Gmail, Hotmail, etc.) and the recipient's mobile app (or software interface) provided by the email certification system so that the recipient can directly know that the email is truly from the sender without the need to physically touch the recipient's mobile phone (or device interface).

In some aspects of the present disclosure, a computer communication link is established directly between the sender's email application module (e.g., Outlook, Gmail, Hotmail, etc.) and the email certification system so that the sender can directly confirm the sending of the email from the sender's email application module without the need to physically touch the sender's mobile phone (or device interface).

Similarly, in some aspects of the present disclosure, a computer communication link is established directly between the recipient's email application module (e.g., Outlook, Gmail, Hotmail, etc.) and the email certification system so that the recipient can directly know that the email is truly from the sender without the need to physically touch the recipient's mobile phone (or device interface).

For example, after the sender has sent an email to the recipient, the sender's email application module, e.g., Outlook, informs the email certifications system of the identity (or email address) of the sender and the identity (or email address) of the recipient. The email certification system identifies the address of the recipient's computer system based on the identity (or email address) of the recipient and informs the recipient's Outlook that the email from the sender is valid. In this example, both the email application module of the sender and the email application module of the recipient directly communicate with the email certification system to certify the email without using any mobile phone, personal communication device, or device interface.

When the sender's mobile phone (or personal communication device, device interface, etc.) is bypassed, fraud may occur when the sender's computer is hacked (or stolen) and the fraudster uses the sender's email application module (Outlook, Gmail, Hotmail, etc.) to send and certify a fraudulent email to the recipient. To eliminate such fraud, an additional layer of security may be established.

In some aspects of the present disclosure, the sender enters a password that will be sent to the sender's mobile app (or the software interface) provided by the email certification system in order to certify an email. Alternatively, other authentication methods, such as personal identification card, fingerprint, iris scan, facial image, voice patterns, etc. can also be used.

In some aspects of the present disclosure, the recipient enters a password that will be sent to the recipient's mobile app (or the software interface) provided by the email certification system in order to verify the certified email. Alternatively, other authentication methods, such as personal identification card, fingerprint, iris scan, facial image, voice patterns, etc. can also be used.

In aspects of the present disclosure, the sender enters a password that will be sent to the email certification system in order to certify an email. Alternatively, other authentication methods, such as fingerprint recognition, iris scan recognition, facial recognition, voice recognition, etc. can also be used.

In aspects of the present disclosure, the recipient enters a password that will be sent to the email certification system to verify the validity of the certified email. Alternatively, other authentication methods, such as personal identification card, fingerprint, iris scan, facial image, voice patterns, etc. can also be used.

As a result of the additional layer of security, the fraudster cannot certify the email even though the fraudster has control over the sender's email application module (Outlook, Gmail, Hotmail, etc.). Similarly, the fraudster cannot fool the recipient even though the fraudster has control over the recipient's email application module (Outlook, Gmail, Hotmail, etc.).

In aspects of the present disclosure, the sender's email application module directly communicates with the email certification system while the recipient uses a mobile app (or a software interface) provided by the email communication system to communicate with the email certification system. In other aspects of the present disclosure, the recipient's email application module directly communicates with the email certification system while the sender uses a mobile app (or a software interface) provided by the email communication system to communicate with the email certification system.

Therefore, the sender can use the mobile app (or the software interface) provided by the email certification system and an email application module (e.g., Outlook, Gmail, Hotmail, etc.) to send and certify email. Alternatively, the sender can send and certify the email without using the mobile app (or software interface) provided by the email certification system when the email application module (e.g., Outlook, Gmail, Hotmail, etc.) communicates with the mobile app or (the software interface) provided by the email certification system. Additionally, the sender can send and certify the email without using the mobile app (or software interface) provided by the email certification system when the email application module (e.g., Outlook, Gmail, Hotmail, etc.) communicates directly with the email certification system. There are at least three possible approaches as listed above.

Similarly, the recipient can use the mobile app (or the software interface) provided by the email certification system and an email application module (e.g., Outlook, Gmail, Hotmail, etc.) to receive the email and confirm the validity of the email. Alternatively, the recipient can receive the email and confirm the validity of the email without using the mobile app (or software interface) provided by the email certification system when the email application module (e.g., Outlook, Gmail, Hotmail, etc.) communicates with the mobile app (or the software interface) provided by the email certification system. Additionally, the recipient can receive the email and confirms the validity of the email without using the mobile app (or software interface) provided by the email certification system when the email application module (e.g., Outlook, Gmail, Hotmail, etc.) communicates directly with the email certification system. There are at least three possible approaches as listed above.

Because each of the sender and the recipient has three (3) possible approaches, there are a total of nine possible combinations of approaches for the sender and the recipient to work with the email certification system. If there are multiple recipients, each sender-recipient pair may have nine possible combinations of approaches.

Although we use individuals in the above example, a business can also use the email certification system via the mobile app to certify a large quantity of emails in an email marketing campaign. After the business sends a large number of emails, e.g., 50,000 emails, the mobile app, personal communication device, or a device interface of the authorized person of the business can certify the emails by blocks, e.g., 5,000 emails per block. Because the authorized person knows the timing when the business sent a large quantity of marketing email, there is no need for the authorized person of the business to review these emails one by one. Instead, the authorized person of the business can certify all emails in one block at the same time. As a result of the block certification, the authorized person of the business only certifies ten blocks after the business sent 50,000 emails. The block size can be further increased if the business sends a larger quantity of emails, e.g., one million emails. In other aspects of the present disclosure, the email certification system can send and certify the marketing emails on behalf of the business.

In general, a sender's computer application module is identified by an address and a recipient's computer application module is identified by another address. A communication link with the sender can be established based on the address of the sender's computer application module. Similarly, a communication link with the recipient can be established based on the address of the recipient's computer application module.

In aspects of the present disclosure, the method used by the email certification system is slightly modified to certify text messages. Under such circumstances, the sender only includes the recipient's address (e.g., phone number, etc.) as one of the recipients of the text message. The email certification system becomes a text message certification system by asking the sender to confirm the sending of the text message via the same methods described above (e.g., a mobile app, an email, a personal communication device, a device interface, etc.) for the email certification system. Once the sender has confirmed the sending of the text message, the text message certification system will inform the recipients via a mobile app, an email, a personal communication device, a device interface, etc. that the text message is sent by the legitimate sender. If the sender denies the sending of the text message, the text message certification system will warn the sender and the recipients of potential computer hacking and/or text message fraud via a mobile app, an email, a personal communication device, a device interface, etc. As a result, both the sender and the recipients are protected by the text message certification system.

Similar to the text message certification system, in aspects of the present disclosure, the method used by the email certification system is slightly modified to certify other types of communication messages, in addition to emails. Many social networks, e.g., Facebook, LinkedIn, etc., enable their members to send messages to one another. Very often, a member's credentials are stolen and fake messages are sent from the member to friends on the same social network. In aspects of the present disclosure, this problem can be eliminated by providing members of the social network with an option to certify their messages.

Facebook, LinkedIn, etc. are handled as a message application module like the text message application module. If a member has chosen the certified message option, when he clicks on the send button to send a message, the computer system of the social network will identify a personal communication device address, e.g., mobile phone number, user ID, email address, IP address, etc., of the sender and contact the sender via a mobile app, a text message, an email, etc. The member's message will only be sent to his friends on the social network after the member has confirmed through a personal communication channel, such as mobile app, text message, email, etc. that he has truly sent the message.

For the purpose of this disclosure, a personal communication channel comprises any mean of communication that can be conducted through a personal device interface, including personal computer, mobile phone, device interface, smart phone, smart watch, smart book, etc.

In aspects of the present disclosure, the computer system of the social network can require members to certify all of their messages. However, this approach may cause inconvenience to the members. In some aspects of the present disclosure, a good guideline is to recommend members to certify their critical or important messages, such as needing help for an emergency, etc.

Because a consumer may use a mobile phone as his computer, his email, text message, social network mobile app, and other mobile apps, etc. may reside on the same physical device. Under such circumstances, each software application with password protection can be treated as one personal communication channel. For example, if a person has a Facebook mobile app and a LinkedIn mobile app on the same mobile phone, these two mobile apps can be treated as two personal communication channels. It may be preferable to have different passwords for different personal communication channels. Under such circumstances, even if a hacker has stolen the password of one computer application module (e.g., Facebook) of a person, the hacker cannot have access to the other computer application module (e.g., LinkedIn) of the person.

In aspects of the present disclosure, when a sender wants to send a message via a social network, a different personal communication channel is used to communicate with the sender of the message to certify the message. For example, if the member sends a message via his Facebook mobile application module, his LinkedIn mobile application module, email application module, text message application module, etc. can be used to certify his message on Facebook. Of course, Facebook can also create a message certification mobile application module as a different personal communication channel to certify the message on Facebook. It may be preferable to use a different password to log into the message certification mobile application module.

Alternatively, in some aspects of the present disclosure, a social network does not need to create a new mobile application module. Instead, the social network can require a member to enter a special password when its member wants to send a certified message. This separate password has equivalently created a virtual personal communication channel inside the existing social network itself for the member to certify his message. Alternatively, in other aspects of the present disclosure, the social network can block the message until the message has been certified by the sender.

In addition to the password authentication method, other authentication methods, such as personal identification card, fingerprint, iris scan, facial image, voice pattern, etc. can also be used.

Once a member has certified a message, a social network can inform the recipient of the message that the message has been certified by sender. As a result of the certification, the recipient can comfortably read the message and take an action in response to the message without worrying about whether the message is sent by a fraudster.

There are technical challenges associated with the central computer system of the email certification system, the message certification systems, etc. The following explanation uses email certification as an example. However, the same method can also be used for message certification or certification for other communication channels.

In aspects of the present disclosure, the email certification system specifies each email user to open an account with the email certification system. In addition, the email certification system stores the user name, user ID, password, user identification information, challenge questions, email addresses, mobile phone addresses, and mobile phone numbers of the account holder with the account. As a result, the email certification system has stored the email addresses, mobile phone numbers, and mobile phone addresses of all account holders in the data storage space of the email certification system.

Once the email certification system receives an email to be certified, the email certification system uses the sender email address of the email to find the account of the email sender. Once the email certification system has identified the account of the email sender, the email certification system can obtain the mobile phone address and mobile phone number of the email sender.

Similarly, the email certification system can use the recipient address of the email to find the email account of the email recipient Once the email certification system has identified the account of the email recipient, the email certification system can obtain the mobile phone address and mobile phone number of the email recipient. As a result, the email certification system can use the mobile phone numbers and/or mobile phone addresses to contact the email sender and the email recipient.

At this time, there are about 3.8 billion to 4.2 billion email users in the world. About 300 billion emails are sent and received each day. Even if only 20% of the email users use the email certification system, the email certification system needs to handle about 760 million to 840 million users. Even if only 1% of the emails are certified, the email certification system needs to certify about 3 billion emails per day. Therefore, the throughput of the email certification system should be at least tens of thousands of emails per second.

Based on the current technology, searching a database table of one billion records takes a very long time. It is impractical to build the email certification system based on a traditional computer system. To achieve the extremely high throughput that the email certification system needs, a very large number of networked hardware components may be used. There are many ways to build a network of hardware components. The following method is used as one of the examples.

In aspects of the present disclosure, each data storage module only stores a small portion of the accounts (e.g., ten million accounts, etc.) of the email certification system and many data storage modules (e.g., 100, etc.) are used to jointly store all the accounts (e.g., one billion accounts, etc.).

In aspects of the present disclosure, the first two characters of an email address may determine which particular data storage module will store the user account associated with the email address. For example, a simple rule can be user accounts associated with email addresses that have "aa" as the first two characters are stored in the first data storage module; user accounts associated with email addresses that have "ab" as the first two characters are stored in the second data storage module; user accounts associated with email addresses that have "ac" as the first two characters are stored in the third data storage module; etc.

In general, email addresses may contains English letters, Spanish letters, other letters used in different languages, numbers, symbols, etc. Because each of the first two characters may be a letter, a numbers, a symbol, etc., there may be thousands of possible combinations. This means the email certification system may specify thousands of data storage modules to cover all the possible combinations of the first two characters of email addresses.

As a result of this data storage method, the first two characters of an email address will determine which data storage module may have the account information associated with the email address. Moreover, because each data storage module only stores a relatively small number of accounts (e.g., one to ten million accounts), the data storage module can search the account information much faster.

In addition, RAM may be used to store the data so that the reading and writing data can be faster because accessing RAM is usually much faster than accessing a hard drive. As a result, a set of RAM modules may be used together with the data storage modules.

If the first two characters are insufficient to divide all the account information into small groups such that the email certification system can have a high throughput, the first three characters may be used to divide the account information into even smaller groups. There is no fixed rule about which portion of the email address is used for this data storage method. For example, the first four characters, the last three characters, the middle 2 characters, etc. can also be used Each of these options is a transformation of email addresses. There are many possible transformations for email addresses. Any one of them may work. However, to achieve a high throughput for the email certification system, a simple way will save the processing time.

It may be too expensive to have thousands of data storage modules at the beginning. The data storage module assignment may start with one character, instead of two characters. Moreover, one data storage module may accommodate multiple letters. For example, accounts starting with letter A to letter G belong to the first data storage module; accounts starting with letter H to letter M belong to the second data storage module; accounts starting with letter N to letter S belong to the third data storage module; and accounts starting with letter T to letter Z belong to the fourth data storage module; and all others belong to the fifth data storage module.

To further save the initial investment, the system can assign accounts starting with more letters to each data storage module and only use two to three data storage modules at the beginning. To avoid future overhead when the user base grows, the architecture should be ready for future expansion.

There are many ways to prepare for the future expansion. For example, a "table mapping" approach may be used. The system can map accounts starting with letter A to letter M to the first data storage module. Later on, when one more data storage module is added, the system only changes the mapping table so that accounts starting with letter A to letter G are mapped to one data storage module while accounts starting with letter H to letter M are mapped to another data storage module. Under such design, the mapping table is to be changed and the contents in the data storage modules are to be adjusted according to the mapping table.

Figure 1D:
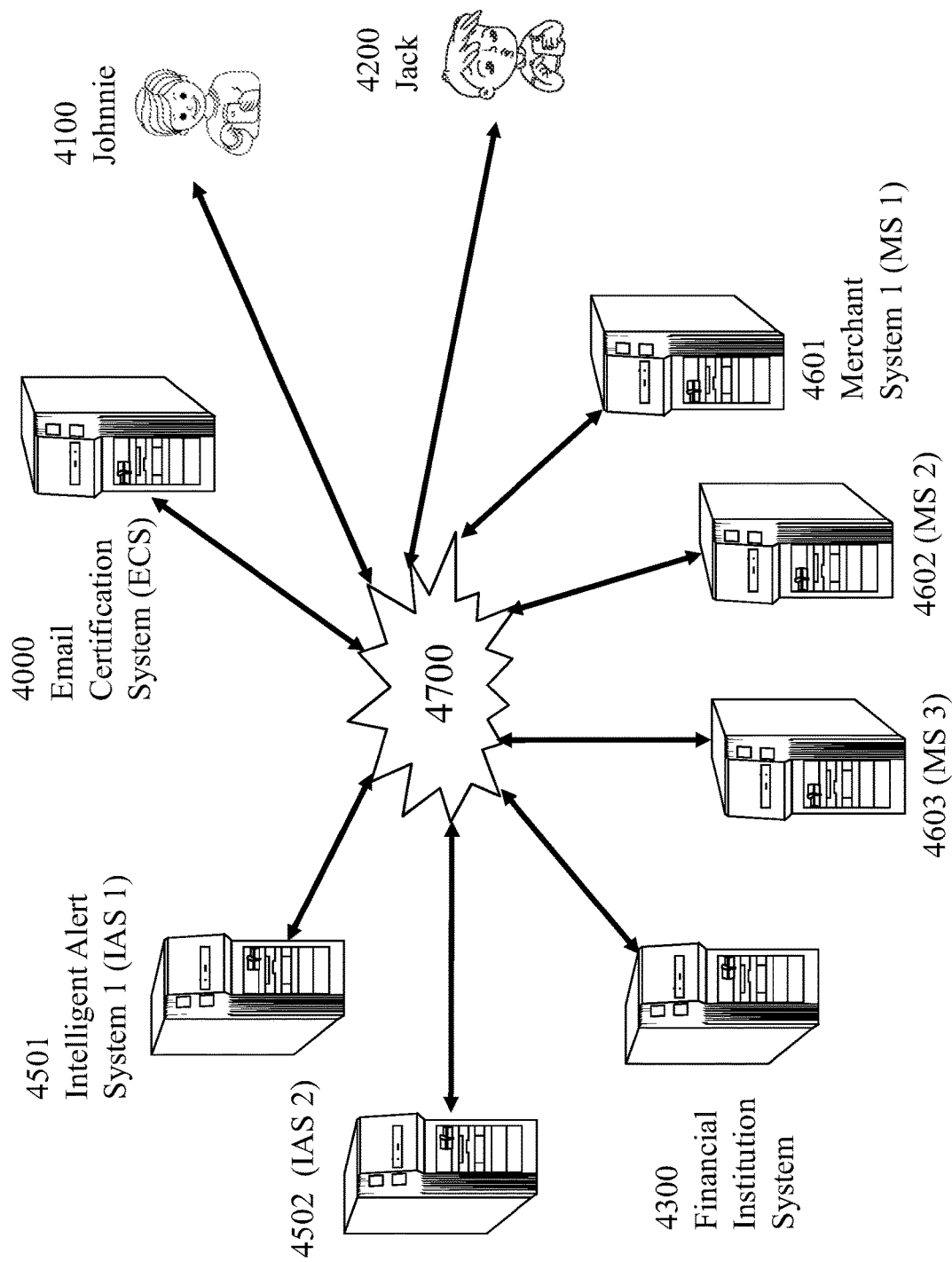
FIG. 1D illustrates a system and network diagram of an email certification system, according to aspects of the present disclosure.
Figure 1E:
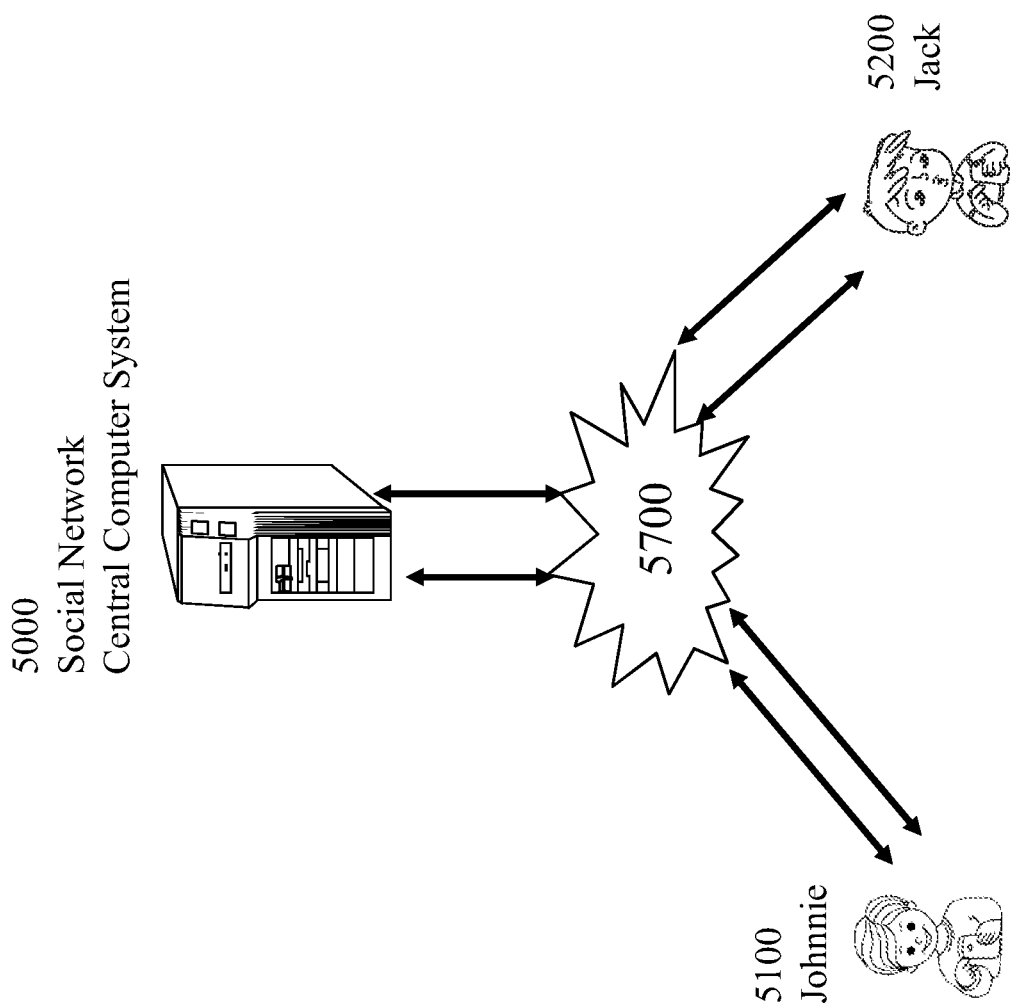
FIG. 1E illustrates a system and network diagram of asocial network central computer system that can send and certify messages, according to aspects of the present disclosure.
Figure 1F:
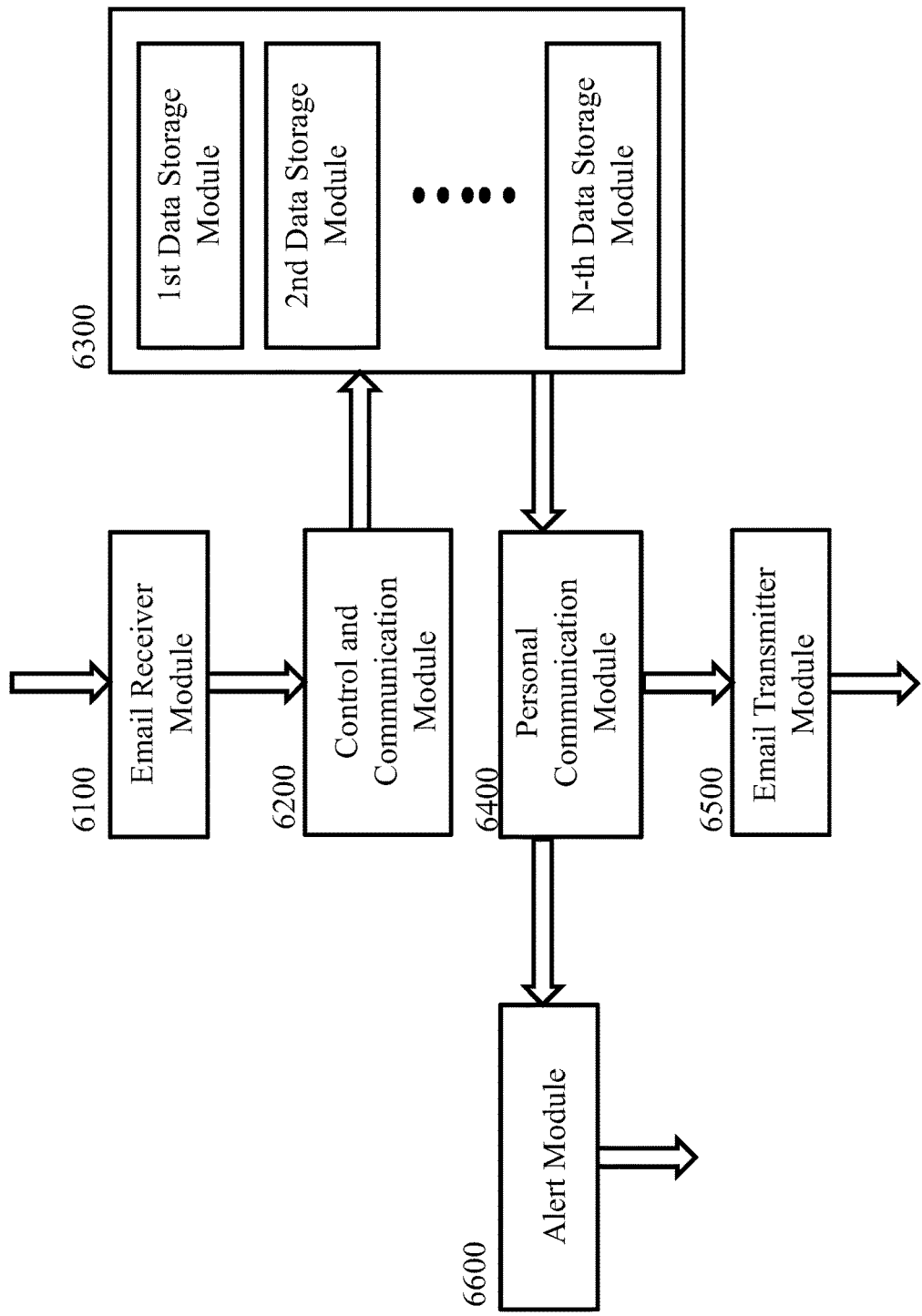
FIG. 1F illustrates a block diagram of an email certification system, according to aspects of the present disclosure.

As illustrated in FIG. 1F, in some aspects of the present disclosure, a central system of the email certification system comprises at least one of an email receiver module 6100, a control and communication module 6200, an array of data storage modules 6300, a personal communication module 6400, an email transmitter module 6500, an alert module 6600, or a combination thereof.

In aspects of the present disclosure, an array of data storage modules 6300 stores account information of all users of the email certification system. In some aspects of the present disclosure, each data storage module only stores the account information for a subset of users who have the same data storage module identifier produced by performing a predefined transformation on their email addresses. For example, if the predefined transformation is 'extracting the first two characters of the email address,' all users who have the same first two characters in their email addresses will be stored in the same data storage module and these first two characters are also used as the data storage module identifier.

As illustrated in FIG. 1F, in some aspects of the present disclosure, an email receiver module 6100 is used to receive email. An email transmitter module 6500 may send email. A personal communication module 6400 may communicate with a mobile app, a device interface, a personal communication device, etc.

In aspects of the present disclosure, once an email is received by the email receiver module 6100 of the email certification system, a control and communication module 6200 of the email certification system performs the predefined transformation (e.g., extracting the first two characters of the email address, etc.) on each email address of the email to produce a data locator for each email address. The data locator indicates which data storage module has the account information associated with the email address. The account information may include user name, user ID, password, user identification information, challenge questions, email addresses, mobile phone numbers, mobile phone addresses, IP addresses, device interface addresses, etc.

In aspects of the present disclosure, a sender data locator is transformed from the email address of the sender based on the predefined transformation. A recipient data locator may be transformed from the email address of the recipient based on the predefined transformation.

The control and communication module 6200 of the email certification system creates a job with a data locator for each sender and each recipient. The sender data locator specifies which data storage module has the account information of the sender. The recipient data locator specifies which data storage module has the account information of the recipient.

A communication protocol may be established for the communications among all modules.

In aspects of the present disclosure, the control and communication module 6200 of the email certification system sends the job, which has the data locators and their associated email addresses, to all data storage modules based on the established communication protocol. If a data storage module identifier matches a data locator of an email address, the data storage module searches its data storage space to find the account information associated with the email address. The account information may include at least the contact information of the account, such as mobile phone numbers, mobile phone addresses, IP addresses, device interface addresses, etc. After the account information has been identified, the data storage module stores at least some of the account information, the email address, and the job number (or a job identifier) in a temporary storage space.

As a result of the searching actions performed in parallel by a number of data storage modules associated with the sender email address and the recipient email addresses, the sender's account information and the recipients' account information is quickly identified and stored in the temporary storage space together with the job number (or job identifier).

FIG. 1D illustrates an example of an email certification system 4000 (e.g., a device interface) that prevents email fraud according to aspects of the present disclosure. In some configurations, the email certification system 4000 connects to two intelligent alert systems 4501, and 4502 residing at two financial institutions, three merchant systems 4601, 4602, and 4603 residing at three merchant sites, and two consumers, Johnnie 4100 and Jack 4200. The connections may be established via a network 4700, which may be a wired network and/or a wireless network, such as the Internet. As an example, a financial institution system 4300 also connects to the network 4700.

FIG. 1E illustrates an example of a message certification system 5000 (e.g., a device interface) that sends and certifies social network message according to aspects of the present disclosure. In some configurations, the message certification system 5000 connects to two consumers, Johnnie 5100 and Jack 5200, via two personal communication channels. The first personal communication channel is used to send or receive a message. The second personal communication channel is used to certify the message. The connections may be established via a network 5700, which may be a wired network and/or a wireless network, such as the Internet.

As illustrated in FIG. 1F, in aspects of the present disclosure, the personal communication module 6400 of the email certification system obtains the sender account information from the temporary storage space and uses such information to contact the sender to verify the validity of the email. Once the sender has confirmed the validity of the email, the email transmitter module 6500 of the email certification system forwards the email to all recipients of the email with an email certification code.

In other aspects of the present disclosure, the personal communication module 6400 of the email certification system obtains the sender account information from the temporary storage space and uses such information to contact the sender to verify the validity of the email. Once the sender has confirmed the validity of the email, the personal communication module 6400 of the email certification system obtains the recipient account information from the temporary storage space and uses such information to inform all recipients of the validity of the email via their mobile phones (or device interfaces, etc.).

As illustrated in FIG. 1F, in some aspects of the present disclosure, the personal communication module 6400 of the email certification system obtains the sender account information from the temporary storage space and uses such information to contact the sender to verify the validity of the email. If the sender denies the validity of the email, an alert module 6600 sends an alert to all participating entities (including organizations, individuals, etc.) and informs them that the sender's email address may have been compromised. The email transmitter module 6500 may send an email to inform all recipients that the sender has denied the validity of the email.

In some aspects of the present disclosure, at least one First-In-First-Out (FIFO) buffer is used for the email receiver module 6100. Because a FIFO buffer can only absorb a temporary increase of incoming flow of emails and cannot truly increase the average throughput of the email receiver module, multiple email receiver modules each with a FIFO buffer may be specified to increase the average throughput of the email certification system.

In some aspects of the present disclosure, the email receiver module 6100 produces a sequential job number for each job so that each module in the email certification system can easily verify whether it has missed any job. The control and communication module 6200 may transform each email address of an email into a data locator, and then create a job number (or job identifier) for the email and send the job to the array of data storage modules 6300 based on the communication protocol. When the number of users grows, multiple control and communication modules will be used.

In some aspects of the present disclosure, each data storage module receives all the jobs assigned by the control and communication module 6200 based on the communication protocol. Each data storage module runs independently. If none of the data locators inside a job matches the data storage module identifier, the data storage module can discard that job. However, if any data locator inside a job matches the data storage module identifier, the data storage module will search for the account information associated with the email address of the data locator. If multiple data locators in a job match the data storage module identifier, the data storage module will search for the account information multiple times, each for one email address associated with one of the matched data locators. After the search, the data storage module stores the job number and the account information (e.g., mobile phone number, mobile phone address, IP address, etc.) of each email address into a temporary storage space. This parallel process ensures that the account information will be identified in parallel to save time.

In aspects of the present disclosure, at least one FIFO buffer stores incoming jobs for each data storage module. This FIFO buffer ensures that the data storage module will not lose incoming jobs if multiple jobs arrive at the same time. In aspects of the present disclosure, a long queue may store a good amount of jobs and gradually phase out the older ones. The length of the queue can be determined based on the comparison between the incoming traffic and the outgoing traffic of the queue during the peak hours. Based on the sequential job number, each data storage module can check the queue to identify and fetch the next job that it is supposed to perform.

In aspects of the present disclosure, at least one pair of FIFO buffers is used inside the personal communication module 6400. The input of the first FIFO buffer is the job number assigned by the control and communication module 6200. Because it may take a different amount of time for each data storage module to complete a job, it is possible that a later job is ready for processing before an earlier job. Therefore, the personal communication module 6400 should not wait for a job to be completed.

In some aspects of the present disclosure, if a job is not completed yet when the job number is output from the first FIFO buffer, the personal communication module 6400 will input the job number into the second FIFO buffer. The personal communication module 6400 will take turns to check the outputs of the first FIFO buffer and the second FIFO buffer. If a job is not completed when the job number is output from the second FIFO buffer, the personal communication module 6400 will input the job number back to the second FIFO buffer. A priority may be assigned to the second FIFO. For example, the personal communication module 6400 may check the output of the second FIFO buffer more frequently than checking the output of the first FIFO buffer.

In aspects of the present disclosure, multiple personal communication modules will be used when the number of users grows.

A FIFO buffer may be provided inside the email transmitter module. Because the FIFO buffer cannot increase the average throughput of the email transmitter module, multiple email transmitter modules may be used in parallel when the number of users grows in the future.

Similarly, a FIFO buffer may be provided inside the alert module. Because the FIFO buffer cannot increase the average throughput of the alert module, multiple alert modules may be used in parallel when the number of users grows in the future.

Figure 1G:
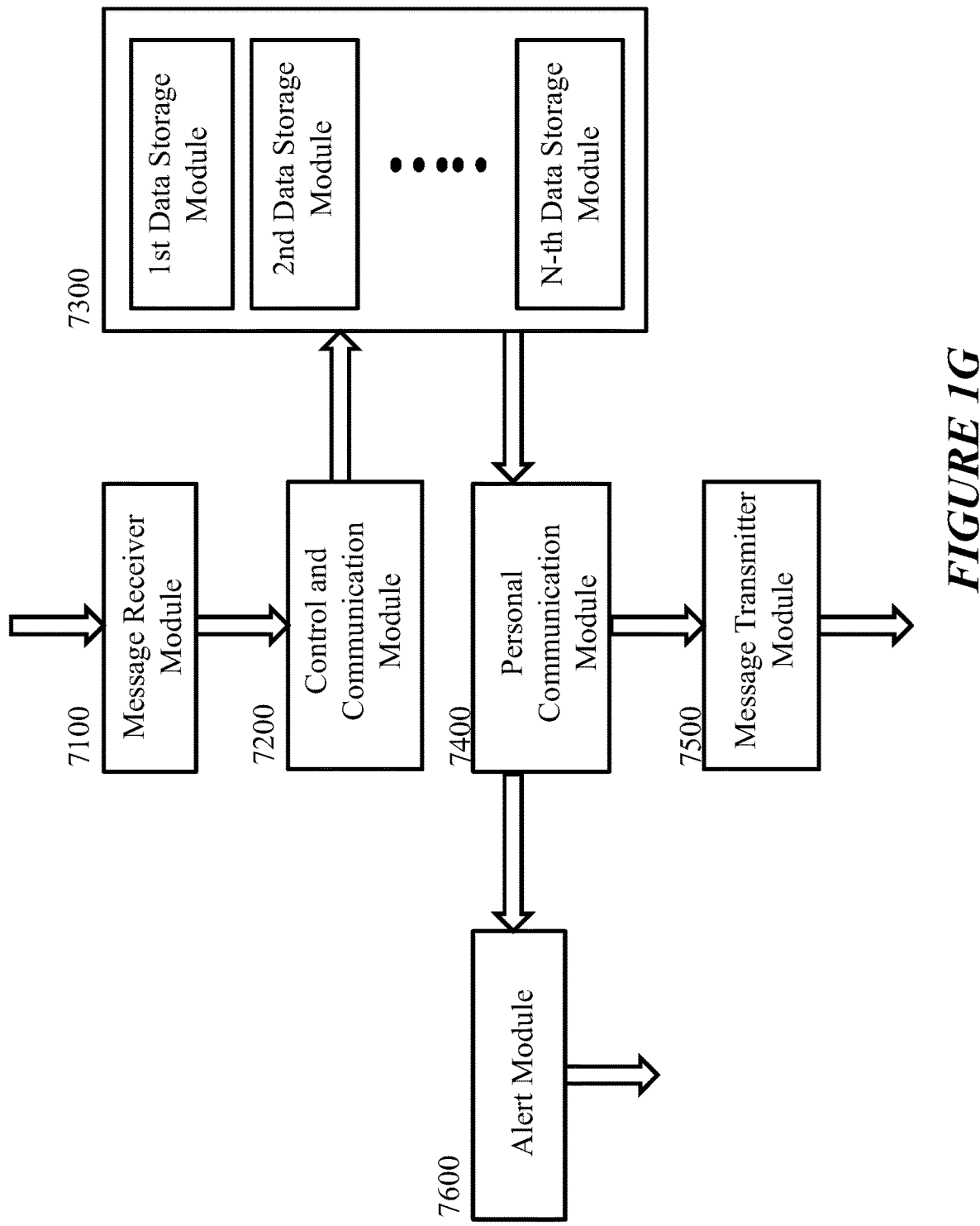
FIG. 1G illustrates a block diagram of a message certification system, according to aspects of the present disclosure.

As illustrated in FIG. 1G, similar to the email certification system, a central system of the message certification system may comprise a message receiver module 7100, a control and communication module 7200, an array of data storage modules 7300, a personal communication module 7400, a message transmitter module 7500, an alert module 7600, or a combination thereof. These modules perform functions similar to the corresponding modules for the email certification system.

Figure 2:
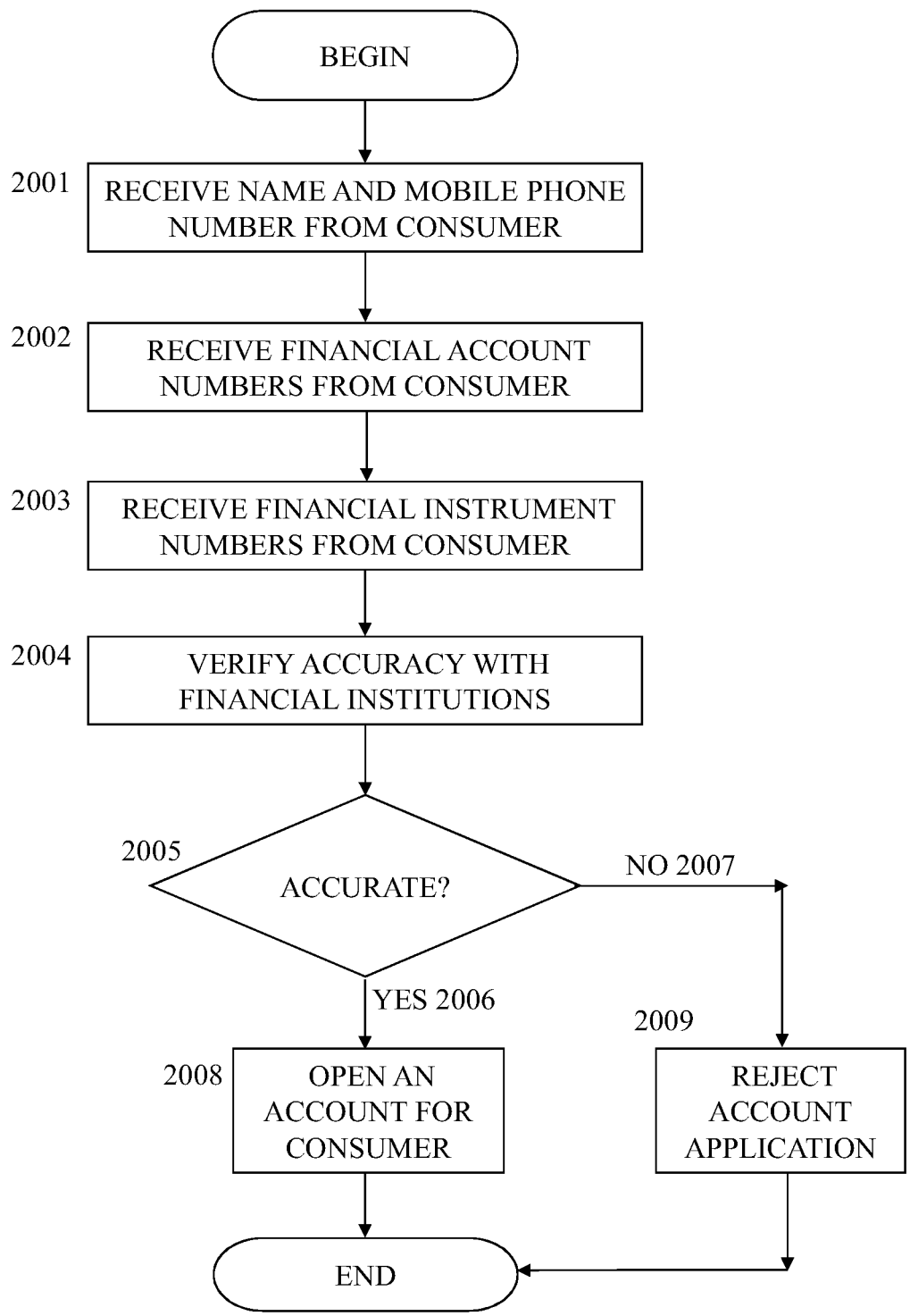
FIGS. 2, 3, and 4 are flowcharts for a consumer protection system, according to aspects of the present disclosure.

FIG. 2 illustrates an example of a flow chart for opening an account for a new consumer 1100 of a consumer protection system according to aspects of the present disclosure. In some configurations, as shown in FIG. 2 together with FIG. 1B, at block 2001, a computer system (e.g., a device interface) 1000 receives the consumer's (e.g., consumer 1100) identification information, such as, a name and a mobile phone number, via a mobile application. At block 2002, the computer system 1000 receives the consumer's financial account numbers provided by the consumer 1100. Additionally, at block 2003, the computer system 1000 receives the consumer's financial instrument numbers provided by the consumer 1100. As a result, the consumer 1100 has registered his financial accounts and financial instruments with the consumer protection system.

Because fraudsters may also try to open accounts with the consumer protection system based on false information, the consumer protection system should verify the accuracy of the information provided by an applicant, such as the consumer 1100, with financial institutions that issued the financial accounts and financial instruments (block 2004).

An alternative method (not shown in the flowchart) to verify the ownership of a financial account (or a financial instrument) registered by consumer 1100 is for the computer system 1000 to send a randomly-generated passcode to a transactional system. The transactional system conducts a transaction with the registered financial account (or financial instrument) based on the value of the passcode. Then, the computer system 1000 prompts the consumer 1100 to enter the passcode into the mobile app. If the consumer 1100 correctly enters the passcode, the consumer 1100 has the required control of the financial account (or financial instrument) and can be treated as the owner of the financial account (or financial instrument).

As shown in FIG. 2, after the verification, the computer system 1000 takes two different actions based on the verification result (decision block 2005). If the information provided by the consumer 1100 is not accurate (NO branch 2007), the computer system 1000 will reject the account application (block 2009). If the information provided by the consumer 1100 is accurate (YES branch 2006), the computer system 1000 opens an account for the consumer 1100.

Figure 3:
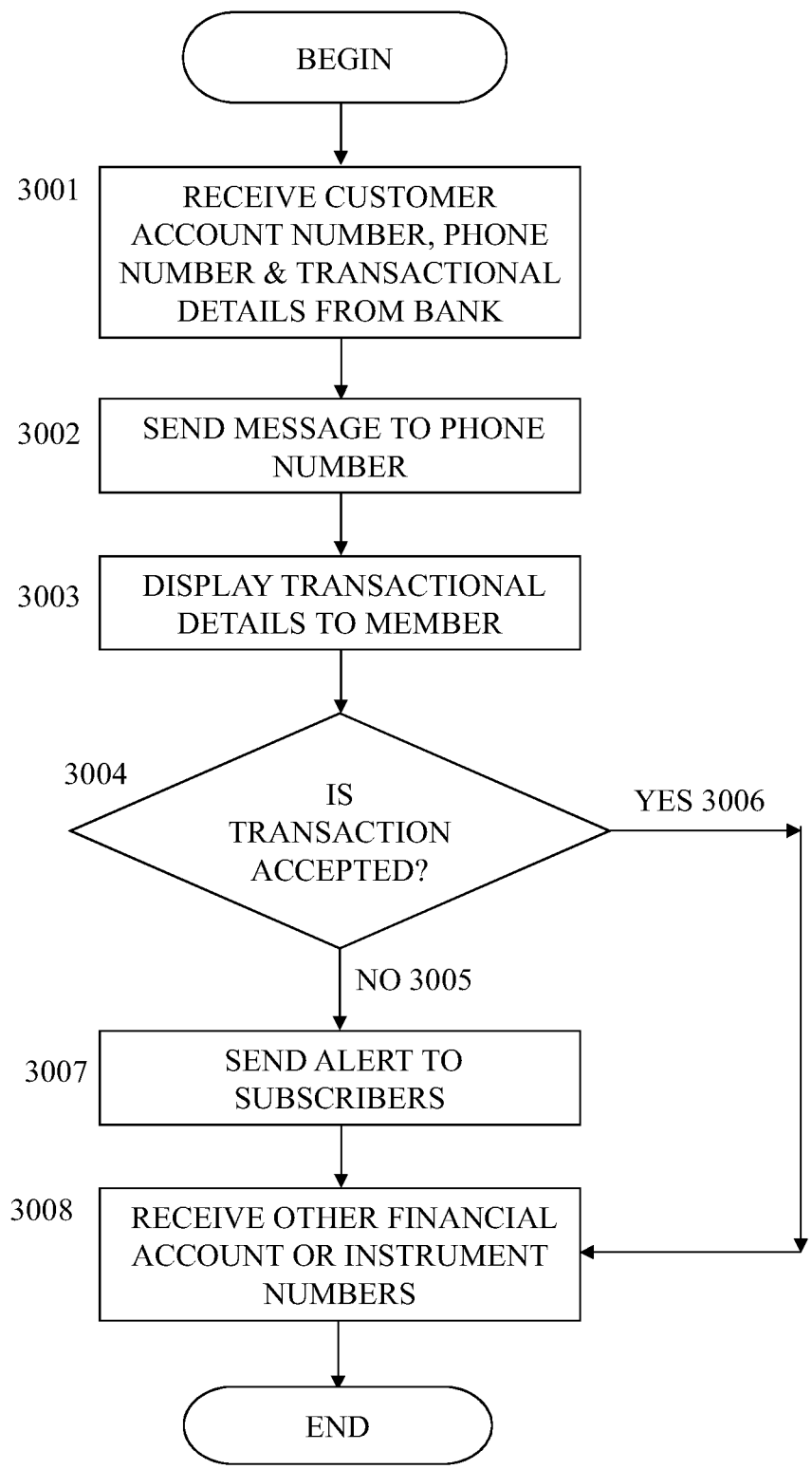

FIG. 3 illustrates an example of a flow chart for accepting transactions and opening accounts according to aspects of the present disclosure. In one configuration, as shown in FIG. 3 together with FIG. 1B, a computer system 1000 can protect financial institutions, merchants, any organizations, and the consumer (e.g., consumer 1200) who is not a member of the consumer protection system. When the intelligent alert system (e.g., intelligent alert system 3 (LAS 3) 1503) of a bank detects an alert of a potential financial crime against an account of a customer, the intelligent alert system sends the customer's account number, phone number, and a portion of the transactional details to the consumer system 1000. The computer system 1000 receives such information from the intelligent alert system 1503 (block 3001).

In response to receiving such information about a potential financial crime (block 3002), the computer system 1000 sends a message (e.g., text message) to a mobile phone based on the phone number provided by the intelligent alert system 1503. In this example, the mobile phone number belongs to the consumer 1200 who is not a member of the consumer protection system. The text message prompts the consumer 1200 to download a mobile app to see the alert of a potential crime against the consumer 1200. After the consumer 1200 downloads the mobile app and opens the mobile app, a portion of the transactional details is displayed on the mobile app (block 3003).

If the consumer 1200 agrees with the displayed transactional details, the consumer 1200 accepts the transaction through the mobile app. If the consumer 1200 does not agree with the displayed transactional details, the consumer 1200 rejects the transaction through the mobile app. The computer system 1000 receives the reply from the consumer 1200 through the mobile app. The computer system 1000 will take two different actions in response to the reply (decision block 3004). If the consumer 1200 has accepted the transaction (YES branch 3006), the computer system 1000 sends the reply from the consumer 1200 to the intelligent alert system 1503. The intelligent alert system 1503 can dismiss the false alert.

Additionally, the computer system 1000 prompts the consumer 1200 to provide other financial account numbers and/or other financial instrument numbers through the mobile app so that the computer system can protect the consumer 1200 against future financial crimes related to these additional financial accounts and/or financial instruments (block 3008). In this process, the computer system 1000 automatically opened an account for the consumer 1200. There may be no need to verify the accuracy of the bank account information provided by the consumer 1200 because the original bank account information was provided by the bank, which had already conducted a thorough background check on the consumer as required by the U.S. PATRIOT Act. If the consumer 1200 commits a crime, the law enforcement officers can arrest the consumer 1200 because the bank has a complete set of records about the consumer.

On the other hand, if the consumer 1200 has rejected the transaction (NO branch 3005), a fraud may have occurred. The computer system 1000 sends an alert about the potential fraud to the device interfaces of all financial institutions, merchants, and organizations that have subscribed to the services provided by the computer system 1000 (block 3007). The computer system 1000 also sends the consumer's reply to the intelligent alert system 1503, which informs the financial institution system to reject the transaction.

In addition, the computer system 1000 prompts the consumer 1200 to provide other financial account numbers and/or financial instrument numbers so that the computer system 1000 can protect the consumer against future financial crimes related to these additional financial accounts and/or financial instruments (block 3008). In this process, the computer system 1000 automatically opened an account for the consumer 1200.

Figure 4:
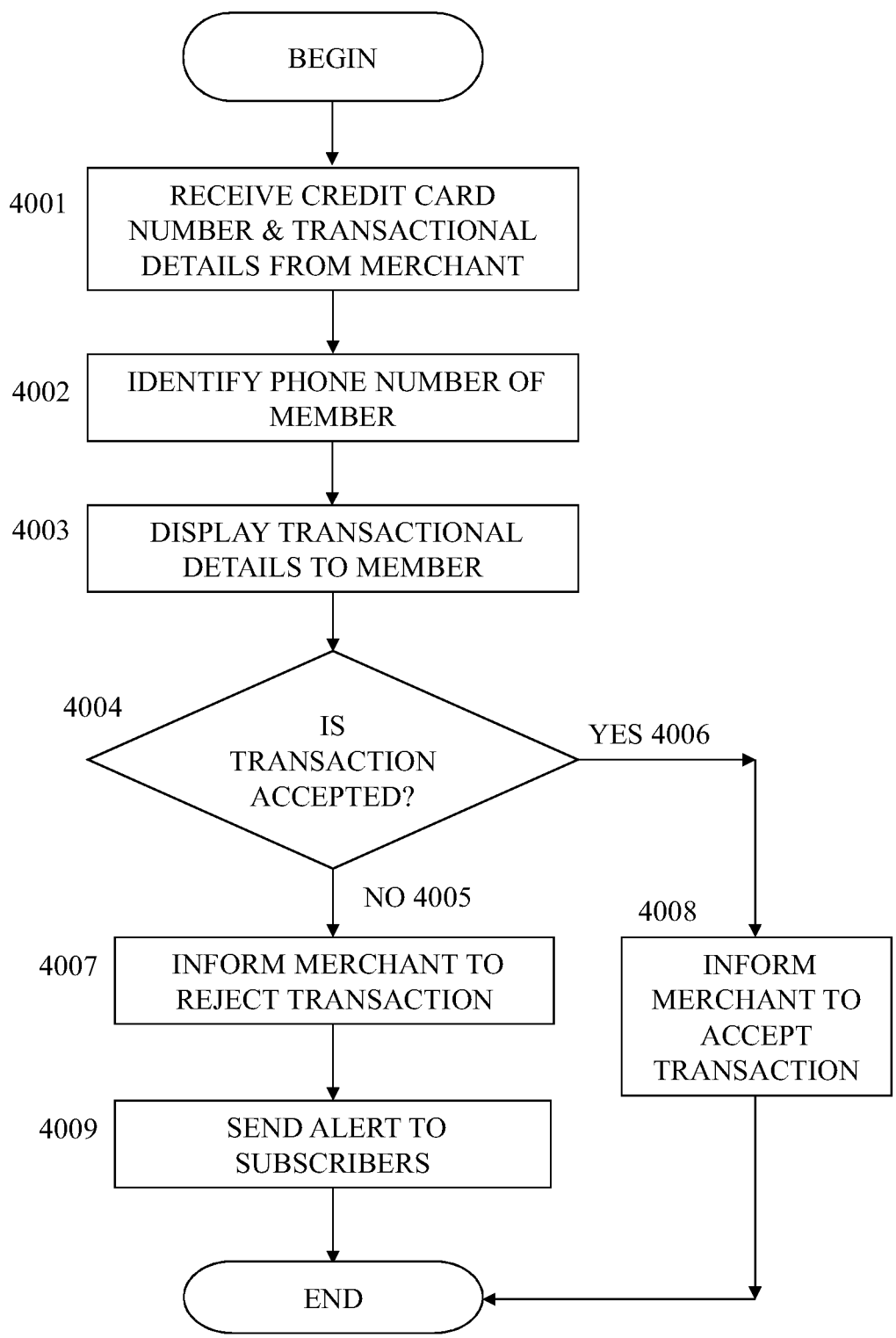

FIG. 4 illustrates an example of a flow chart for accepting transactions according to aspects of the present disclosure. In one configuration, as shown in the flowchart of FIG. 4 together with FIG. 1B, a computer system 1000 helps merchants, financial institutions, and other organizations to prevent financial crimes. When a subject (e.g., an individual or an organization) intends to use a credit card to purchase goods from a merchant, a merchant system (e.g., merchant system 1601) of the merchant receives the credit card information from the subject. Because the merchant system cannot determine whether the subject is the true owner of the credit card, the merchant system 1601 sends the credit card number and a portion of the transactional details to the computer system 1000.

The computer system 1000 receives the credit card number and a portion of the transaction details from the merchant system 1601 (block 4001). The computer system 1000 searches its database to identify a member that has registered the credit card number. In this example, the consumer (e.g., consumer 1200) is the member. Once the computer system 1000 has identified the member, the computer system 1000 can also identify the member's mobile phone number (block 4002). The computer system 1000 sends a portion of the transactional details to the mobile phone of the consumer 1200. The mobile app prompts the consumer 1200 to open the mobile app.

After the consumer 1200 opens the mobile app, a portion of the transactional details is displayed on the mobile app (block 4003). If the consumer 1200 agrees with the displayed transactional details, the consumer 1200 accepts the transaction through the mobile app. If the consumer 1200 does not agree with the displayed transactional details, the consumer 1200 rejects the transaction through the mobile app. The computer system 1000 receives the reply from the consumer through the mobile app.

The computer system 1000 takes two different actions in response to the reply (decision block 4004). If the consumer 1200 has accepted the transaction (YES branch 4006), the computer system 1000 instructs the merchant system 1601 to accept the transaction (block 4008). On the other hand, if the consumer 1200 has rejected the transaction (NO branch 4005), fraud may have occurred. The computer system 1000 instructs the merchant system 1601 to reject the transaction (block 4007). The computer system 1000 has enabled the merchant system 1601 to prevent fraud without third party human involvement.

In addition, the computer system 1000 sends an alert about the potential financial crime to the device interfaces of all financial institutions, merchants, and organizations that have subscribed to the services provided by the computer system 1000 (block 4009). As a result, the computer system 1000 empowers consumers, merchants, financial institutions, and other organizations to jointly prevent financial crimes.

Figure 5:
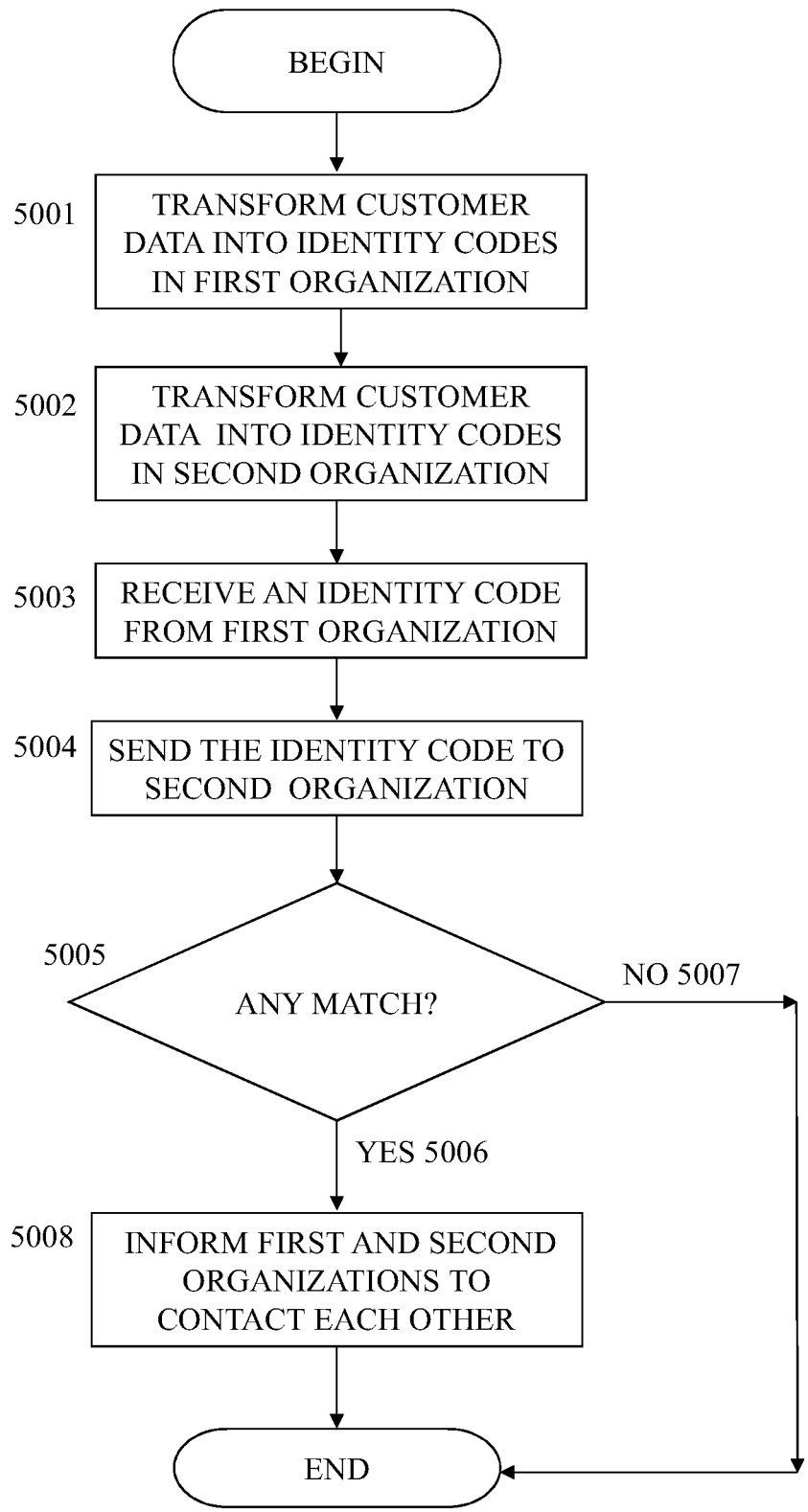
FIGS. 5, 6, and 7 are flowcharts for an illicit proceeds tracking system, according to aspects of the present disclosure.

FIG. 5 illustrates an example of a flow chart for illicit proceeds tracking according to aspects of the present disclosure. In some configurations, as shown in the flowchart of FIG. 5 together with FIG. 1C, a central computer system 3000 helps financial institutions track illicit proceeds and identify money launderers. Because it is against the law for financial institutions to disclose non-public personal information of their customers, financial institutions generally do not want to disclose the identification information of customers who have stolen money from the financial institution.

Financial crimes produce illicit proceeds. For example, illicit proceeds can be produced by money laundering, terrorist financing, Ponzi scheme, human trafficking, embezzlement, bank fraud, security fraud, insurance fraud, tax fraud, etc. When the illicit proceeds are deposited into a financial institution, it becomes a money laundering crime. Section 314(b) of the USA PATRIOT Act provides a safe harbor to protect financial institutions that share information about their customers possibly involving money laundering or terrorist financing.

In this example, James 3101 uses an illicit proceeds tracking system 3100 residing at financial institution A, Evelyn 3201 uses an illicit proceeds tracking system 3200 residing at financial institution B, Michael 3301 uses an illicit proceeds tracking system 3300 residing at financial institution C. The illicit proceeds tracking system 3100 of financial institution A transforms the identification data of each customer into an identity code and stores the identity codes of all customers into a database (block 5001). Each customer corresponds to a unique identity code, which does not contain any identification information of the customer. The illicit proceeds tracking system 3300 of financial institution C transforms the identification data of each customer into an identity code and stores the identity codes of all customers into a database (block 5002). Each customer corresponds to a unique identity code, which does not contain any identification information of the customer.

John Doe, a customer of financial institution A in Los Angeles, defaulted on a loan then disappeared. James 3101 of financial institution A wants to track John Doe through its illicit proceeds tracking system 3100. The central computer system 3000 receives John Doe's identity code sent from the illicit proceeds tracking system 3100 at financial institution A (block 5003).

The central computer system 3000 sends John Doe's identity code to all the illicit proceeds tracking systems connected to the network 3600, including the illicit proceeds tracking system 3300 at financial institution C (block 5004). All illicit proceeds tracking systems on the network compares John Doe's identity code with all the identity codes stored in their respective databases. In this example, the illicit proceeds system 3300 at financial institution C compares John Doe's identity code with all the identity codes in its database (decision block 5005).

If there is no match (NO branch 5007), no action will be taken by the illicit proceeds tracking system 3300. If there is a match (YES branch 5006), the illicit proceeds tracking system 3300 informs the central computer system 3000 of the match. The central computer system 3000 informs James 3101 at financial institution A and Michael 3301 at financial institution C to contact each other to discuss John Doe (block 5008).

As a result of the discussion, James 3101 of financial institution A can file a Suspicious Activity Report on John Doe to FinCEN for committing a money laundering crime. Michael 3301 of financial institution C can inform his collection department to take a legal action to seize the funds of John Doe at financial institution A.

If John Doe attempts to open a new account with financial institution B, the illicit proceeds tracking system 3200 at financial institution B compare's John Doe's identity code with all the historical identity codes it has previously received from the central computer system 3000. Because John Doe's identity code was sent by illicit proceeds tracking system 3100 of financial institution A before, the illicit proceeds tracking system 3200 at financial institution B detects a match. The illicit proceeds tracking system 3200 informs the central computer system 3000 of the match. The central computer system 3000 informs James 3101, Evelyn 3201, and Michael 3301 to contact one another to discuss John Doe. After the discussion, Evelyn 3201 of financial institution B decides not to open a new account for John Doe because of money laundering concerns. As a result, the illicit proceeds tracking system 3200 at financial institution B has effectively blocked John Doe from opening a new account at financial institution B.

Similarly, the law enforcement system 3400 can transform the identification data of each wanted criminal into an identity code and store the identity codes of all the wanted criminals into a database. If John Doe is also a criminal wanted by the law enforcement agency, the law enforcement system 3400 also detects a match when the illicit proceeds system 3100 sends John Doe's identity code to all computer systems connected to the network. The law enforcement system 3400 informs the central computer system 3000 of the match. The central computer system 3000 informs Lisa 3401 of the law enforcement agency to contact James 3101, Evelyn 3201, and Michael 3301 to discuss John Doe. As a result, Lisa 3401 can quickly find the information she needs and take legal action against John Doe.

Figure 6:
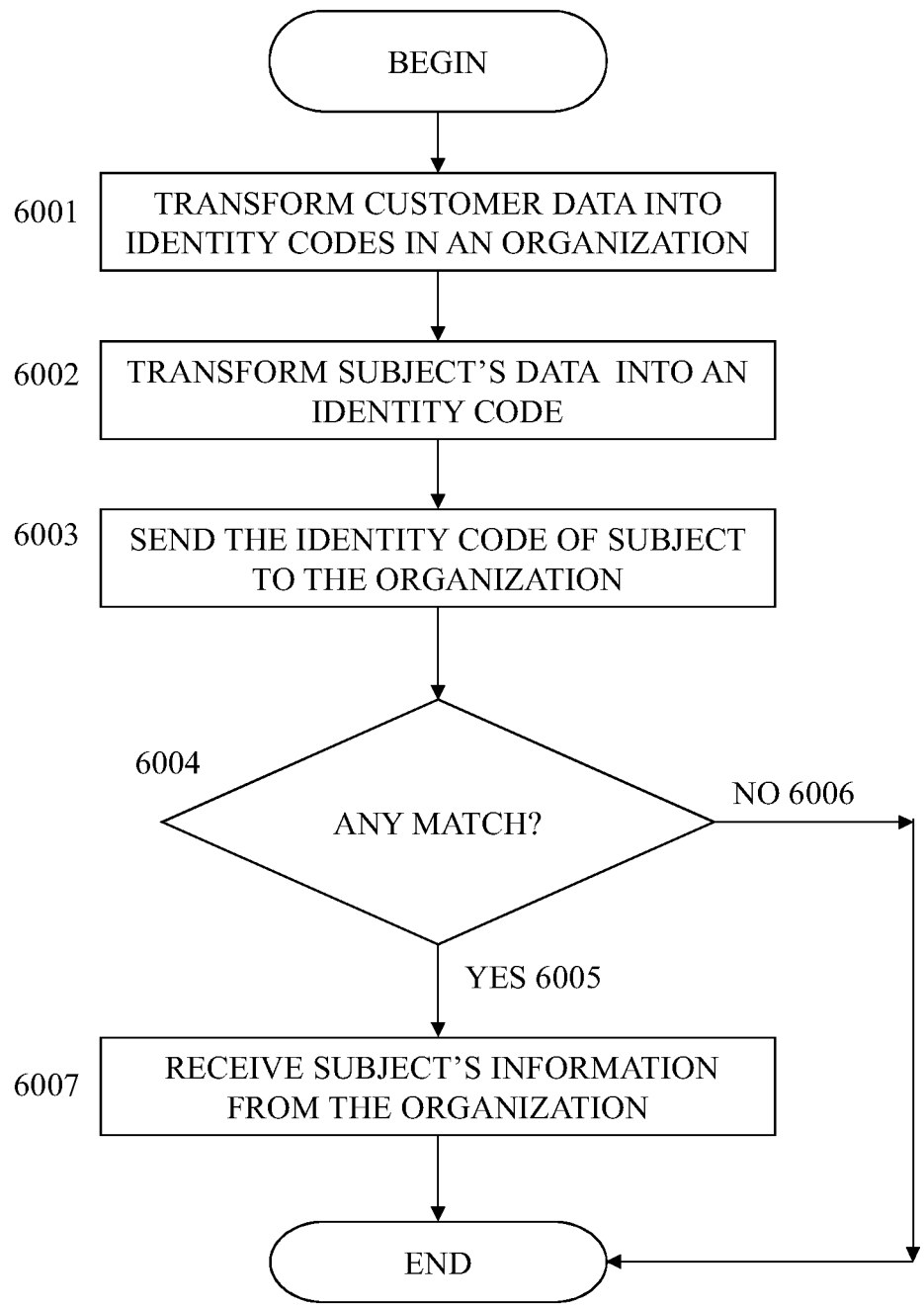

FIG. 6 illustrates an example of a flow chart for a law enforcement agency to collect information from financial institutions according to aspects of the present disclosure. In some configurations, as shown in the flowchart of FIG. 6 together with FIG. 1C, a central computer system 3000 and a law enforcement system 3400 work together to collect information from financial institutions privately and confidentially.

The illicit proceeds tracking system 3100 of financial institution A transforms the identification data of each customer into an identity code and stores the identity codes of all customers into a database (block 6001). Each customer corresponds to a unique identity code, which does not contain any identification information of the customer.

Lisa 3401 wants to collect information about a crime suspect Johnnie Walker, a subject. Lisa 3401 enters the identification data of Johnnie Walker into the law enforcement system 3400. The law enforcement system 3400 transforms Johnnie Walker's identification information into an identity code (block 6002) and sends Johnnie Walker's identity code to the central computer system 3000 together with a request for information prepared by Lisa 3401.

The central computer system 3000 sends Johnnie Walker's identity code and the request for information to all the computer systems on the network, including the illicit proceeds tracking system 3100 at financial institution A (block 6003).

The illicit proceeds tracking system 3100 compares Johnnie Walker's identity code with all the identity codes in its database to determine whether there is a match (decision block 6004). If there is no match (NO branch 6006), the illicit proceeds tracking system 3100 does not take any action. If there is a match (YES branch 6005), the illicit proceeds tracking system 3100 collect the information about Johnnie Walker based on the request for information from Lisa 3401 and sends the requested information to the central computer system 3000. As a result, the central computer system 3000 receives the requested information about Johnnie Walker from the illicit proceeds tracking system 3100 at financial institution A (block 6007).

The central computer system 3000 sends the requested information to the law enforcement system 3400 so that Lisa 3401 can obtain the information she needs about Johnnie Walker. In addition, the computer system 3000 can send the contact information of James 3101 to Lisa 3401 so that Lisa 3401 can contact James 3101 to discuss Johnnie Walker. As an option, if Lisa 3401 needs more information about Johnnie Walker, because Lisa 3401 now knows that Johnnie Walker is a customer of financial institution A, Lisa 3401 can subpoena the records about Johnnie Walker from financial institution A.

In the above example, Lisa 3401 uses the law enforcement system 3400 to send Johnnie Walker's identity code to the central computer system 3000. Alternatively, the central computer system 3000 can provide a website for Lisa 3401 to directly enter the identification information of Johnnie Walker without the need to use a law enforcement system. The computer system 3000 can transform the identification information entered by Lisa 3401 into an identity code and send the identity code to all computer systems connected to the network to collect information about Johnnie Walker as described above. This approach can save the cost of the law enforcement system. When many different law enforcement agencies need to use the application of the present disclosure, this is a less expensive approach.

Instead of a request for information in the above example, the law enforcement system 3400 can also send Johnnie Walker's identity code and a request for action to the central computer system 3000. The request for action may include freezing Johnnie Walker's account, reporting to Lisa 3401 all communications with Johnnie Walker, posting Johnnie Walker's photo in all branches, etc. The central computers system 3000 sends Johnnie Walker's identity code and the request for action to all computer systems connected to the network. If there is a match of Johnnie Walker's identity code in its database, the illicit proceeds tracking system 3100 at financial institution A instructs all device interfaces at financial institution A to take the actions according to the request for action received from the law enforcement system 3400. As a result, Johnnie Walker will instantly lose his financial capability and will be forced to surrender to the law enforcement agency.

Figure 7:
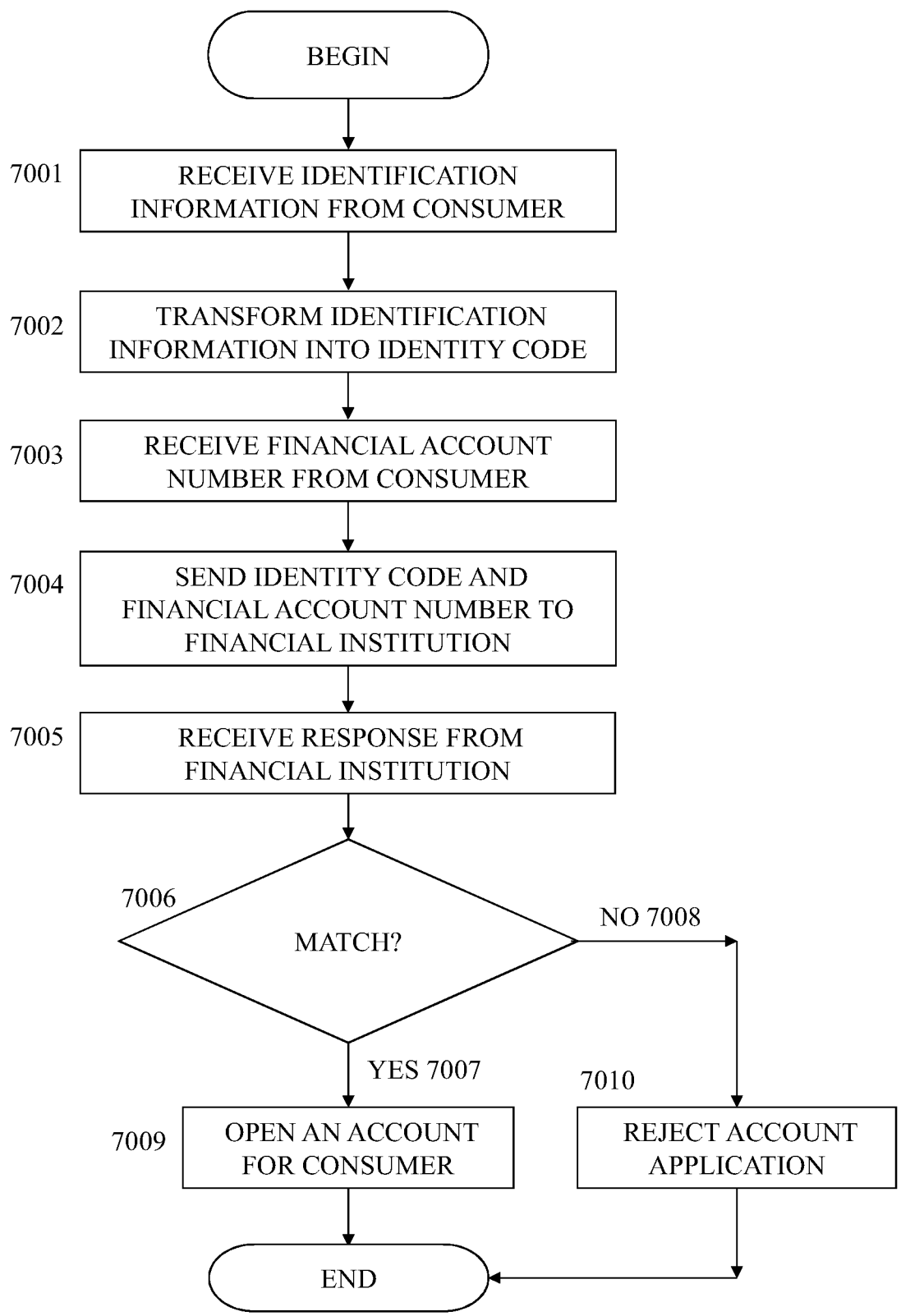

FIG. 7 illustrates an example of a flow chart for an organization to verify the financial information provided by a prospective customer to open an account according to aspects of the present disclosure. In some configurations, as shown in the flowchart of FIG. 7 together with FIG. 1C, a central computer system 3000 helps financial institution A determine whether a prospective customer, Mary Kate, has provided correct financial information to apply for a loan account.

When Mary Kate applies for a loan online, the illicit proceeds tracking system 3100 at financial institution A collects the identification information of Mary Kate (block 7001). The illicit proceeds tracking system 3100 at financial institution A transforms Mary Kate's identification information into an identity code (block 7002).

Financial institution A requests Mary Kate to provide the account number of an existing account with another financial institution plus the activity information in that account. For example, the activity information may include the dollar amount of the last transaction, the date of the last transaction, the status of a loan, etc. (block 7003).

The illicit proceeds tracking system 3100 sends Mary Kate's identity code, the account number, and the activity information to the central computer system 3000. In this example, according to Mary Kate, she has an existing account with financial institution B. The central computer system 3000 sends Mary Kate's identity code, the account number, and the activity information to the illicit proceeds tracking system 3200 at financial institution B (block 7004).

The illicit proceeds tracking system 3200 at financial institution B uses the account number provided by Mary Kate to identify the account in financial institution B and verifies whether Mary Kate's identity code matches the identity code of the account holder. In addition, financial institution B verifies whether the activity information provided by Mary Kate matches the activity of the account. After the verification by the illicit proceeds tracking system 3200 at financial institution B, the central computer system 3000 receives a response from the illicit proceeds tracking system 3200 (block 7005) and sends the response to the illicit proceeds system 3100 at financial institution A.

The illicit proceeds tracking system 3100 at financial institution A determines whether the information received from the central computer system 3000 matches the information provided by Mary Kate (decision Block 7006). If the information does not match correctly (NO branch 7008), the illicit proceeds tracking system 3100 informs financial institution A to reject Mary Kate's application for a loan account (block 7010). If the information matches correctly (YES branch 7007) the illicit proceeds tracking system 3100 informs financial institution A to open an account for Mary Kate (block 7009).

In the above examples, an identity code is used to identify a person without disclosing the true identity code of the person. In practice, an identity code can be used to identify any subject without disclosing the identification information of the subject. As a result of using the identity code, the computer systems on the network can easily communicate with one another through the central computer system without any concerns about privacy or confidentiality.

The central computer system plays the role of ensuring fair cooperation among all computer systems on the network. Although one computer system can directly communicate with another computer system on the network based on identity codes without going through the central computer system, it may raise a concern about whether they are fair to each other. For example, it may be a concern whether one financial institution may steal the trade secrets from another financial institution when their computer systems directly connect to each other.

The central computer system also plays the role of eliminating security problems. Because each computer system connected to the network only needs to have a single connection to the central computer systems, the security matters can be easily managed. However, if each computer system needs to connect to all other computer systems, the security matters become very complicated. For example, if a first financial institution is hacked by a perpetrator, the perpetrator may hack into all other financial institutions that are directly connected to the first financial institution.

The central computer system also plays the role of a broadcaster. Very often, a computer system does not know which other computer systems on the network may have a common interest about a subject. The central computer system can instantly send the identity code of the subject to all computer systems connected to the network. Only the computer systems on the network that have a matched identity code will respond to the central computer system.

Figure 8:
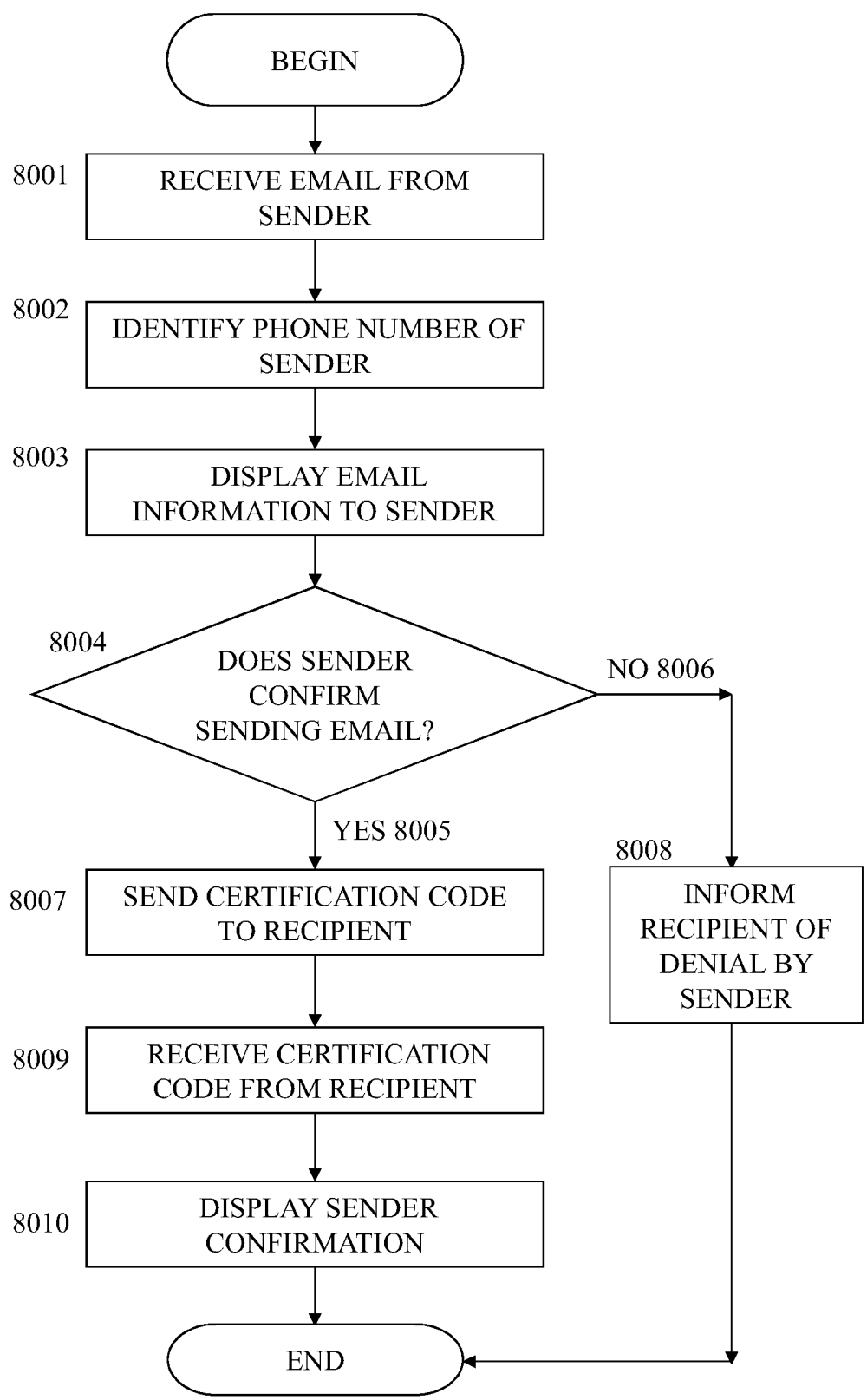
FIGS. 8 and 9 are flowcharts for an email certification system to certify emails, according to aspects of the present disclosure.

FIG. 8 illustrates an example of a flow chart for a sender to certify an email sent to a recipient according to aspects of the present disclosure. In some configurations, as shown in the flowchart of FIG. 8 together with FIG. 1D, a central computer system 4000 helps Johnnie 4100 certify his email and Jack 4200 to verify the certified email.

When Johnnie 4100 sends an email to Jack 4200, Johnnie 4100 includes an email address of the central computer system 4000 as one of the recipients by including the email address of the email certification system in, for example, the To field or the CC field of the email. As a result, the email certification system 4000 receives the email from the sender, Johnnie 4100 (block 8001).

The email certification system 4000 uses the email address of the sender, Johnnie 4100, to search its database to identify the personal communication device interface address (e.g., mobile phone number, mobile phone address, IP address, user ID, etc.) of Johnnie 4100 (block 8002).

The email certification system 4000 uses the mobile app of Johnnie 4100 to display to Johnnie 4100 the information associated with the email that Johnnie 4100 sent. The information may include the email title, email time stamp, recipient name, first few lines of the email, etc. (block 8003). Alternatively, the email certification system 4000 sends a text message to Johnnie 4100 to display to Johnnie 4100 the information associated with the email that Johnnie 4100 sent.

Johnnie is prompted by the mobile app to answer whether he has sent the email based on the displayed information (decision block 8004). Alternatively, Johnnie is prompted by the text message to answer whether he has sent the email based on the displayed information. Johnnie 4100 can send his answer via a text message.

If the answer is No (No branch 8006), the email certification system 4000 sends an email to the recipient, Jack 4200, informing the recipient that Johnnie 4100 has denied the email (block 8008). Jack 4200 should immediately delete the email from Johnnie 4100 to avoid any computer hacking risk.

Additionally, the email certification system 4000 can send Johnnie's email address to the Intelligent Alert Systems 4501 and 4502, the Financial Institution System 4300, and the Merchant Systems 4601, 4602, and 4603 and inform them that Johnnie's email address may have been compromised. In response to the information provided by the email certification system 4000, the financial institutions, the merchants, and other organizations connected to the network 4700 can take timely actions to prevent fraud associated with Johnnie's email address. For example, they can scan Johnnie's email address against their existing records and future records to prevent fraud.

If the answer is Yes (Yes branch 8005), the email certification system 4000 forwards the email from Johnnie 4100 to Jack 4200 by adding an email certification code in the email and prompts Jack 4200 to verify the email certification code at the website of the email certification system (block 8007). The email certification code can be an alpha-numerical number.

Jack 4200 goes to the website of the email certification system and enters the email certification code. As a result, the email certification system 4000 receives the email certification code (block 8009). Based on the email certification code, the email certification system can identify the email sent by Johnnie 4100.

The email certification system 4000 displays the sender name, the time stamp of Johnnie's confirmation, and other related information on the website so that Jack 4200 can verify to make sure that Johnnie 4100 has truly sent the email to him (block 8010).

The email certification system 4000 can also inform the sender, Johnnie 4100, via his mobile app that the recipient, Jack 4200, has received the certified email and has confirmed the receipt. Alternatively, the email certification system 4000 can send a text message to inform the sender, Johnnie 4100, that the recipient, Jack 4200, has received the certified email and has confirmed the receipt.

Because the email certification system has the email address of Jack 4200, the email certification system can send an email to invite Jack 4200 to open an account with the email certification system 4000. Once Jack 4200 has opened an account and downloaded the mobile app from the email certification system 4000, the future email certification and verification process can be accomplished via mobile app and there is no need for Jack 4200 to go to the website of the email certification system 4000 to verify the email certification code.

Figure 9:
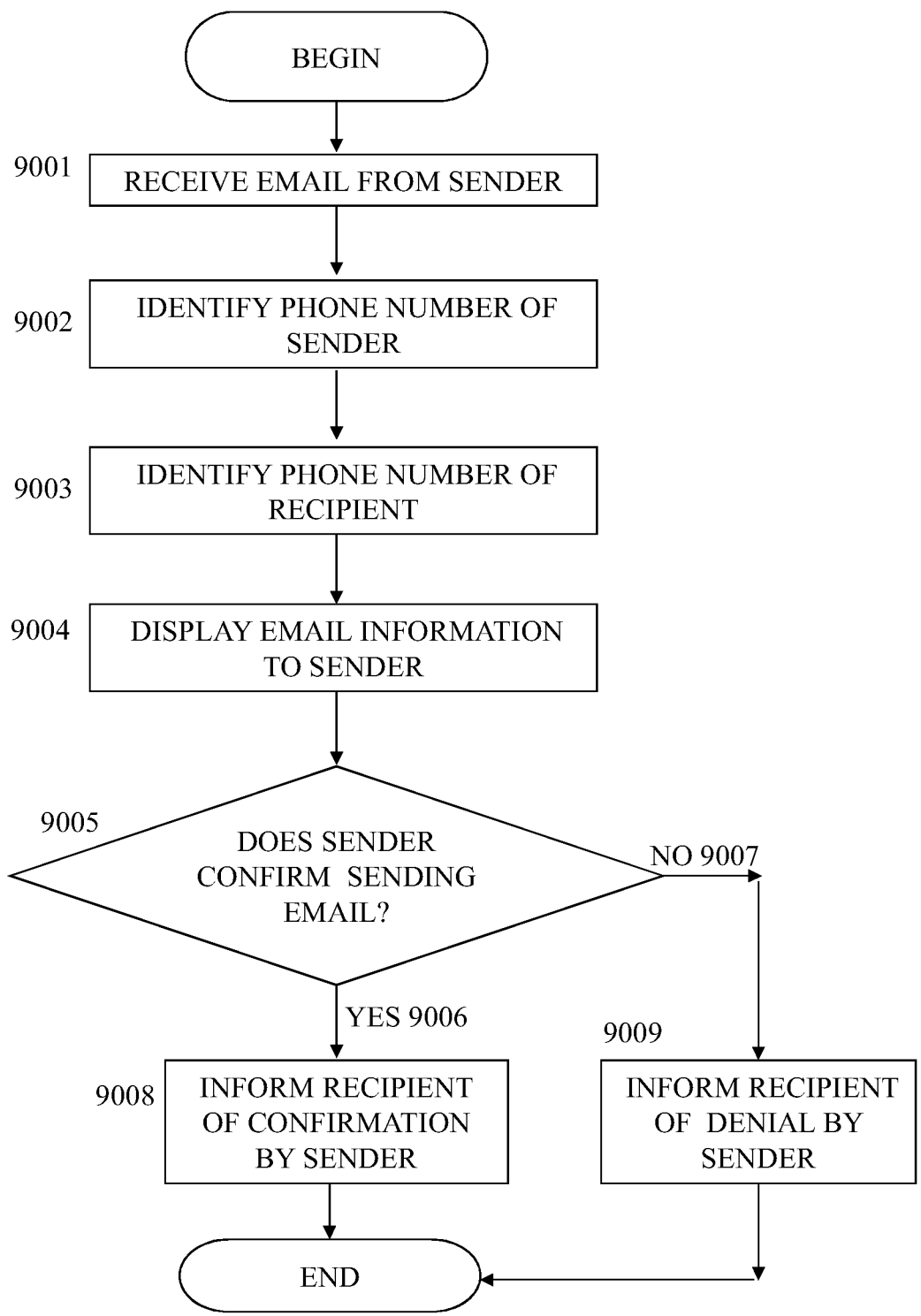

FIG. 9 illustrates an example of a flow chart for a sender to certify his email sent to a recipient according to aspects of the present disclosure. In some configurations, as shown in the flowchart of FIG. 9 together with FIG. 1D, a central computer system 4000 helps Johnnie 4100 certify an email and Jack 4200 to verify the certified email via their respective mobile apps.

When Johnnie 4100 sends an email to Jack 4200, Johnnie 4100 includes an email address of the central computer system 4000 as one of the recipients by including the email address of the email certification system in, for example, the To field or the CC field of the email. As a result, the email certification system 4000 receives the email from the sender, Johnnie 4100 (block 9001).

The email certification system 4000 uses the email address of the sender, Johnnie 4100, to search its database to identify the personal communication device interface address (e.g., mobile phone number, mobile phone address, IP address, user ID, etc.) of Johnnie 4100 (block 9002). The email certification system 4000 uses the email address of the recipient, Jack 4200, to search its database to identify the personal communication device interface address (e.g., mobile phone number, mobile phone address, IP address, user ID, etc.) of Jack 4200 (block 9003).

The email certification system 4000 uses the mobile app of Johnnie 4100 to display to Johnnie 4100 the information associated with the email that Johnnie 4100 sent. The information may include the email title, email time stamp, recipient name, first few lines of the email, etc. (block 9004). Alternatively, the email certification system 4000 can send a text message to the personal communication device (e.g., mobile phone, etc.) of Johnnie 4100 to display the information associated with the email that Johnnie 4100 sent.

Johnnie is prompted by the mobile app to answer whether he has sent the email based on the displayed information (decision block 9005). Alternatively, Johnnie 4100 can provide the answer via a text message.

If the answer is No (No branch 9007), the email certification system 4000 informs Jack 4200 via Jack's mobile app that Johnnie 4100 has denied the email (block 9009). Alternatively, the email certification system 4000 can send a text message to the personal communication device (e.g., mobile phone, etc.) of Jack 4200 to inform Jack 4200 that Johnnie 4100 has denied the email. Jack 4200 should immediately delete the email from Johnnie to avoid any computer hacking risk.

Additionally, the email certification system 4000 can send Johnnie's email address to the Intelligent Alert Systems 4501 and 4502, the Financial Institution System 4300, and the Merchant Systems 4601, 4602, and 4603 and inform them that Johnnie's email address may have been compromised. In response to the information provided by the email certification system 4000, the financial institutions, the merchants, and other organizations connected to the network 4700 can take timely actions to prevent fraud associated with Johnnie's email address. For example, they can scan Johnnie's email address against their existing records and future records to prevent fraud.

If the answer is Yes (Yes branch 9006), the email certification system 4000 informs recipient, Jack 4200, via a mobile app that Johnnie 4100 has sent an email to Jack 4200 and has certified the email. In addition, the email certification system 4000 provides to Jack 4200 some identification information about the certified email, such as the email title, the confirmation time stamp, first few lines of the email, etc. (block 9008). Alternatively, the email certification system 4000 can send a text message to the personal communication device (e.g., mobile phone, etc.) of Jack 4200 to inform Jack 4200 that Johnnie 4100 has sent the email and has certified the email. In addition, the email certification system 4000 sends a text message to Jack 4200 to provide some identification information about the certified email, such as the email title, the confirmation time stamp, first few lines of the email, etc.

Once the recipient, Jack 4200, has reviewed on his mobile app the notice of the certified email from Johnnie 4100, the email certification system 4000 can inform the sender, Johnnie 4100, via his mobile app that the recipient, Jack 4200, has been informed of the certified email. Alternatively, the email certification system 4000 can send a text message to the personal communication device (e.g., mobile phone, etc.) of Johnnie 4100 to inform Johnnie that that the recipient, Jack 4200, has been informed of the certified email.

In other aspects of the present disclosure, the email certification system 4000 forwards Johnnie's email to Jack 4200 by adding an email certification code and prompts Jack 4200 to verify whether the email certification code in the email matches the email certification code in the mobile app.

Once the recipient, Jack 4200, has verified that the email certification code is correct, the email certification system 4000 can inform the sender, Johnnie 4100, via his mobile app that the recipient, Jack 4200, has received the certified email and has confirmed the receipt. Alternatively, the email certification system 4000 can send a text message to inform the sender, Johnnie 4100, that the recipient, Jack 4200, has received the certified email and has confirmed the receipt.

Figure 10:
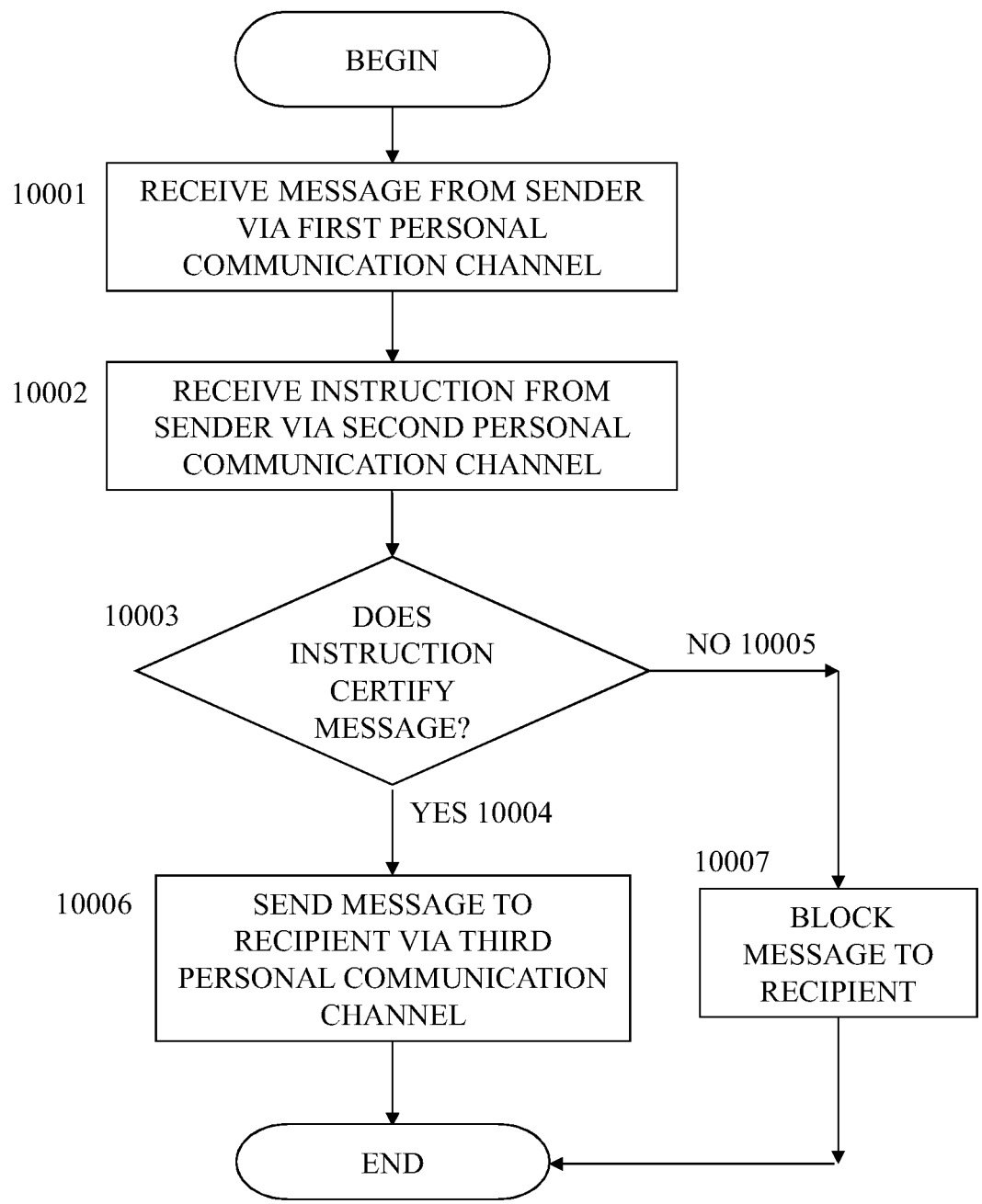
FIG. 10 is a flowchart for asocial network central computer system to send and certify messages, according to aspects of the present disclosure.

FIG. 10 illustrates an example of a flow chart for a sender to certify his message sent to a recipient via a social network according to aspects of the present disclosure. In some configurations, as shown in the flowchart of FIG. 10 together with FIG. 1E, a social network central computer system 5000 enables Johnnie 5100 to send and certify a message so that Jack 5200 can receive the certified message. Each of Johnnie 5100, Jack 5200, and the social network central computer system 5000 communicates through two personal communication channels. The first personal communication channel is used to send or receive messages. The second personal communication channel is used to certify messages.

First, the social network central computer system 5000 receives a message from Johnnie 5100 via a first personal communication channel (block 10001). Then, the social network central computer system 5000 receives an instruction from Johnnie 5100 via a second personal communication channel (block 10002). The social network central computer system 5000 determines whether the instruction from Johnnie 5100 indicates that Johnnie 5100 has certified the message (decision block 10003).

If the instruction from Johnnie 5100 does not certify the message (No branch 10005), the social network central computer system 5000 blocks the message to the recipient, Jack 5200 (block 10007). Alternatively, the social network central computer system 5000 can send the message to the recipient, Jack 5200, via a third personal communication channel with an indicator to show that the message has not been certified by Johnnie 5100. There may be fraud risk.

If the instruction from Johnnie 5100 certifies the message (Yes branch 10004), the social network central computer system 5000 sends the message to Jack 5200 through a third personal communication channel (block 10006). As an optional feature, the social network central computer system 5000 may add an indicator to show that the message has been certified by Johnnie 5100. As another optional feature, the social network central computer system 5000 may send the indicator to Jack 5200 via a fourth personal communication channel.

In this disclosure, a threshold, predefined value, or parameter that may be set by a person, such as the designer, the user, etc., can also be set by the intelligent system that learns the preferences of the person by evaluating past behavior of the person.

In this disclosure, the terminology "encoding" generally refers to any type of data manipulation so that an alphanumeric code is generated from a set of data through this data manipulation. The terminology "decoding" generally refers to the reverse data manipulation to transform the "encoded" data back to its original format. Not all encoded information can be decoded. Some coding schemes compress the information contained in the data, such that some information is lost during the encoding process. Sometimes, encoding involves encryption which hides the information such that it cannot be decoded or otherwise made visible without access to a description key.

In this disclosure, the terminology "network" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to accomplish the purposes of the system.

In this disclosure, the terminology "processor" generally refers to either one processor or a group of processors, which may work alone or work together to accomplish the purposes of the processor.

In this disclosure, the term "module" refers to a single component or multiple components which can be hardware, software, firmware, or a combination thereof, and may work alone or work together to accomplish the purposes of the module.

In this disclosure, a "bank" or "financial institution" generally refers to a financial service provider, either a bank or a non-bank, where financial services and money services are provided. Some examples of financial institutions are banks, credit unions, insurance companies, insurance agencies, stockbrokers, stock agencies, bond brokers, bond agencies, commodity brokers, commodity agencies, securities companies, mortgage companies, mortgage agencies, securities companies, money services businesses, agencies for money services businesses, agencies for organizations that provide financial services or money services, financial holding companies, trading companies, trading agencies, other financial service providers, other financial agencies, stock exchanges, commodity exchanges, securities exchanges, currency exchanges, virtual currency companies, virtual currency issuers, virtual currency service providers, virtual currency network providers, virtual currency computer providers, virtual currency dealers, virtual currency exchanges, virtual securities exchanges, bond exchanges, other exchanges, funds managers, investment companies, private equity firms, venture capital firms, merchant acquirers, payment processors, payment card issuers, payment card program managers, internet merchants, transactions processors, securities processors, other organizations related to financial services, etc.

In this disclosure, a "bank account" or "financial account" generally refers to an account associated with a financial institution, either a bank or a non-bank, where financial transactions can be conducted through financial instruments such as cash, virtual currency, virtual instruments, virtual securities, checks, credit cards, debit cards, ATM cards, stored value cards, gift cards, prepaid cards, wires, monetary instruments, letters of credit, notes, securities, commercial papers, commodities, securities, precious metal, electronic fund transfers, automatic clearing house, etc.

In this disclosure, "financial transactions" generally refer to transactions related to financial activities, including but not limited to payment, fund transfer, money services, securities issuance, securities exchange, currency exchange, commodity exchange, payroll, invoicing, trading, escrow, insurance, underwriting, merger, acquisition, account opening, account closing, account status check, etc.

In this disclosure, "trading" generally refers to trading activities, both private and public, including but not limited to trading of stock, currency, virtual currency, virtual instruments, virtual securities, commodities, rights, values, securities, derivatives, goods, services, merchandise, etc.

In this disclosure, "securities" are generally referred to according to the definition in the Securities Act of 1933 and other laws and regulations related to the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, preorganization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this disclosure, a "consumer" generally refers to a customer, person, subject, payer, payee, beneficiary, user, or client, etc., seeking to perform a transaction with an individual, an organization, a merchant, and/or a financial institution.

In this disclosure, the terminology "identification document" generally refers to a passport, driver's license, voter card, benefits card, student identification card, social security card, national identification card, identity card, certificate of legal status, and other official documents and information bearing instruments that identify a designated individual by certain verifiable characteristics, that are issued or certified by a consulate, embassy, government agency, public or private organizations or other governmental authorities, and that are protected against unauthorized copying or alteration by the responsible party or parties. In particular, such "identification documents" can be formed from various materials, including paper, plastic, polycarbonate, PVC, ABS, PET, Teslin, composites, etc. and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electromagnetic, and other media.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical descriptions, biometrical information, and other information that can be used to identify a person.

In this disclosure, "personal information" includes personal identification information, personal relationships, personal status, personal background, personal interests, and personal financial information including information related to financial instruments, financial accounts and financial activities, and other information that is related to a person.

In this disclosure, "financial instruments" generally refer to instruments that are used to conduct financial transactions. Examples of financial instruments include cash, virtual currency, virtual securities, virtual instruments, credit cards, debit cards, ATM cards, prepaid cards, stored value cards, gift cards, checks, monetary instruments, wire transfers, ACH transfers, letters of credit, notes, securities, commercial papers, commodities, precious metal, gold, silver, etc.

In this disclosure, a "personal communication device" generally refers to a device interface used for personal communication purposes.

In this disclosure, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, a tablet interface, other communication device interface, a Personal Digital Assistant (PDA) interface, a handheld device interface, a portable device interface, a wireless interface, a wired interface, and other interfaces.

In this disclosure, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, smartbook, tablet, personal communication device, tablet device, digital assistant, entertainment device, network interface device, router, and/or Personal Digital Assistant (PDA), etc., which interfaces a user with a computer network, so that the user may interact with computer systems and other equipment connected to the computer network.

In this disclosure, the terminology "computer application module" generally refers to a computer-based application, including a hardware application, a software application, or an application based on both hardware and software. A computer application module comprises Outlook, Gmail, Hotmail, Facebook, LinkedIn, or any application that is running on a mobile phone, a computer system, a personal computer, a smartbook, a personal communication device, a device interface, or a combination thereof.

In this disclosure, the terminology "communication channel" generally refers to a message communication channel, an email communication channel, a webmail communication channel, a secure email communication channel, a social network communication channel, a mobile app communication channel, a password-controlled communication channel, a virtual communication channel, a physical communication channel, an embedded communication channel, an electronic communication channel, an electromagnetic communication channel, a mechanic communication channel, a laser communication channel, a light communication, a video communication channel, an audio communication channel, or a combination thereof.

The methodologies described may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described, or a combination thereof.

For a firmware and/or software implementation, the methodologies may be implemented with modules (e.g., procedures, functions, and so on) that perform the functions described. Any machine-readable medium tangibly embodying instructions may be used in implementing the methodologies described. For example, software codes may be stored in a memory and executed by a processor. Memory may be implemented within the processor or external to the processor. As used the term memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer, disk and disc, as used, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The aspects described in this disclosure can be assembled to form a variety of applications based on the need. Those skilled in the art and technology to which this disclosure pertains can appreciate that alterations and changes in the described structure may be practiced without meaningfully departing from the principal, spirit, and scope of this disclosure. Such alterations and changes should not be construed as deviations from the present disclosure.

What is claimed is:

1. An email certification apparatus, comprising:
an email receiver module configured to receive an email with a sender email address of an email sender and a recipient email address of an email recipient;
a first data storage module configured to store a first device address of a first device associated with the email sender, the first data storage module identified by a first identifier transformed from the sender email address, the first device address used to contact the email sender;
a second data storage module configured to store a second device address of a second device associated with the email recipient, the second data storage module identified by a second identifier transformed from the recipient email address, the second device address used to contact the email recipient;
a control and communication module configured to transform the sender email address into the first identifier to instruct the first storage module to conduct a first search based on the sender email address and transform the recipient email address into the second identifier to instruct the second storage module to conduct a second search based on the recipient email address, the first search producing the first device address and the second search producing the second device address; and
an email transmitter module configured to transmit, to the email recipient, the email with an email certification code that is accessible by the email recipient in accordance with the email sender confirming the validity of the email via a message that is different than the email, the email certification code being used by the email recipient to determine an identity of a sender of the email.

2. The email certification apparatus of claim 1, in which an entity of the recipient email address is alerted when the email sender denies the validity of the email.

3. The email certification apparatus of claim 2, in which the entity comprises at least one of an organization, an individual, or a combination thereof.

4. The email certification apparatus of claim 1, in which the first device address comprises at least an address of a mobile phone, a personal communication device, a device interface, or a combination thereof.

5. The email certification apparatus of claim 4, in which the device interface comprises at least one of a keyboard, a keypad, a monitor, a display, a terminal, a computer, a control panel, a vehicle dashboard, a network interface, a machine interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, a tablet interface, other communication device interface, a Personal Digital Assistant (PDA) interface, a handheld device interface, a portable device interface, a wireless interface, a wired interface, or a combination thereof.

6. The email certification apparatus of claim 1, in which the second device address comprises at least an address of a mobile phone, a personal communication device, a device interface, or a combination thereof.

7. The email certification apparatus of claim 6, in which the device interface comprises at least one of a keyboard, a keypad, a monitor, a display, a terminal, a computer, a control panel, a vehicle dashboard, a network interface, a machine interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, a tablet interface, other communication device interface, a Personal Digital Assistant (PDA) interface, a handheld device interface, a portable device interface, a wireless interface, a wired interface, or a combination thereof.

8. The email certification apparatus of claim 1, in which the first identifier comprises at least a portion of the sender email address.

9. The email certification apparatus of claim 1, in which the second identifier comprises at least a portion of the recipient email address.

10. A message certification apparatus, comprising:
a message receiver module configured to receive a first message with a sender message address of a message sender and a recipient message address of a message recipient;
a first data storage module configured to store a first device address of a first computer associated with the message sender, the first data storage module identified by a first identifier transformed from the sender message address, the first device address used to contact the message sender;
a second data storage module configured to store a second device address of a second computer associated with the message recipient, the second data storage module identified by a second identifier transformed from the recipient message address, the second device address used to contact the message recipient;
a control and communication module configured to transform the sender message address into the first identifier to instruct the first storage module to conduct a first search based on the sender message address and transform the recipient message address into the second identifier to inform the second storage module to conduct a second search based on the recipient message address, the first search producing the first device address and the second search producing the second device address; and
a message transmitter module configured to transmit to, the message recipient, the first message with a message certification code that is accessible by the message recipient in accordance with the message sender confirming the validity of the first message via a second message that is different than the first message, the message certification code being used by the message recipient to determine an identity of a sender of the message.

11. The message certification apparatus of claim 10, in which an entity of the recipient message address is alerted when the message sender denies the validity of the first message.

12. The message certification apparatus of claim 11, in which the entity comprises at least one of an organization, an individual, or a combination thereof.

13. The message certification apparatus of claim 10, in which the first device address comprises at least an address of a mobile phone, a personal communication device, a device interface, or a combination thereof.

14. The message certification apparatus of claim 13, in which the device interface comprises at least one of a keyboard, a keypad, a monitor, a display, a terminal, a computer, a control panel, a vehicle dashboard, a network interface, a machinery interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, a tablet interface, other communication device interface, a Personal Digital Assistant (PDA) interface, a handheld device interface, a portable device interface, a wireless interface, a wired interface, or a combination thereof.

15. The message certification apparatus of claim 10, in which the second device address comprises at least an address of a mobile phone, a personal communication device, a device interface, or a combination thereof.

16. The message certification apparatus of claim 15, in which the device interface comprises at least one of a keyboard, a keypad, a monitor, a display, a terminal, a computer, a control panel, a vehicle dashboard, a network interface, a machinery interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, a tablet interface, other communication device interface, a Personal Digital Assistant (PDA) interface, a handheld device interface, a portable device interface, a wireless interface, a wired interface, or a combination thereof.

17. The message certification apparatus of claim 10, in which the first identifier comprises at least a portion of the sender message address.

18. The message certification apparatus of claim 10, in which the second identifier comprises at least a portion of the recipient message address.

* * * * *